United States Patent
Turner

(10) Patent No.: US 9,272,500 B2
(45) Date of Patent: Mar. 1, 2016

(54) CUSHIONING ELEMENTS FOR APPAREL AND OTHER PRODUCTS AND METHODS OF MANUFACTURING THE CUSHIONING ELEMENTS

(71) Applicant: NIKE, Inc., Beaverton, OR (US)

(72) Inventor: David Turner, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 177 days.

(21) Appl. No.: 14/193,854

(22) Filed: Feb. 28, 2014

(65) Prior Publication Data

US 2014/0311665 A1 Oct. 23, 2014

Related U.S. Application Data

(60) Division of application No. 13/035,570, filed on Feb. 25, 2011, now Pat. No. 8,702,895, which is a continuation-in-part of application No. 12/755,579, filed on Apr. 7, 2010, now Pat. No. 8,425,712.

(51) Int. Cl.
*B32B 38/04* (2006.01)
*A41D 13/015* (2006.01)
(Continued)

(52) U.S. Cl.
CPC ............ *B32B 38/04* (2013.01); *A41D 13/0156* (2013.01); *A41D 13/0581* (2013.01); *A41D 31/005* (2013.01); *A43B 13/187* (2013.01); *A43D 8/06* (2013.01); *A43D 8/08* (2013.01); *A45F 3/08* (2013.01); *A45F 3/12* (2013.01); *A47C 7/021* (2013.01); *A63B 71/08* (2013.01); *A63B 71/12* (2013.01); *B26D 7/1836* (2013.01); *B29C 65/48* (2013.01); *B29C 66/433* (2013.01); *B29C 66/472* (2013.01); *B29C 66/727* (2013.01); *B29C 66/8322* (2013.01); *B29C 66/845* (2013.01); *B29C 69/005* (2013.01); *B32B 5/245* (2013.01); *B68G 5/02* (2013.01); *B68G 7/00* (2013.01); *B68G 13/04* (2013.01); *A41D 13/05* (2013.01); *A45F 2003/122* (2013.01); *A45F 2003/125* (2013.01); *A63B 2071/125* (2013.01); *A63B 2071/1233* (2013.01); *A63B 2071/1241* (2013.01); *A63B 2071/1266* (2013.01); *B29C 65/18* (2013.01); *B29C 65/26* (2013.01); *B29C 65/30* (2013.01);

(Continued)

(58) Field of Classification Search
CPC ............... B32B 38/04; A41D 13/0156; A41D 13/0581; A41D 3/005
See application file for complete search history.

(56) References Cited

U.S. PATENT DOCUMENTS 3,371,584 A * 3/1968 Zernov ................. B26D 7/1836 225/97
3,877,353 A * 4/1975 Smith ................... B26D 7/1836 493/373

(Continued)

*Primary Examiner* — Jeff Aftergut
(74) *Attorney, Agent, or Firm* — Shook, Hardy & Bacon L.L.P.

(57) ABSTRACT

A method for manufacturing the cushioning elements may include utilizing a die with a plurality of die elements positioned in a particular arrangement. A polymer material, which may be a polymer foam material, is located between the die and an extractor. The polymer material is compressed between the die and the extractor, and the die elements cut the polymer material to form a plurality of pad components, which are arranged like the die elements. The die and the extractor are separated, and the pad components are secured to the extractor in the arrangement of the die elements. Additionally, the pad components are bonded to at least one material layer such that the pad components remain in the arrangement of the die elements.

20 Claims, 59 Drawing Sheets

(51) Int. Cl.
*A41D 31/00* (2006.01)
*A43B 13/18* (2006.01)
*A43D 8/06* (2006.01)
*A43D 8/08* (2006.01)
*A45F 3/12* (2006.01)
*A47C 7/02* (2006.01)
*A63B 71/08* (2006.01)
*A63B 71/12* (2006.01)
*B26D 7/18* (2006.01)
*B29C 69/00* (2006.01)
*B32B 5/24* (2006.01)
*B68G 5/02* (2006.01)
*B68G 7/00* (2006.01)
*B68G 13/04* (2006.01)
*A45F 3/08* (2006.01)
*B29C 65/48* (2006.01)
*A41D 13/05* (2006.01)
*B29C 65/18* (2006.01)
*B29C 65/26* (2006.01)
*B29C 65/30* (2006.01)
*B29C 65/62* (2006.01)
*B29C 65/78* (2006.01)
*B29C 65/00* (2006.01)
*B29L 31/44* (2006.01)
*B29L 31/48* (2006.01)
*B29L 31/50* (2006.01)
*B29L 31/00* (2006.01)

(52) U.S. Cl.
CPC ............ *B29C 65/4815* (2013.01); *B29C 65/62* (2013.01); *B29C 65/7841* (2013.01); *B29C 65/7847* (2013.01); *B29C 66/24223* (2013.01); *B29C 66/24241* (2013.01); *B29C 66/24244* (2013.01); *B29C 66/24249* (2013.01); *B29C 66/30326* (2013.01); *B29C 66/71* (2013.01); *B29C 66/729* (2013.01); *B29C 66/7392* (2013.01); *B29C 66/73921* (2013.01); *B29C 66/7484* (2013.01); *B29C 66/8122* (2013.01); *B29C 66/836* (2013.01); *B29L 2031/443* (2013.01); *B29L 2031/48* (2013.01); *B29L 2031/4821* (2013.01); *B29L 2031/4864* (2013.01); *B29L 2031/507* (2013.01); *B29L 2031/71* (2013.01); *B29L 2031/7128* (2013.01); *B32B 2038/042* (2013.01); *B32B 2571/00* (2013.01); *Y10T 156/1062* (2015.01); *Y10T 156/1089* (2015.01); *Y10T 156/1092* (2015.01); *Y10T 156/1093* (2015.01); *Y10T 428/24612* (2015.01)

(56) References Cited

U.S. PATENT DOCUMENTS

| | | | | |
|---|---|---|---|---|
| 4,305,716 | A * | 12/1981 | Nickum | B23P 15/406 493/342 |
| 6,743,325 | B1 * | 6/2004 | Taylor | A41D 13/0156 156/259 |
| 8,425,712 | B2 * | 4/2013 | Turner | A41D 31/005 156/256 |
| 8,702,895 | B2 * | 4/2014 | Turner | A41D 13/0156 156/297 |
| 2010/0129573 | A1 * | 5/2010 | Kim | A41D 31/005 428/34.1 |
| 2010/0205716 | A1 * | 8/2010 | Kim | A41D 31/005 2/69 |
| 2010/0205722 | A1 * | 8/2010 | Kim | A41D 31/005 2/455 |
| 2010/0206472 | A1 * | 8/2010 | Kim | A41D 31/005 156/247 |

* cited by examiner

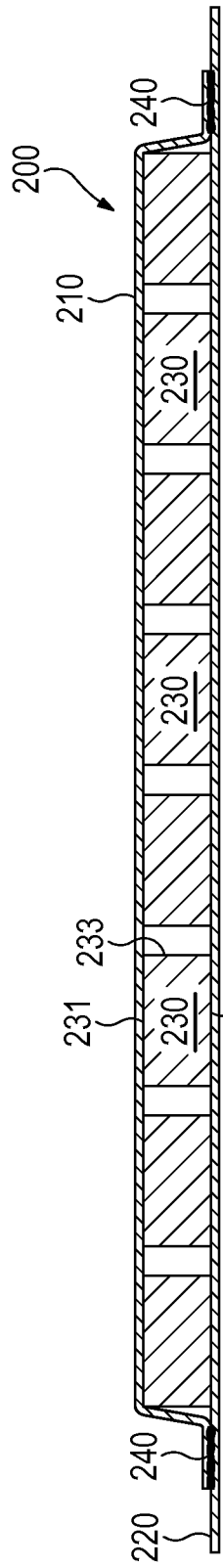
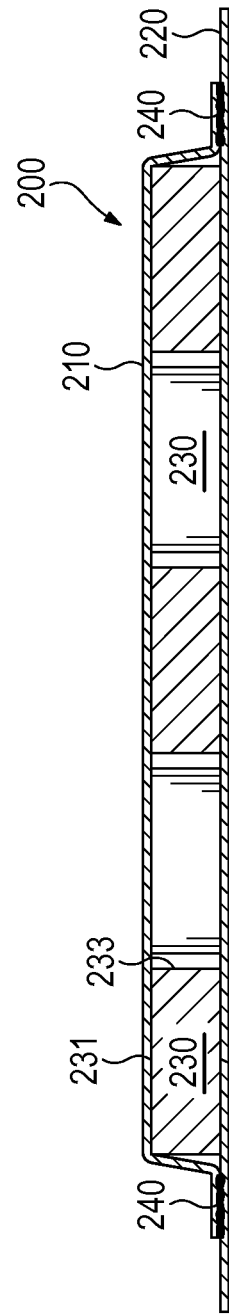

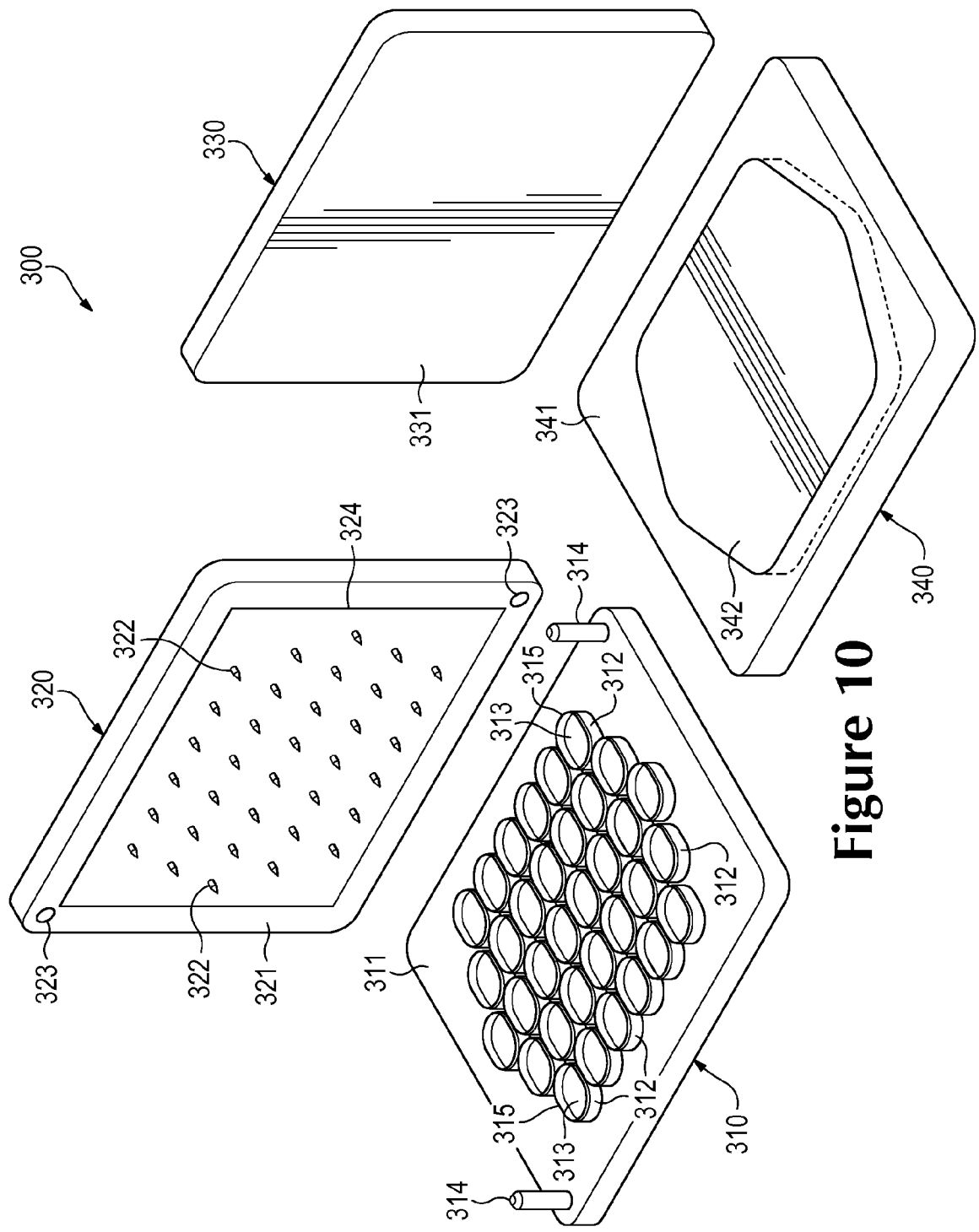

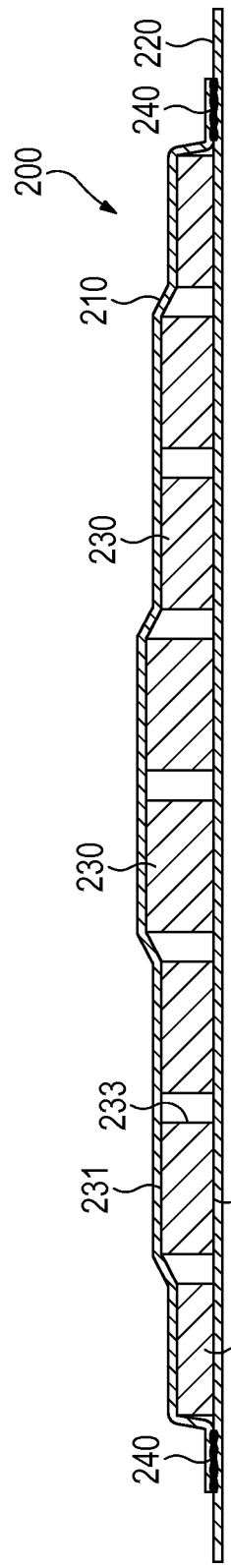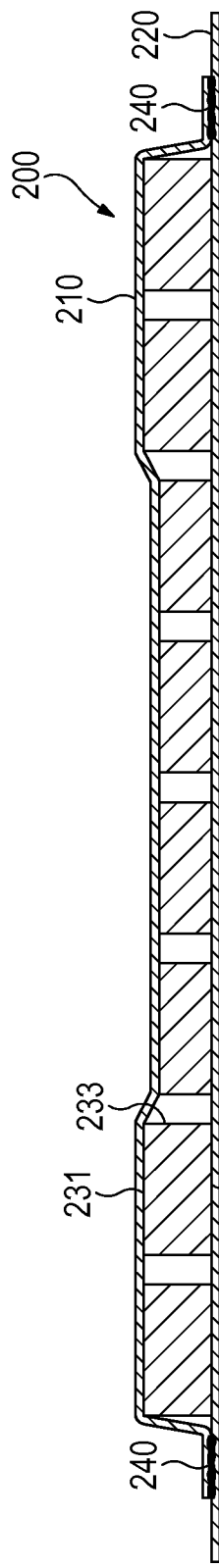
Figure 15A
Figure 15B

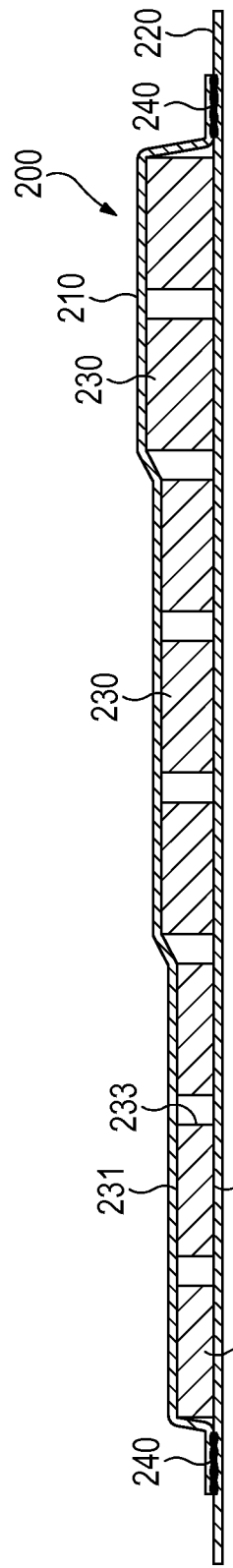
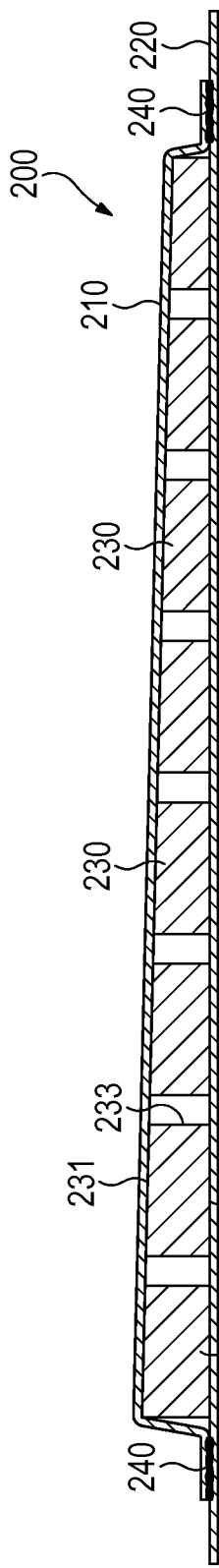
Figure 15C
Figure 15D

CUSHIONING ELEMENTS FOR APPAREL AND OTHER PRODUCTS AND METHODS OF MANUFACTURING THE CUSHIONING ELEMENTS

CROSS-REFERENCE To RELATED APPLICATIONS

This U.S. Patent Application is a divisional of U.S. Patent Application Publication Number US 2012/0052249, which is a continuation-in-part of U.S. Pat. No. 8,425,712, both of which are entirely incorporated herein by reference.

BACKGROUND

Materials or elements that impart padding, cushioning, or otherwise attenuate impact forces are commonly incorporated into a variety of products. Athletic apparel, for example, often incorporates cushioning elements that protect the wearer from contact with other athletes, equipment, or the ground. More specifically, pads used in American football and hockey incorporate cushioning elements that provide impact protection to various parts of a wearer. Helmets utilized during American football, hockey, bicycling, skiing, snowboarding, and skateboarding incorporate cushioning elements that provide head protection during falls or crashes. Similarly, gloves utilized in soccer (e.g., by goalies) and hockey incorporate cushioning elements that provide protection to the hands of a wearer. In addition to apparel, mats (e.g., for yoga or camping), chair cushions, and backpacks, for example, all incorporate cushioning elements to enhance comfort.

Various cushioning elements that may be utilized in apparel and a variety of other products are disclosed below. In general, the cushioning elements may include a first material layer, a second material layer, and a plurality of pad components located between and secured to the first material layer and the second material layer. In some configurations, the first material layer and the second material layer are joined through thermalbonding or a combination of thermalbonding and stitching.

Methods for manufacturing the cushioning elements are also disclosed below. In one example, a method includes providing a die and an extractor, the die having a plurality of die elements, and the extractor including a plurality of pins and an extractor sheet, the pins extending through apertures in the extractor sheet. A polymer material is located between the die and the extractor. The polymer material is compressed between the die and the extractor, the die elements cut the polymer material to form a plurality of pad components, and the pins extending into the pad components. The die and the extractor are separated, with the pad components being secured to the pins. The pad components are compressed against a first material layer with the extractor to bond the pad components to the first material layer. The extractor sheet is separated from the pins to push the pad components from the extractor. Additionally, the pad components are compressed against a second material layer to bond the pad components to the second material layer.

In another example of a method for manufacturing the cushioning elements, a plurality of pad components are located between a first material layer and a second material layer. The pad components are joined to the first material layer and the second material layer. Additionally, the first material layer is secured to the second material layer around a perimeter of the pad components with a bonding element.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

The foregoing Summary and the following Detailed Description will be better understood when read in conjunction with the accompanying figures.

FIGS. 9A and 9B are cross-sectional views of the cushioning element, as defined by section lines 9A and 9B in FIG. 8.

FIG. 10 is a perspective view of portions of a manufacturing apparatus utilized in a manufacturing process for the cushioning element.

FIGS. 15A-15D are cross-sectional views corresponding with FIG. 9A and depicting further configurations of the cushioning element.

The following discussion and accompanying figures disclose various cushioning elements that may be incorporated into a variety of products, including articles of apparel (e.g., shorts, pants, shirts, wraps, gloves, helmets, and footwear), mats, seat cushions, and backpacks, for example. Additionally, the following discussion and accompanying figures disclose various processes associated with manufacturing the cushioning elements.

Apparel Configuration

Figure 1:
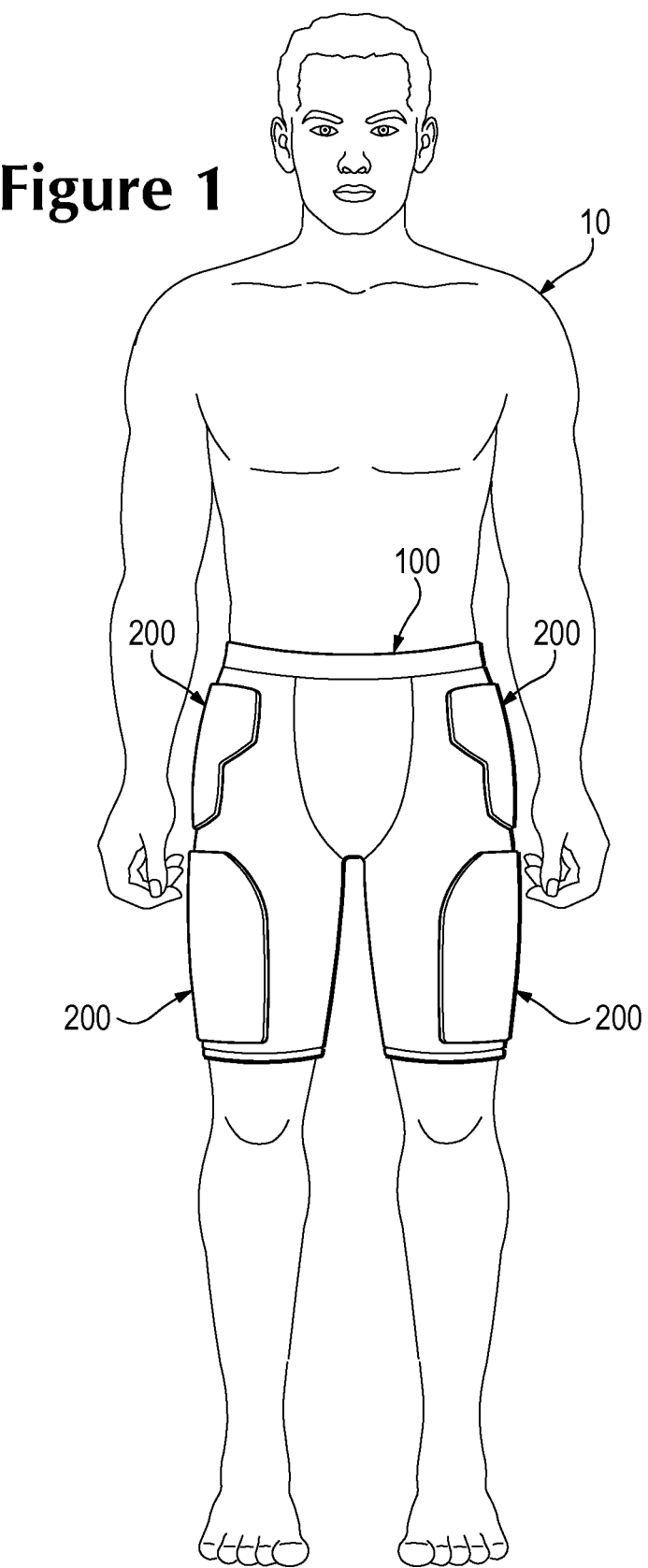
FIG. 1 is a front elevational view of an individual wearing an article of apparel.
Figure 2:
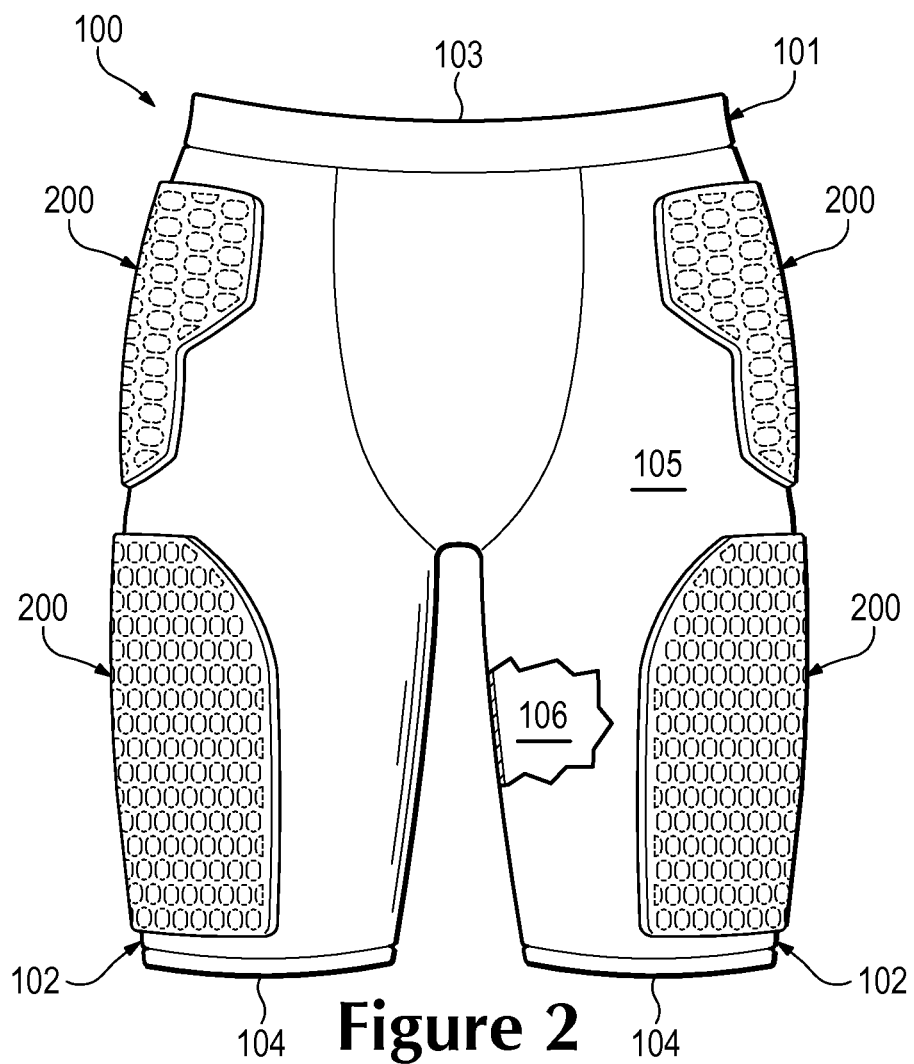
FIG. 2 is a front elevational view of the article of apparel.
Figure 3:
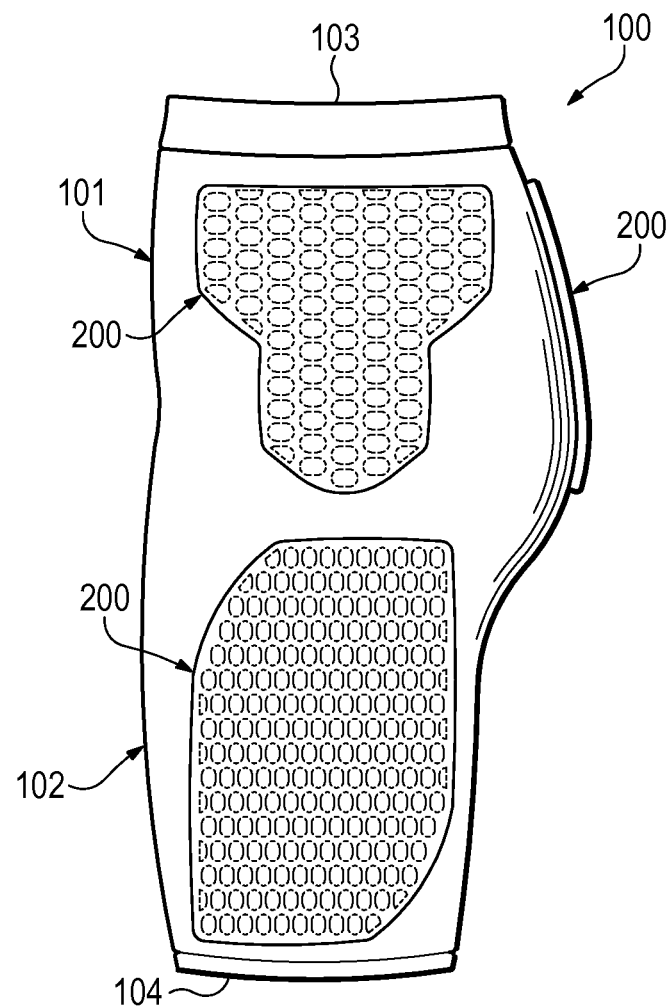
FIGS. 3 and 4 are side elevational views of the article of apparel.
Figure 4:
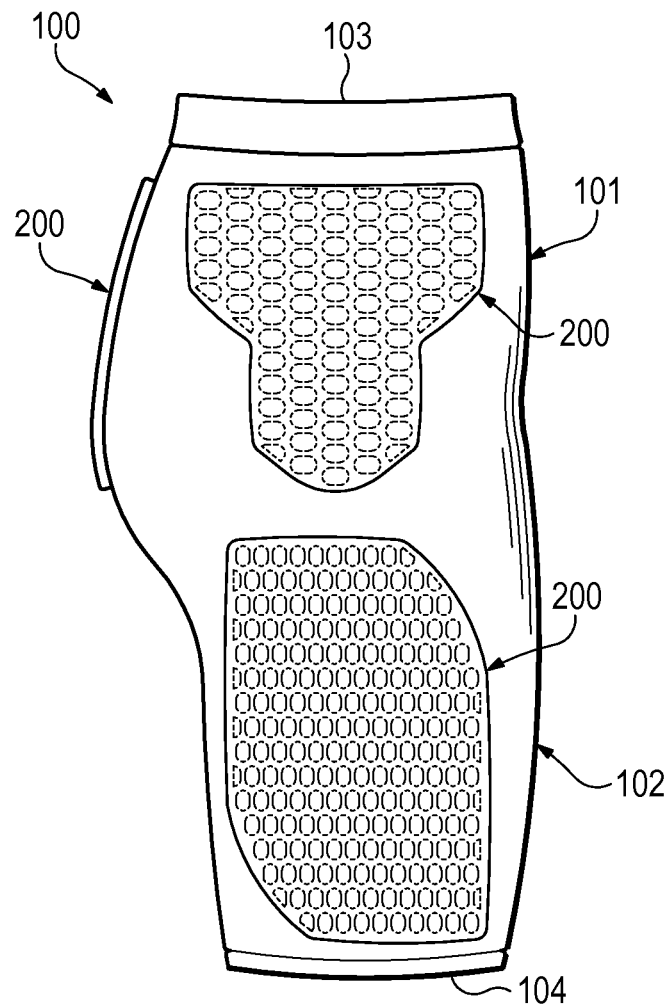
Figure 5:
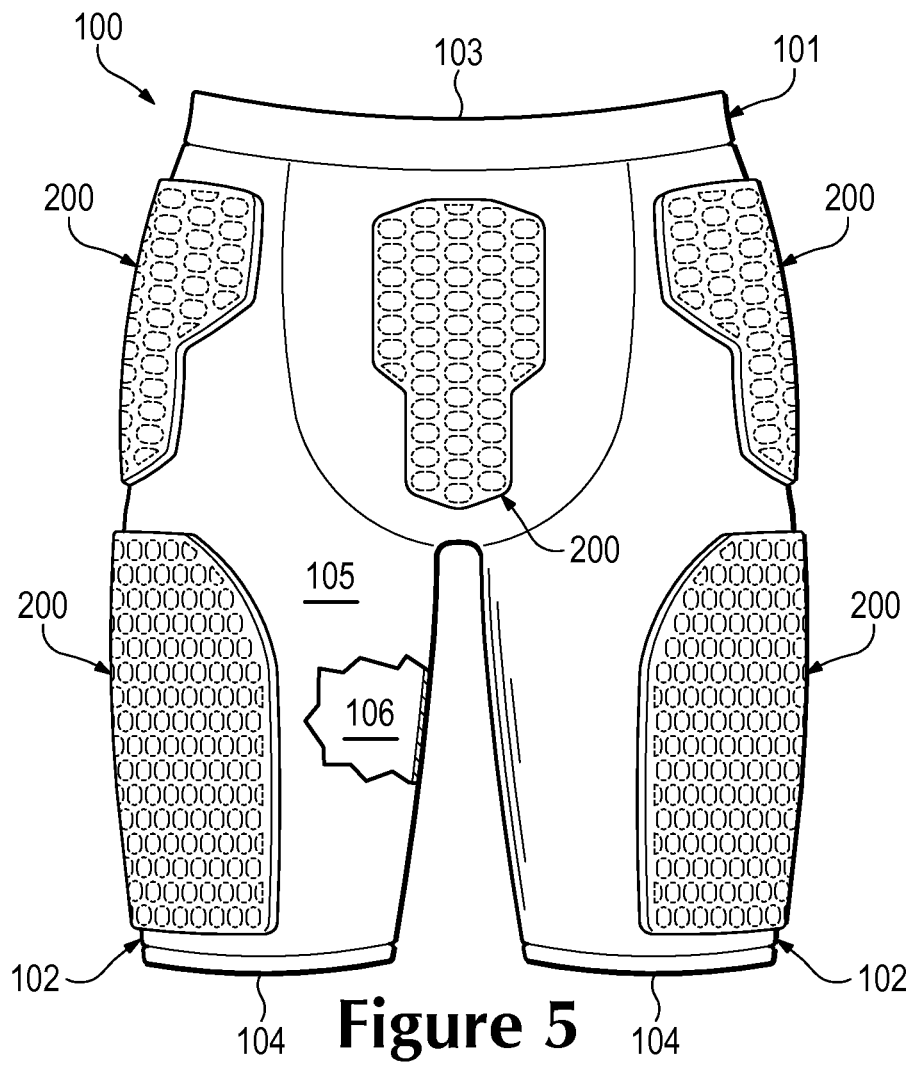
FIG. 5 is a rear elevational view of the article of apparel.
Figure 6:
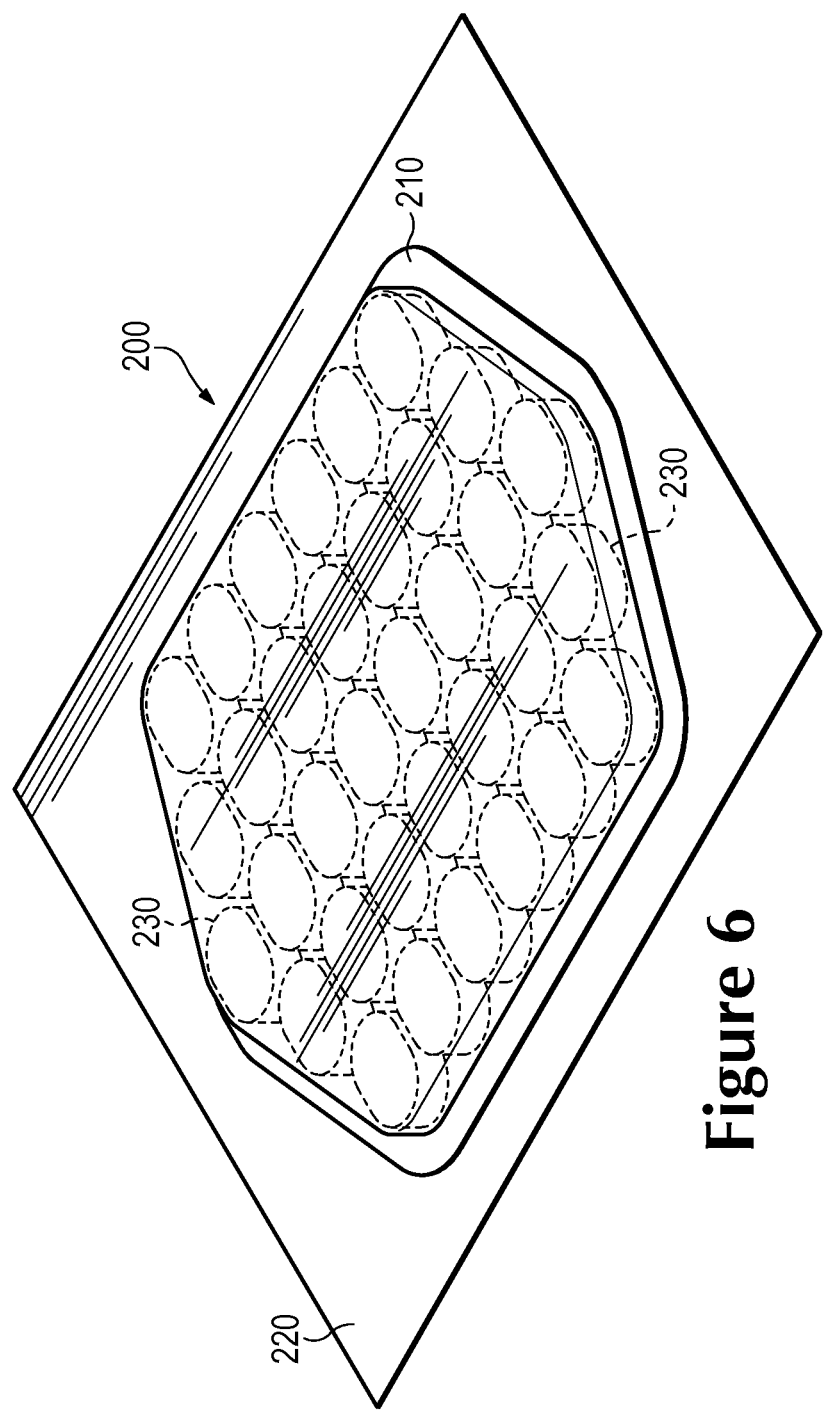
FIG. 6 is a perspective view of a cushioning element.

With reference to FIG. 1, an individual 10 is depicted as wearing an article of apparel 100 with the general configuration of a shorts-type garment. Although apparel 100 may be worn under other articles of apparel, apparel 100 may be worn alone, may be exposed, or may be worn over other articles of apparel. Apparel 100 may also be worn in combination with other pieces of equipment (e.g., athletic or protective equipment). Accordingly, the configuration of apparel 100 and the manner in which apparel 100 is worn by individual 10 may vary significantly.

Apparel 100 is depicted individually in FIGS. 2-5 as including a pelvic region 101 and a pair of leg regions 102 that extend outward from pelvic region 101. Pelvic region 101 corresponds with a pelvic area of individual 10 and covers at least a portion of the pelvic area when worn. An upper area of pelvic region 101 defines a waist opening 103 that extends around a waist of individual 10 when apparel 100 is worn. Leg regions 102 correspond with a right leg and a left leg of individual 10 and cover at least a portion of the right leg and the left leg when worn. Lower areas of leg regions 102 each define a thigh opening 104 that extends around a thigh of individual 10 when apparel 100 is worn. Additionally, apparel 100 includes an exterior surface 105 that faces away from individual 10 when apparel 100 is worn, and apparel 100 includes an opposite interior surface 106 that faces toward individual 10 and may contact individual 10 when apparel 100 is worn.

A plurality of cushioning elements 200 are incorporated into various areas of apparel 100 to impart padding, cushioning, or otherwise attenuate impact forces. When apparel 100 is worn during athletic activities, for example, cushioning elements 200 may protect individual 10 from contact with other athletes, equipment, or the ground. With regard to apparel 100, cushioning elements 200 are located in both of pelvic region 101 and leg regions 102 and are positioned, more specifically, to protect the hips, thighs, and tailbone of individual 10. As described in greater detail below, cushioning elements 200 may be incorporated into a variety of different articles of apparel, and cushioning elements 200 may be positioned in various areas of the articles of apparel to protect specific portions (e.g., muscles, bones, joints, impact areas) of individual 10. Additionally, the shapes, sizes, and other properties of cushioning elements 200, as well as the materials and components utilized in cushioning elements 200, may vary significantly to provide a particular level of protection to the specific portions of individual 10.

Cushioning Element Configuration

An example configuration for cushioning element 200 is depicted in FIGS. 6-9B as including a first material layer 210, a second material layer 220, a plurality of pad components 230, and a bonding element 240. First material layer 210 and second material layer 220 cooperatively form an outer surface or covering for cushioning element 200. That is, first material layer 210 and second material layer 220 cooperatively form a pocket or void, in which pad components 230 are located. Whereas second material layer 220 is depicted as having a generally planar configuration, first material layer 210 extends over pad components 230 and also along sides of pad components 230. Bonding element 240 is located between material layers 210 and 220 to join material layers 210 and 220 together. Although cushioning element 200 may be incorporated into apparel 100 in a variety of ways, first material layer 210 may be positioned exterior of second material element 220, such that cushioning element 200 protrudes outward from apparel 100. That is, first material layer 210 may form a portion of exterior surface 105, whereas second material layer 220 may form a portion of both exterior surface 105 and interior surface 106. Alternately, second material layer 220 may be positioned exterior of first material element 210, such that cushioning element 200 protrudes inwardly.

A variety of materials may be utilized for first material layer 210 and second material layer 220, including various textiles, polymer sheets, leather, or synthetic leather, for example. Combinations of these materials (e.g., a polymer sheet bonded to a textile) may also be utilized for material layers 210 and 220. Although material layers 210 and 220 may be formed from the same material, each of material layers 210 and 220 may also be formed from different materials. With regard to textiles, material layers 210 and 220 may be formed from knitted, woven, non-woven, spacer, or mesh textile components that include rayon, nylon, polyester, polyacrylic, elastane, cotton, wool, or silk, for example. Moreover, the textiles may be non-stretch, may exhibit one-directional stretch, or may exhibit multi-directional stretch. Accordingly, a variety of materials are suitable for first material layer 210 and second material layer 220.

Pad components 230 are located between and secured to each of material layers 210 and 220. Each of pad components 230 has a first surface 231 secured to first material layer 210, an opposite second surface 232 secured to second material layer 220, and a side surface 233 that extends between surfaces 231 and 232. Although the shapes of pad components 230 may vary significantly, each of surfaces 231 and 232 are depicted as having an elliptical or generally elongate shape with rounded end areas, and side surface 233 extends in a generally straight fashion between surfaces 231 and 232. Pad components 230 are also depicted as being spaced evenly from each other and arranged in rows, particularly offset rows, but may be spaced or located in a variety of arrangements. An advantage of arranging pad components 230 in offset rows is that the area between pad components 230 is effectively minimized, while retaining a regular spacing between adjacent pad components 230.

A variety of materials may be utilized for pad components 230, including various polymer foam materials that return to an original shape after being compressed. Examples of suitable polymer foam materials for pad components 230 include polyurethane, ethylvinylacetate, polyester, polypropylene, and polyethylene foams. Moreover, both thermoplastic and thermoset polymer foam materials may be utilized. In some configurations of cushioning element 200, pad components 230 may be formed from a polymer foam material with a varying density, or solid polymer or rubber materials may be utilized. Fluid-filled chambers may also be utilized as pad components 230. Also, different pad components 230 may be formed from different materials, or may be formed from similar materials with different densities. As discussed in greater detail below, the polymer foam materials forming pad components 230 attenuate impact forces to provide cushioning or protection. By selecting thicknesses, materials, and densities for each of the various pad components 230, the degree of impact force attenuation may be varied throughout cushioning element 200 to impart a desired degree of cushioning or protection.

The compressible polymer foam materials forming pad components 230 attenuate impact forces that compress or otherwise contact cushioning element 200. When incorporated into apparel 100 or another article of apparel, for example, the polymer foam materials of pad components 230 may compress to protect a wearer from contact with other athletes, equipment, or the ground. Accordingly, cushioning element 200 may be utilized to provide cushioning or protection to areas of individual 10 or other wearers that are covered by cushioning element 200.

Figure 7:
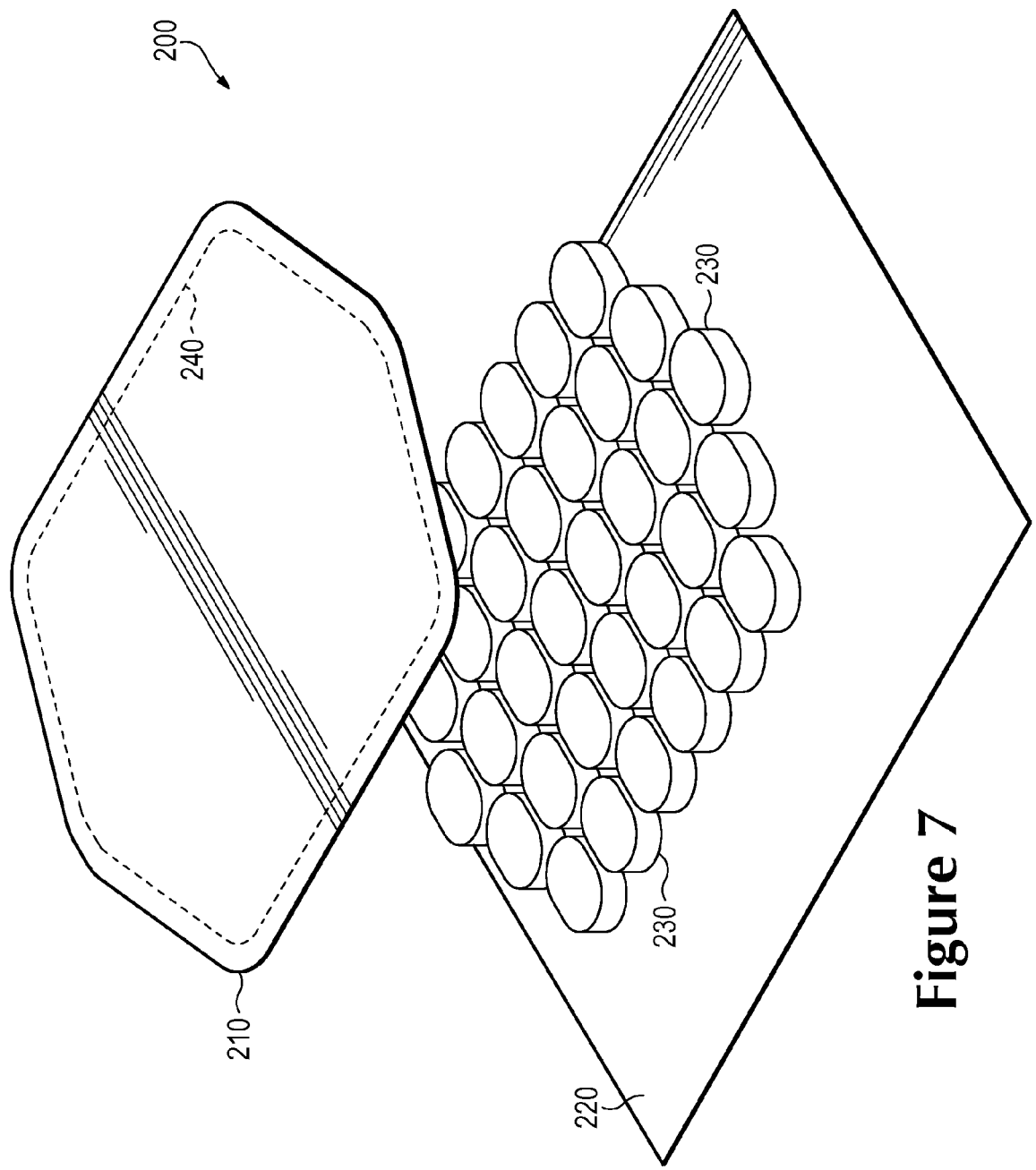
FIG. 7 is an exploded perspective view of the cushioning element.
Figure 8:
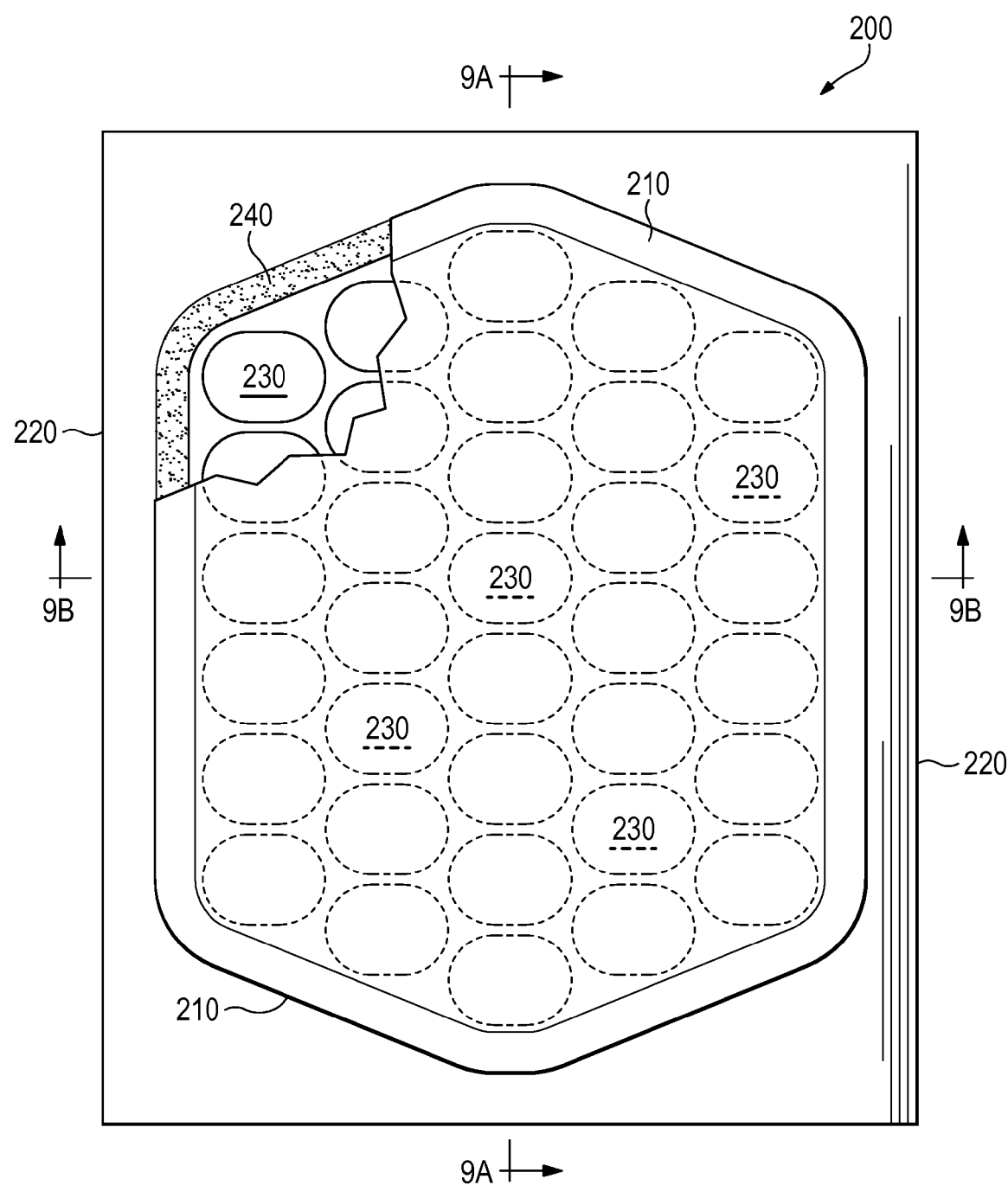
FIG. 8 is a top plan view of the cushioning element.

Bonding element 240 joins material layers 210 and 220 around a perimeter of pad components 230. Referring to FIG. 7, for example, bonding element 240 is located at an edge of first material layer 210 and extends entirely around first material layer 210. Although bonding element 240 is located at a perimeter of first material layer 210, bonding element 240 is absent from a central area of first material layer 210. That is, bonding element 240 has an aperture that exposes the central area of first material layer 210. In effect, therefore, bonding element 240 is absent from the portion of first material layer 210 that joins with pad components 230. In other configurations, however, bonding element 240 may be located in the central area of first material layer 210 and may be utilized to join pad components 230 to first material layer 210.

A variety of materials may be utilized for bonding element 240, including thermoplastic polymer materials (e.g., polyurethane), various adhesives, or heat-activated adhesives, for example. When formed from a thermoplastic polymer material, for example, the application of heat and pressure may be utilized to bond material layers 210 and 220 to each other with bonding element 240. A thermoplastic polymer material melts when heated and returns to a solid state when cooled sufficiently. Based upon this property of thermoplastic polymer materials, thermalbonding processes may be utilized to form a thermalbond that joins material layer 210 and 220. As utilized herein, the term "thermalbonding" or variants thereof is defined as a securing technique between two elements that involves a softening or melting of a thermoplastic polymer material within at least one of the elements such that the materials of the elements are secured to each other when cooled. Similarly, the term "thermalbond" or variants thereof is defined as the bond, link, or structure that joins two elements through a process that involves a softening or melting of a thermoplastic polymer material within at least one of the elements such that the materials of the elements are secured to each other when cooled. With regard to bonding element 240, thermalbonding may involve, for example, the melting or softening of thermoplastic materials within bonding element 240 to join material layers 210 and 220 together. Additionally, thermalbonding does not generally involve the use of stitching or adhesives, but involves directly bonding elements to each other with heat. In some situations, however, stitching or adhesives may be utilized to supplement the thermalbond or the joining of elements through thermalbonding. As an alternative to thermalbonding, an adhesive, a thermally-activated adhesive, or other securing structure may be utilized to join material layers 210 and 220.

In addition to attenuating impact forces, cushioning element 200 has an advantage of simultaneously providing one or more of breathability, flexibility, a relatively low overall mass, and launderability. When incorporated into an article of apparel, such as apparel 100, a wearer may perspire and generate excess heat. By utilizing a permeable textile for material layers 210 and 220 and also forming gaps between adjacent pad components 230, areas for air to enter apparel 100 and for moisture to exit apparel 100 are formed through cushioning element 200. More particularly, air and moisture may pass through material layers 210 and 220 and between pad components 230 to impart breathability to areas of apparel 100 having cushioning element 200. Moreover, the materials and structure discussed above for cushioning element 200 impart flexibility and a low overall mass to cushioning element 200. Furthermore, the materials and structure discussed above for cushioning element 200 permits cushioning element 200 to be laundered without significant shrinkage or warping, even when temperatures associated with commercial laundering processes are utilized. Accordingly, cushioning element 200 may simultaneously provide impact force attenuation, breathability, flexibility, a relatively low overall mass, and launderability to an article of apparel.

Manufacturing Process

A variety of techniques may be utilized to manufacture cushioning element 200. With reference to FIG. 10, a manufacturing apparatus 300 is disclosed as including a die 310, an extractor 320, a heating plate 330, and a press plate 340. The configurations depicted in FIG. 10 and discussed below for manufacturing apparatus 300 are intended to provide an example of a manufacturing apparatus that may be utilized in the manufacture of cushioning element 200. A variety of other manufacturing apparatuses that operate in a similar manner may also be utilized.

Die 310 includes a base 311, a plurality of die elements 312, a plurality of ejection members 313, and a pair of registration pegs 314. Base 311 is formed from a durable and rigid material, such as steel or aluminum, to provide a foundation for die 310. Die elements 312 extend outward (e.g., upward) from base 311 and exhibit a general shape of pad components 230. More particularly, an interior area of each die element 312 has the general shape of an individual pad component 230. As discussed in greater detail below, edges 315 (e.g., upper edges) of die elements 312 are utilized to cut through a material that forms pad components 230, thereby shaping and forming each of pad components 230. Edges 315 may generally have a sharpened configuration that assists with cutting through the material that forms pad components 230. Ejection members 313 are located within the interior areas of each die element 312 and are spaced (e.g., spaced downward) from edges 315. As an example, ejection members 313 may be formed from a polymer foam material with lesser compressibility than a polymer foam material forming pad components 230. Additionally, registration pegs 314 extend outward (e.g., upward) from base 311.

In addition to having the general shape of pad components 230, die elements 312 are arranged or otherwise located relative to each other in the same manner as pad components 230. As noted above, pad components 230 are depicted as being spaced evenly from each other and arranged in offset rows. Similarly, die elements 312 are spaced evenly from each other and arranged in offset rows. That is, die elements 312 are arranged in a configuration that corresponds with the positions of pad components 230 in cushioning element 200. If, however, a different arrangement is desired for pad components 230, then die elements 312 may be moved or otherwise repositioned to correspond with the different arrangement.

Extractor 320 includes a base 321, a plurality of extractor elements 322, a pair of registration apertures 323, and an extractor sheet 324. Base 321 is formed from a durable and rigid material, such as steel or aluminum, to provide a foundation for extractor 320. Extractor elements 322 have the configurations of pins that extend outward (e.g., downward) from base 321 and have sharpened or pointed end areas. As discussed in greater detail below, extractor elements 322 assist with retaining the positions of pad components 230 upon removal from die 310. As an alternative to pins, extractor elements 322 (a) may have the configurations of needles, nails, spikes, or prongs or (b) may be a vacuum system that retains the positions of pad components 230 upon removal from die 310, for example Accordingly, extractor elements 322 are any device or system that may be used to secure pad components 230 to extractor 320 and assist with retaining the positions of pad components 230 upon removal from die 310. Additionally, registration apertures 323 form holes in base 321 that are positioned to correspond with and receive registration pegs 314.

The positions of extractor elements 322 correspond with the locations of die elements 312. Moreover, extractor elements 322 are arranged or otherwise located relative to each other in the same manner as die elements 312, and die elements 313 are arranged or otherwise located relative to each other in the same manner as pad components 230. That is, extractor elements 322 are arranged in a configuration that corresponds with the positions of pad components 230 in cushioning element 200. If, however, a different arrangement is desired for pad components 230, then extractor elements 322 and die elements 312 may be moved or otherwise repositioned to correspond with the different arrangement.

Extractor sheet 324 lays adjacent to base 321 and includes a plurality of apertures that receive extractor elements 322.

That is, extractor elements 322 extend through the apertures in extractor sheet 324. A variety of materials may be utilized for extractor sheet 324, including various polymer materials and metals.

Heating plate 330 includes a base 331 that may also be formed from a durable and rigid material, such as steel or aluminum, and incorporates heating elements. More particularly, electric coils may extend through base 331 to heat base 331 to temperatures that bond (a) pad components 230 to material layers 210 and 220 and (b) material layers 210 and 220 to each other with bonding element 240. As an alternative, base 331 may incorporate fluid channels through which a heated fluid passes, or radiant heaters, radio frequency emitters, or other devices may be utilized. In some configurations of heating plate 330, a surface of base 331 that contacts portions of cushioning element 200 during the manufacturing process may incorporate a rubber or silicone material.

Press plate 340 includes a base 341 and a compressible material 342. As with bases 311, 321, and 331, base 341 may be formed from a durable and rigid material, such as steel or aluminum. Compressible material 342 is recessed within a surface of base 341 and is formed from a material (e.g., silicone, polymer foam) that compresses or deforms when a force is applied and returns to an original shape when the force is removed. Although a single element of compressible material 342 is depicted, some configurations may incorporate multiple elements of compressible material 342 with different degrees of compressibility, depending upon the configuration of cushioning element 200 that is being manufactured.

Figure 11A:
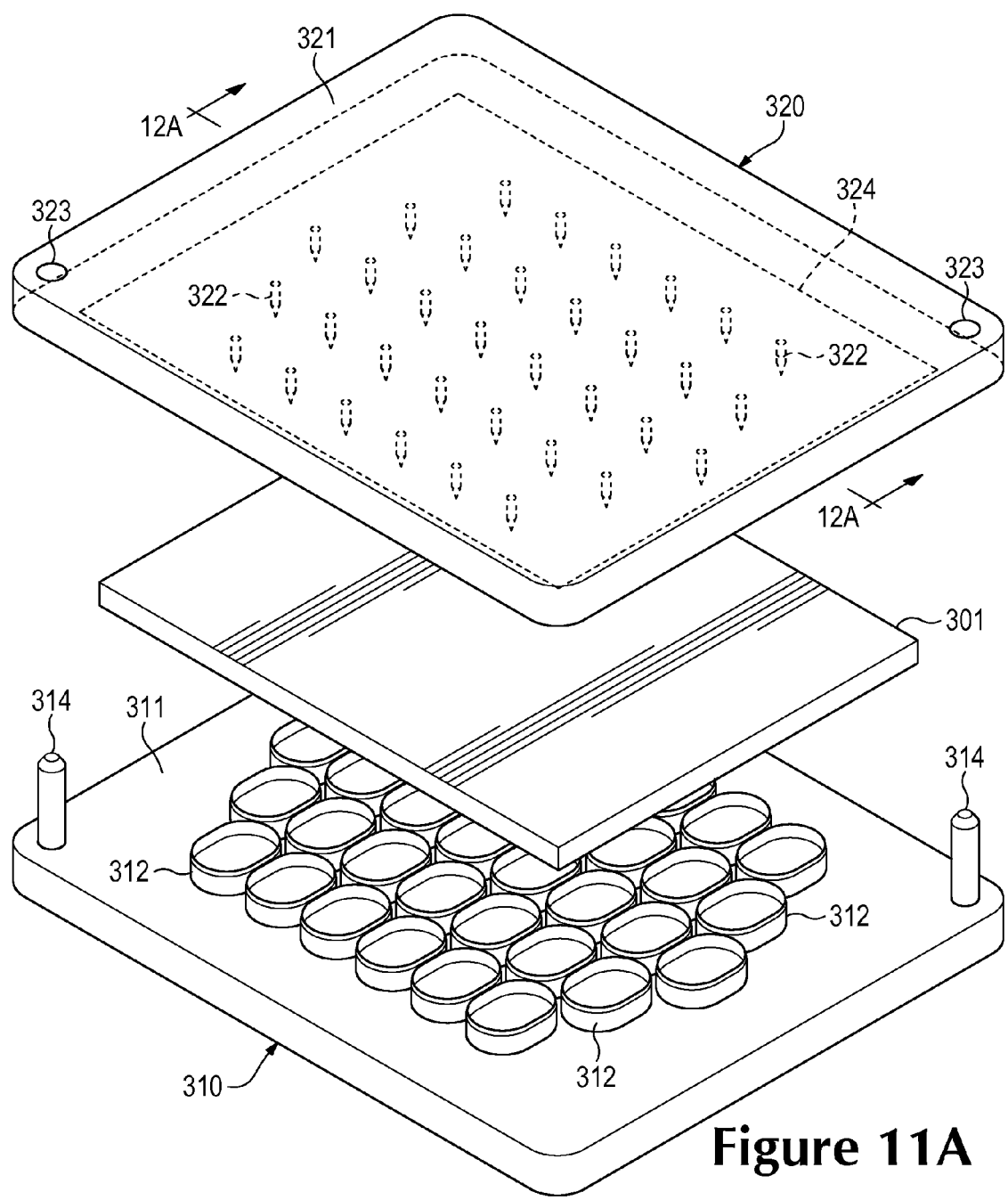
FIGS. 11A-11K are schematic perspective views of the manufacturing process.
Figure 11B:
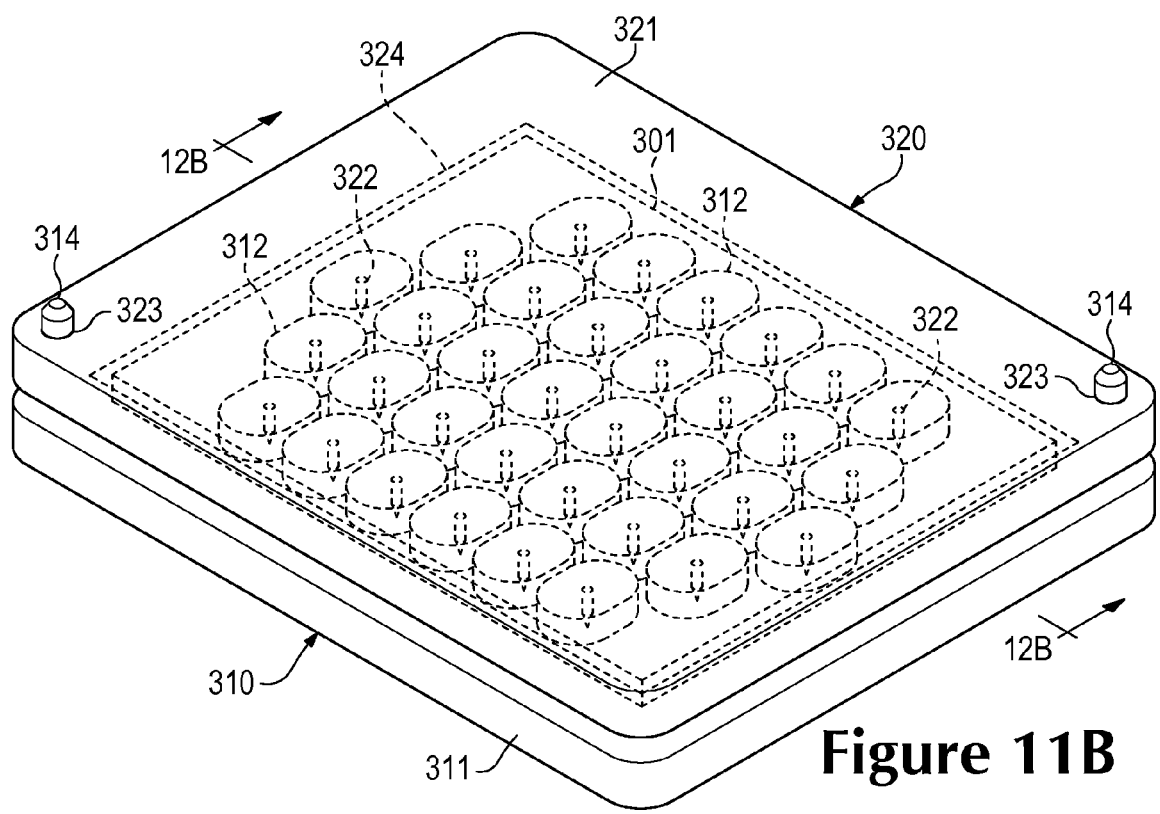
Figure 11C:
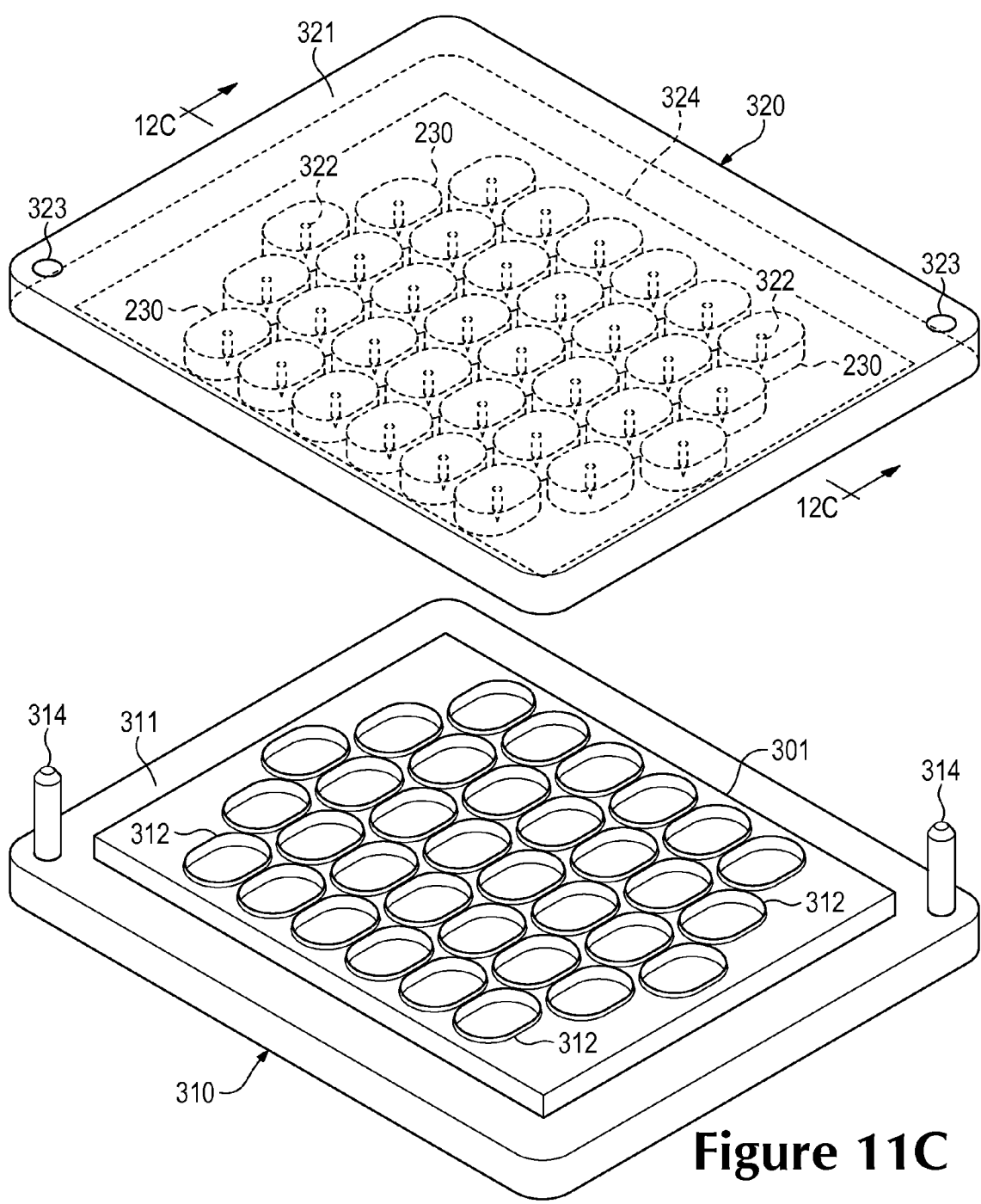

With reference to FIGS. 11A-11K and 12A-12K, an example of a suitable manufacturing process utilizing manufacturing apparatus 300 is disclosed. Initially, die elements 312 are arranged in a configuration that corresponds with the positions of pad components 230 in cushioning element 200, and extractor elements 322 are arranged in a configuration that corresponds with the positions of die elements 312 and pad components 230 in cushioning element 200. A blank 301 is then placed between die 310 and extractor 320, as depicted in FIGS. 11A and 12A. Blank 301, from which pad components 230 are cut, is formed from the same material as pad components 230 and has a thickness of pad components 230. Once blank 301 is positioned, die 310 and extractor 320 close upon, compress, and cut blank 301, as depicted in FIGS. 11B and 12B. More particularly, (a) blank 301 is compressed against die elements 312 such that edges 315 pierce and cut through blank 301 and (b) extractor elements 322 pierce and enter blank 301. Note that extractor elements 322 are positioned to correspond with each of die elements 312 and enter the interior area of each of die elements 312, which is where ejection members 313 are located. Depending upon the lengths of extractor elements 322, end areas of extractor elements 322 may pass through blank 301 and pierce ejection members 313 during this operation. In order to ensure that die elements 312 properly align with extractor elements 322, registration pegs 314 are aligned with and enter registration apertures 323.

Figure 12A:
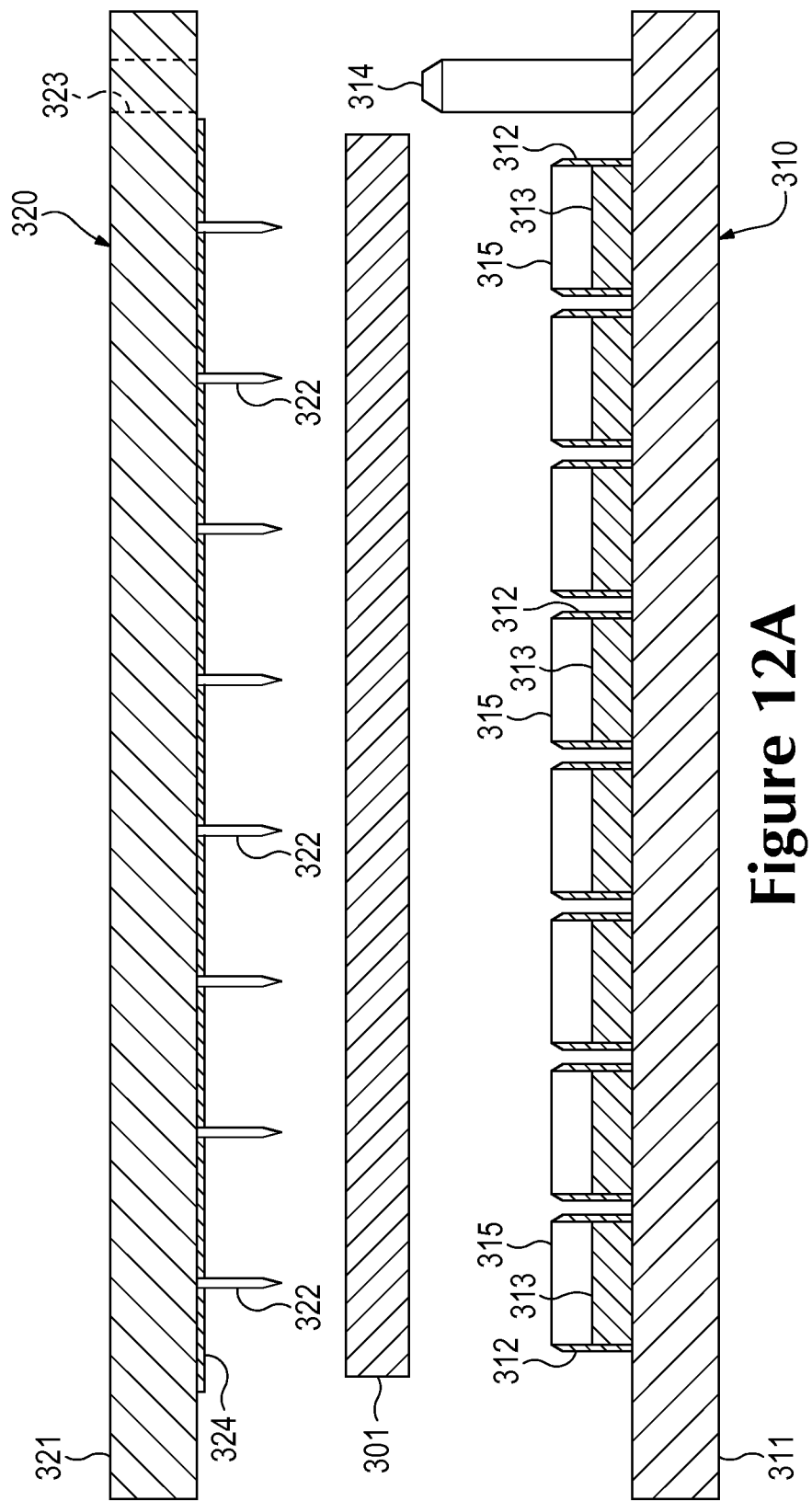
FIGS. 12A-12K are schematic cross-sectional views of the manufacturing process, as respectively defined by section lines 12A-12K in FIGS. 11A-11K.
Figure 12B:
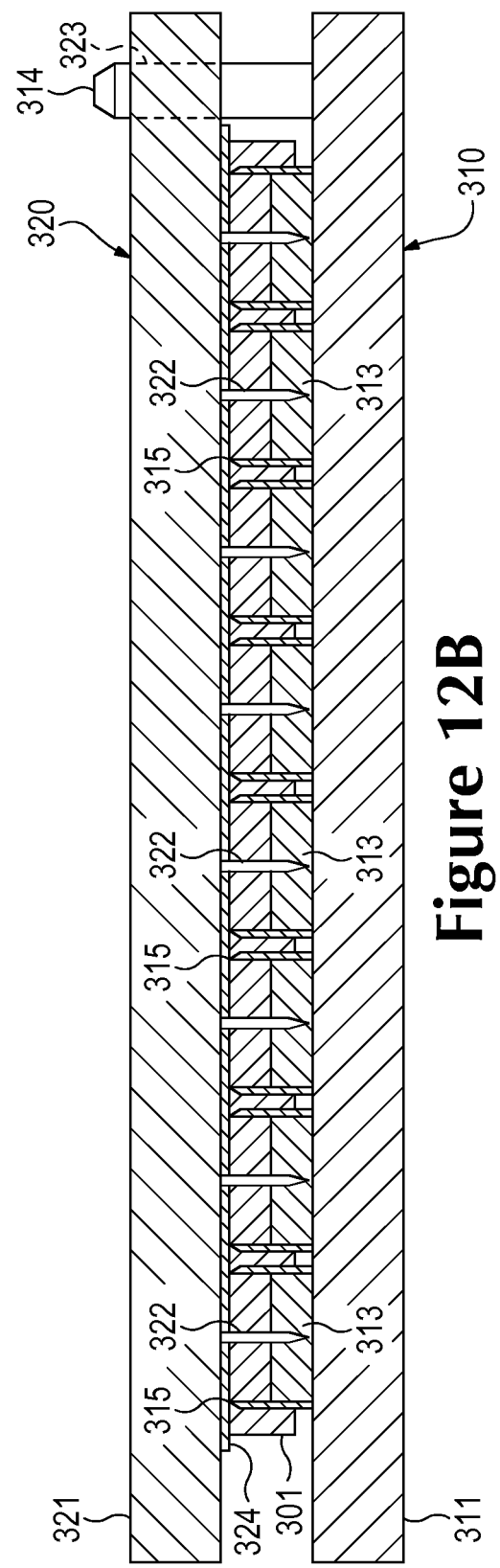
Figure 12C:
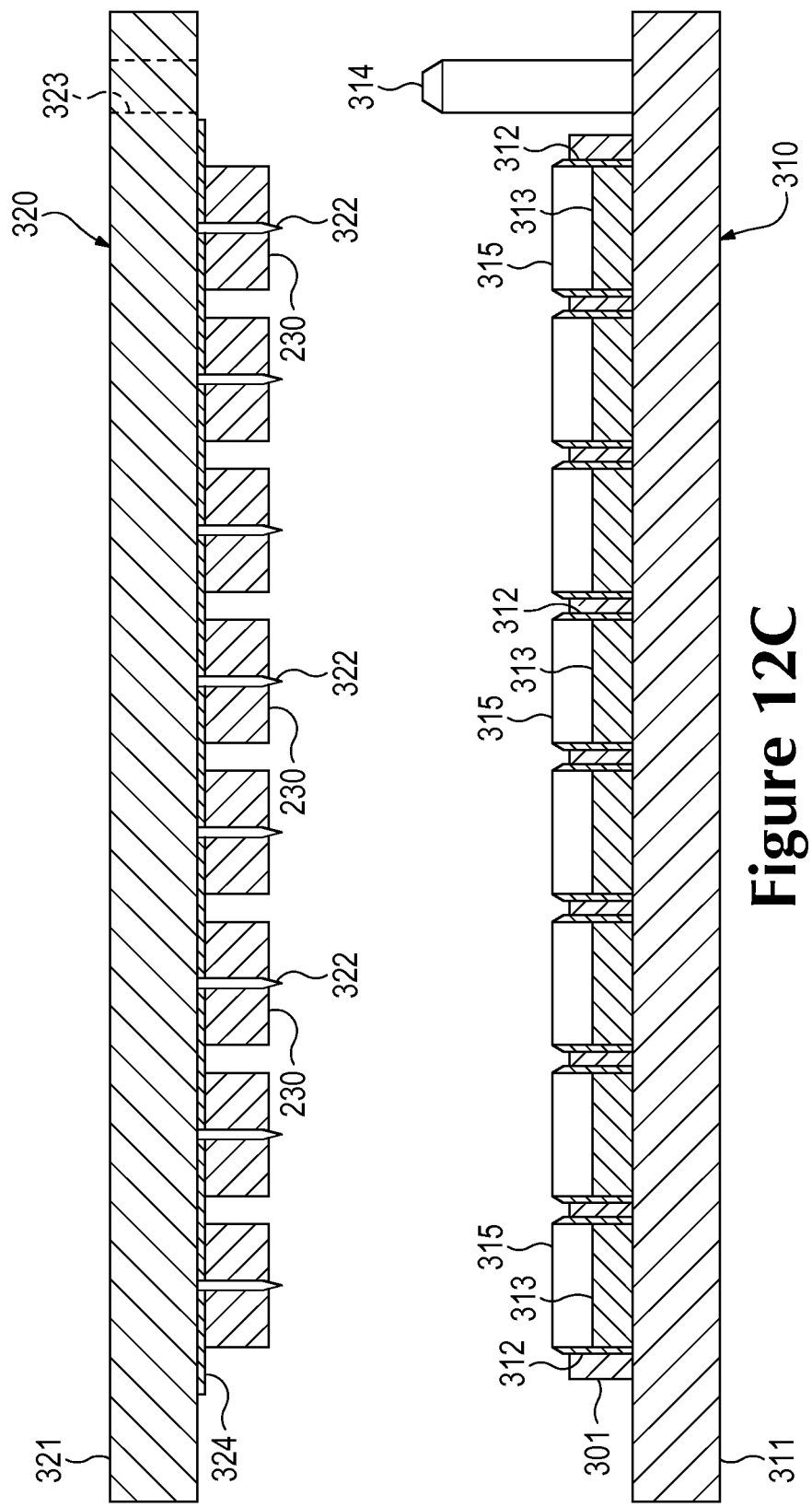

At this stage of the process, die elements 312 have effectively cut through blank 301. Referring to FIG. 12B, edges 315 of die elements 312 pass entirely through blank 301 to rest against a surface of extractor sheet 324. As noted above, the interior area of each die element 312 has the general shape of an individual pad component 230. Accordingly, the individual pad components 230 are located within die elements 312 and are compressed between a surface of extractor sheet 324 and ejection members 313. As depicted in FIGS. 11C and 12C, die 310 and extractor 320 then separate to remove pad components 230 from within die elements 312, and pad components 230 are secured to extractor 320 by the various extractor elements 322. Referring again to FIG. 12B, portions of blank 301 within die elements 312 (i.e., the portions forming pad components 230) are compressed more than portion of blank 301 that are exterior of die elements 312. That is, portions of blank 301 within die elements 312 are compressed against ejection members 313. When die 310 and extractor 320 separate, the compression of pad components 230 causes pad components 230 to expand outward from die elements 312 and remain properly positioned on extractor elements 322. As a result, pad components 230 remain secured to extractor elements 322 upon the separation of die 310 and extractor 320. Additionally, note that blank 301 may remain within die 310 (i.e., around the various die elements 312) at this stage, or may be separated from die 310, and also that blank 301 defines various apertures where pad components 230 were removed.

Referring to FIG. 12C, extractor elements 322 extend through and protrude from pad components 230. An advantage of this configuration is that extractor elements 322 may have a length that is suitable for a variety of thicknesses in pad components 230. As described in greater detail below, extractor elements 322 may also have a configuration that retracts into base 321, thereby facilitating future bonding steps or accommodating configurations where pad components 230 have different thicknesses.

As a summary of the manufacturing process up to this point, pad components 230 have effectively been removed from blank 301. More particularly, (a) die elements 312 were utilized to cut through blank 301 to form pad components 230 and (b) pad components 230 are removed from die elements 312 and remain secured to extractor 320 due to the presence of extractor elements 322, which extend into the various pad components 230. Additionally, pad components 230 are positioned and oriented in the same manner as die elements 312 and are, therefore, positioned and oriented as within cushioning element 200. Accordingly, pad components 230 have been removed from blank 301 and are positioned and oriented to be incorporated into cushioning element 200.

Figure 11D:
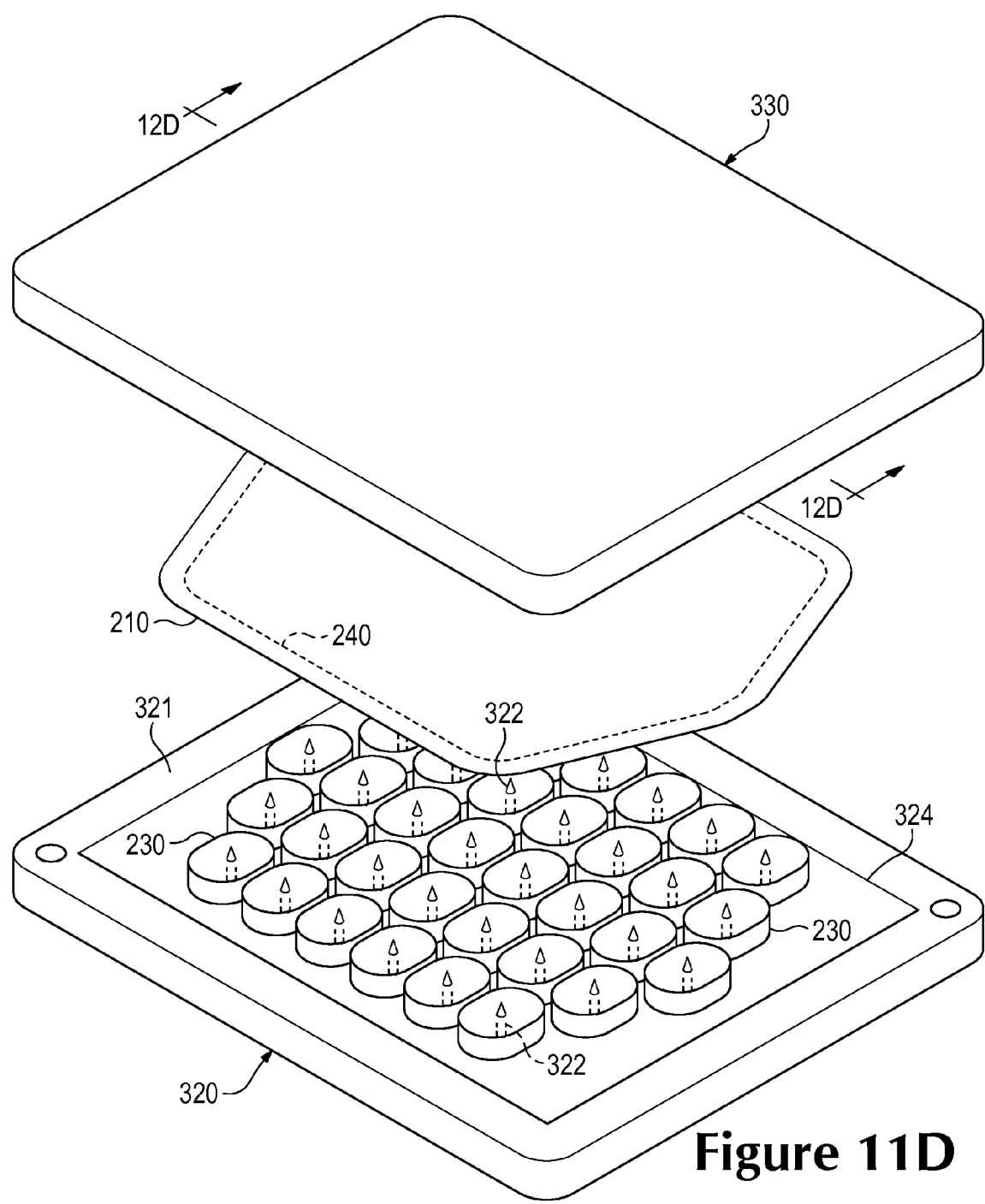
Figure 11E:
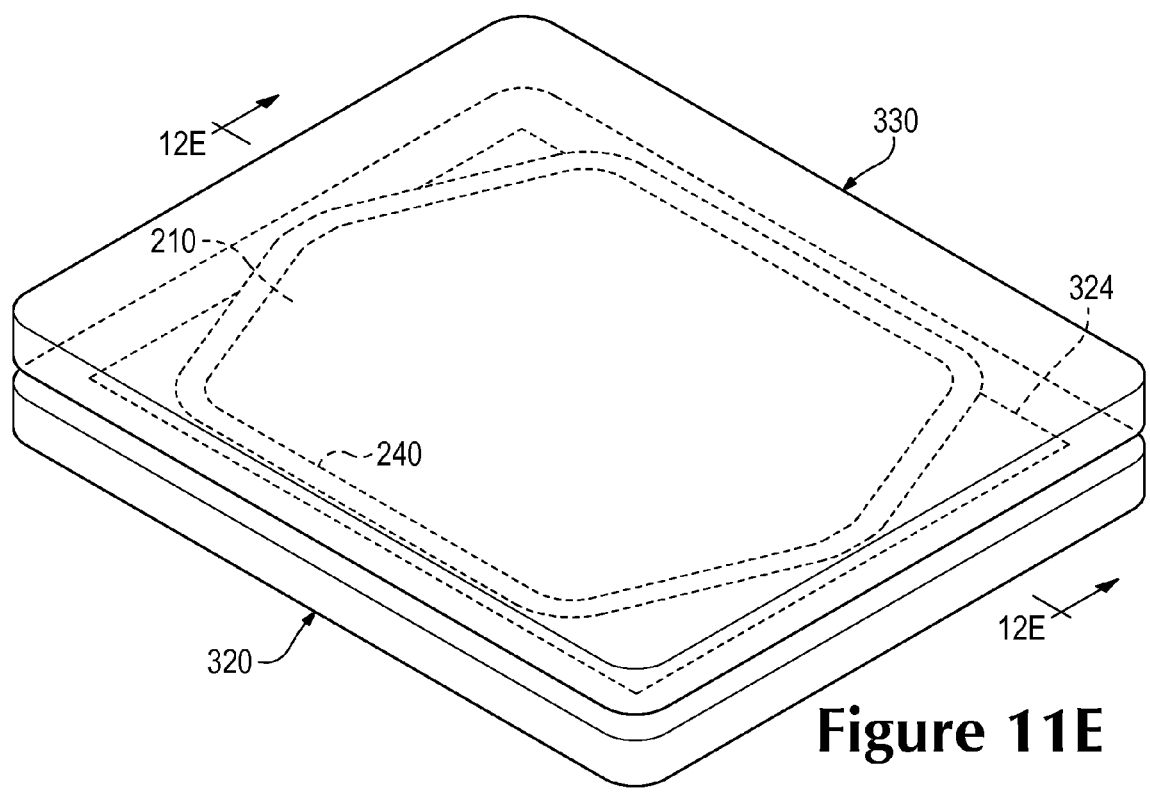
Figure 12D:
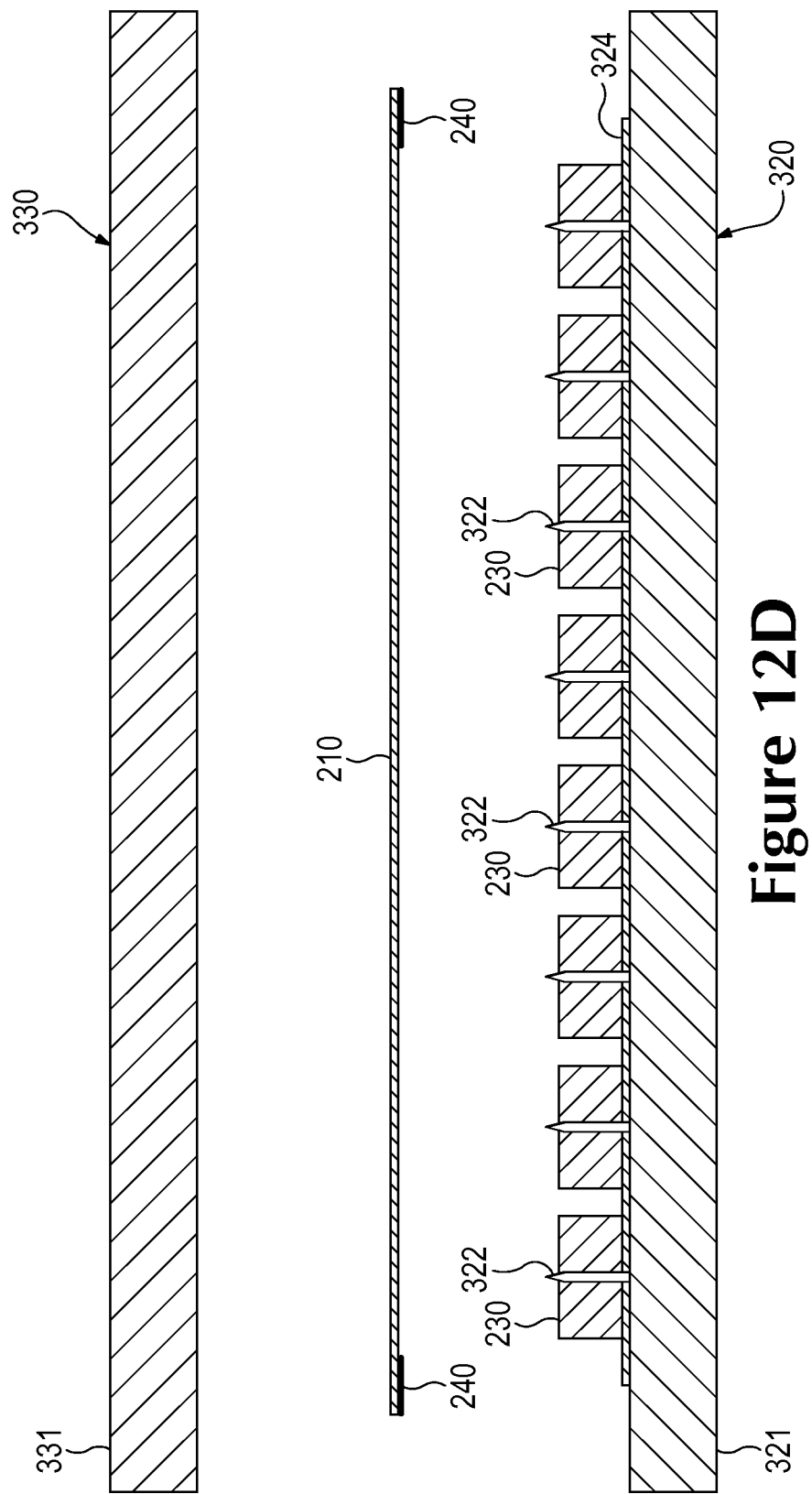
Figure 12E:
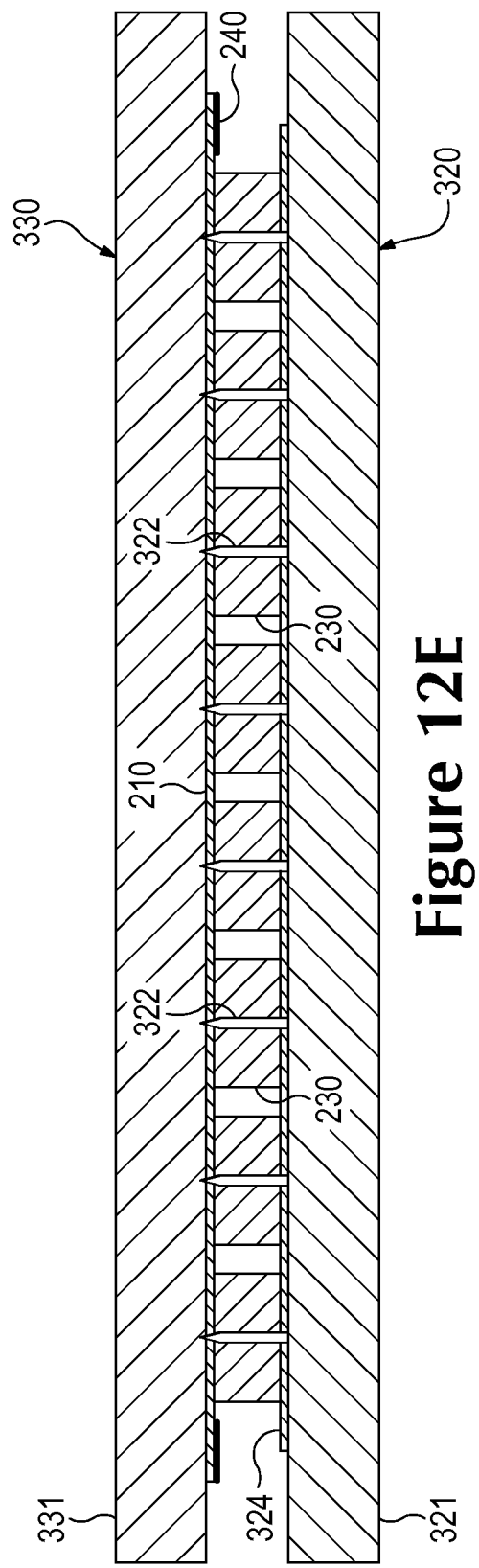

The combination of extractor 320 and pad components 230 is then positioned adjacent to heating plate 330, as depicted in FIGS. 11D and 12D. Additionally, first material layer 210 is placed between pad components 230 and heating plate 330. Extractor 320 and heating plate 330 then close upon and compress first material layer 210 and pad components 230, as depicted in FIGS. 11E and 12E. As discussed above, base 331 of heating plate 330 incorporates heating elements. As such, the temperature of base 331 may be elevated to a point where bonding occurs between first material layer 210 and pad components 230. Although extractor elements 322 are depicted as protruding into heating plate 330, extractor elements 322 may have a retractable configuration that retracts into base 321.

When compressed between extractor 320 and heating plate 330, energy from heating plate 330 may be utilized to bond first material layer 210 and pad components 230 to each other. As discussed above, a thermoplastic polymer material melts when heated and returns to a solid state when cooled sufficiently. Based upon this property of thermoplastic polymer materials, thermalbonding processes may be utilized to form a thermalbond that joins first material layer 210 are pad components 230. In this context, thermalbonding may involve, for example, (a) the melting or softening of thermoplastic materials within either of first material layer 210 and pad components 230 that joins the elements together, (b) the melting or softening of a thermoplastic material within pad components 230 such that the thermoplastic polymer material extends into or infiltrates the structure of a textile utilized for first material layer 210, or (c) the melting or softening of a thermoplastic material within first material layer 210 such that the thermoplastic polymer material extends into or infiltrates the structure of pad components 230. Thermalbonding may occur when only one element includes a thermoplastic polymer material or when both elements include thermoplastic polymer materials. Additionally, thermalbonding does not generally involve the use of stitching or adhesives, but involves directly bonding elements to each other with heat. In some situations, however, stitching or adhesives may be utilized to supplement the thermalbond or the joining of elements through thermalbonding. As an alternative to thermalbonding, an adhesive, a thermally-activated adhesive, or other securing structure may be utilized to join first material layer 210 and pad components 230.

As discussed above, a surface of base 331 that contacts portions of cushioning element 200 during the manufacturing process may incorporate a rubber or silicone material. Referring to FIG. 12E, extractor elements 322 are spaced from and do not contact base 331. In situations where the compression of first material layer 210 and pad components 230 induces extractor elements 322 to contact base 331, the rubber or silicone material may be present to receive end areas of extractor elements 322. That is, the end areas of extractor elements 322 may pierce and enter the rubber or silicone material during the compression of first material layer 210 and pad components 230.

Figure 11F:
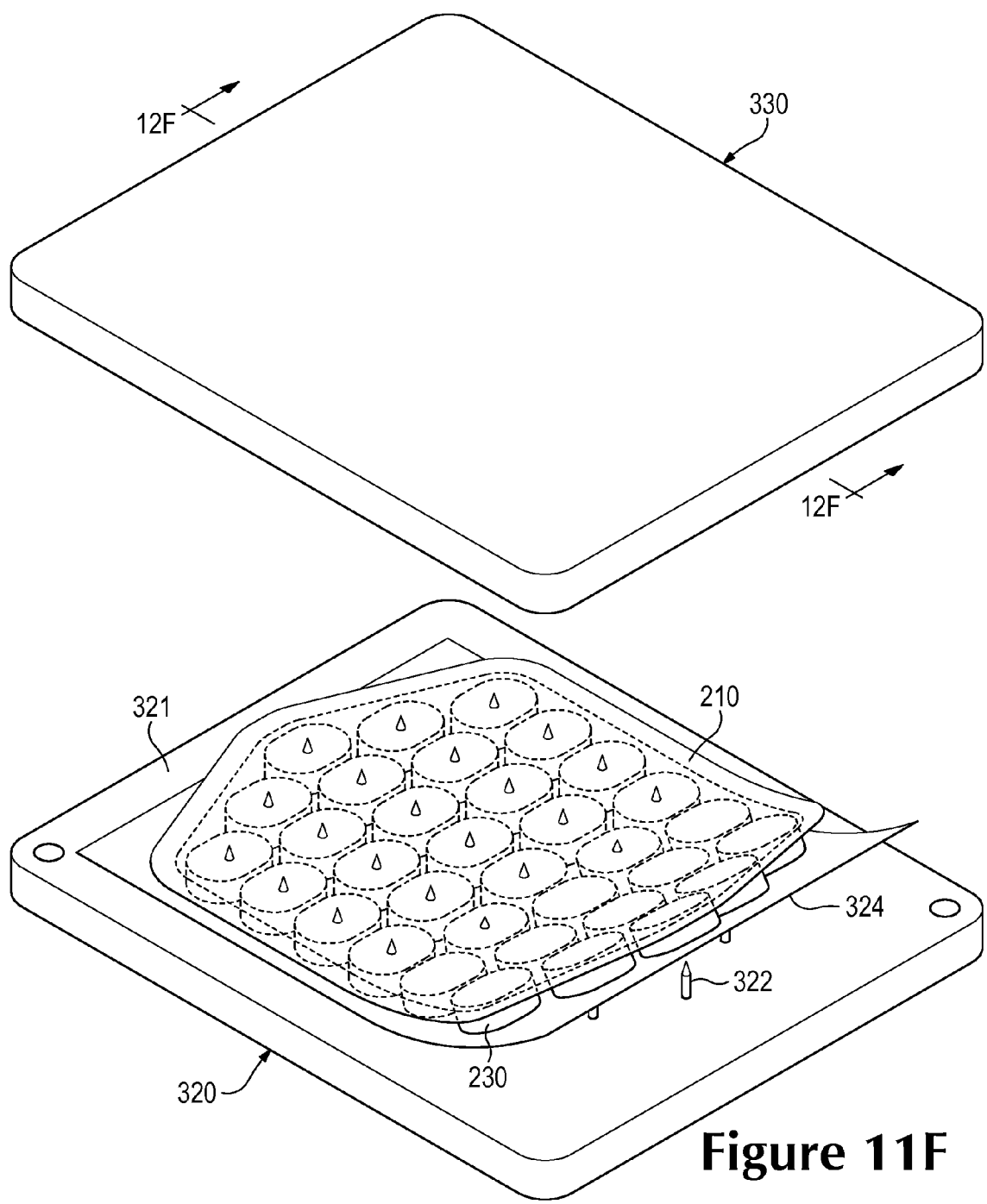
Figure 11G:
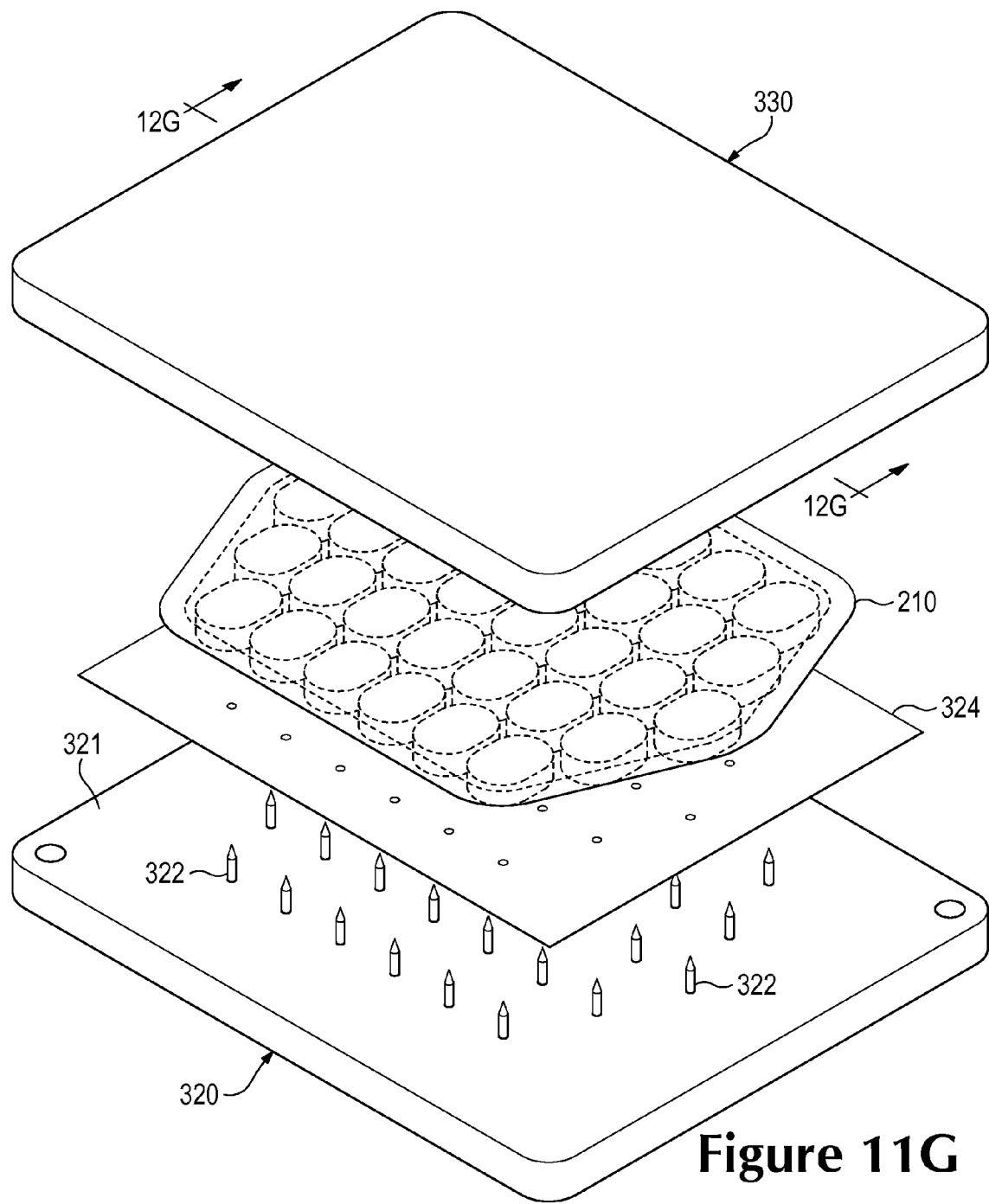
Figure 12F:
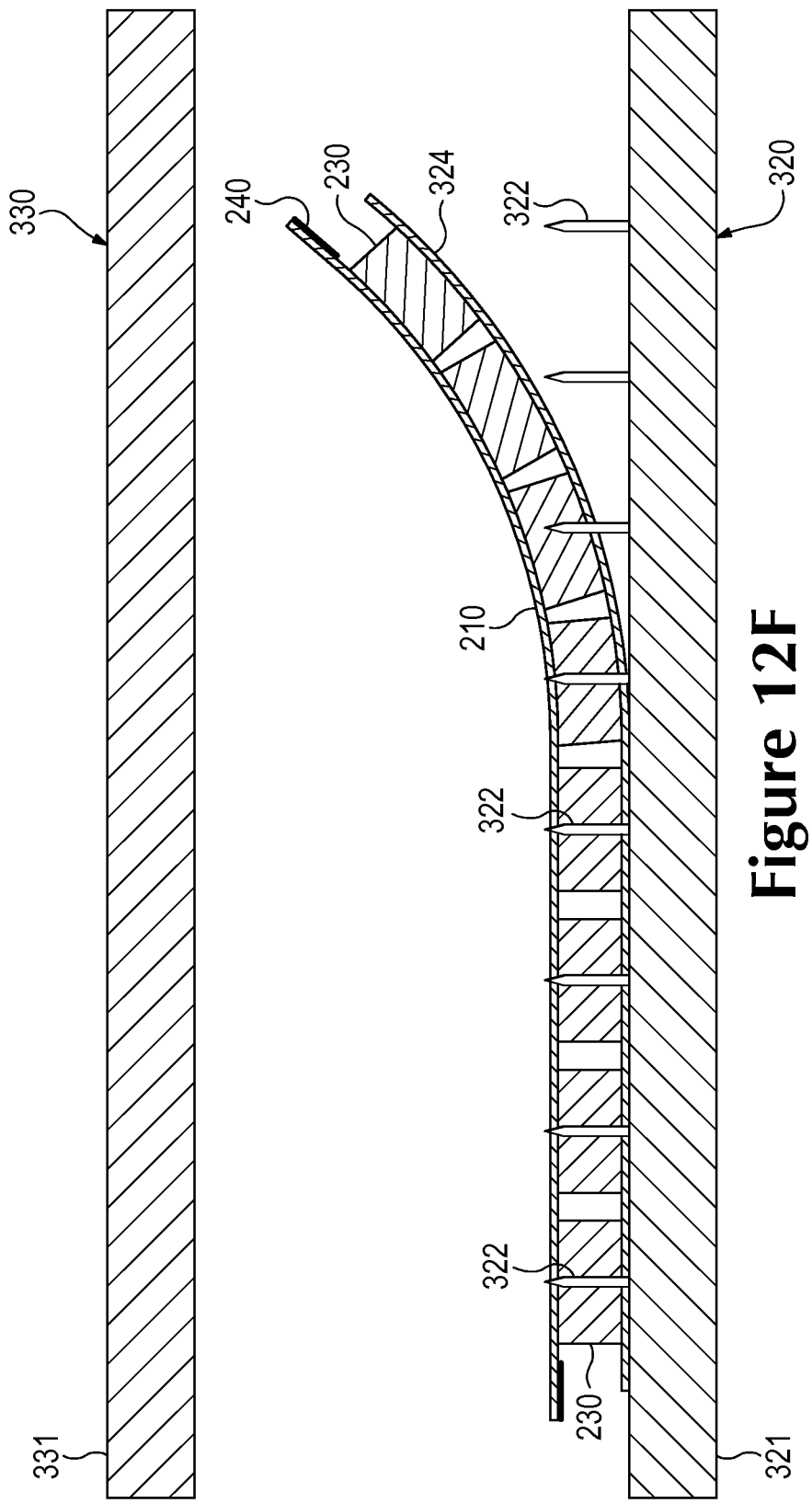
Figure 12G:
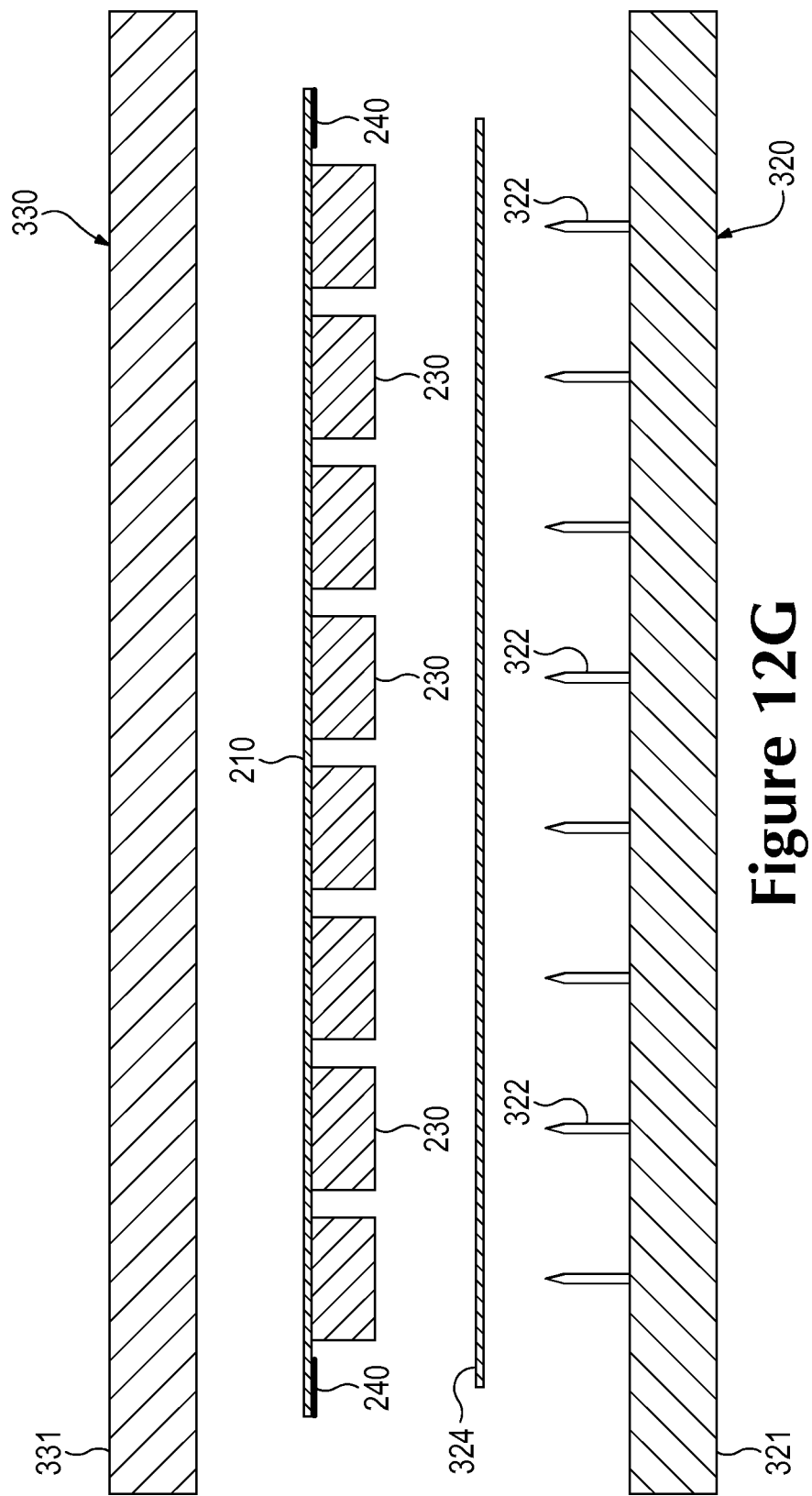

Following compression and bonding, extractor 320 and heating plate 330 separate to expose the bonded first material layer 210 and pad components 230. At this stage, the thermoplastic material, adhesive, or other element that joins first material layer 210 and pad components 230 may have an elevated temperature or may not be fully cured. In order to prevent separation between first material layer 210 and pad components 230, extractor sheet 324 may be pulled from base 321, which effectively pushes pad components 230 from extractor elements 322, as depicted in FIGS. 11F and 12F. That is, extractor sheet 324 is separated from extractor elements 322 to push pad components 230 from extractor 320. Upon fully separating extractor sheet 324 from extractor elements 322, the combination of first material layer 210 and pad components 230 is free from extractor 320, as depicted in FIGS. 11G and 12G.

Figure 11H:
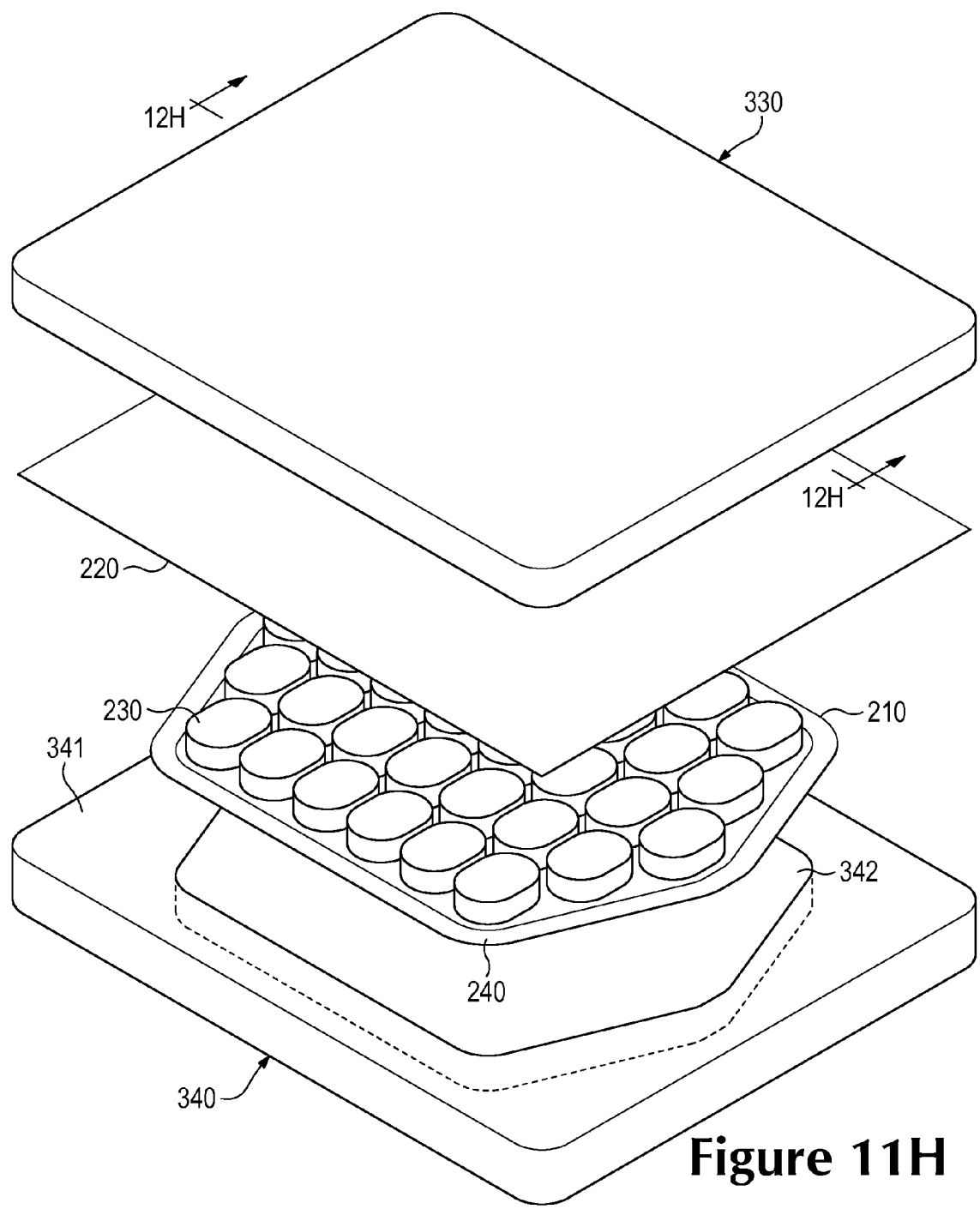
Figure 11I:
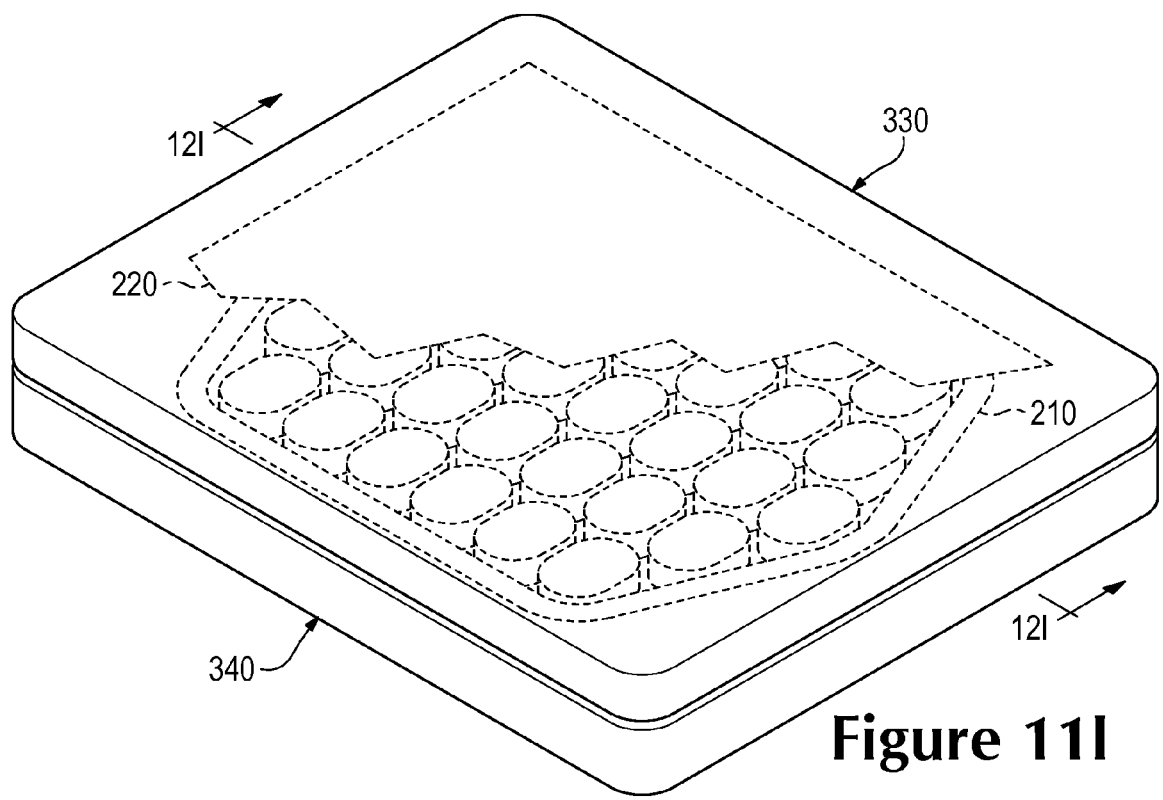
Figure 12H:
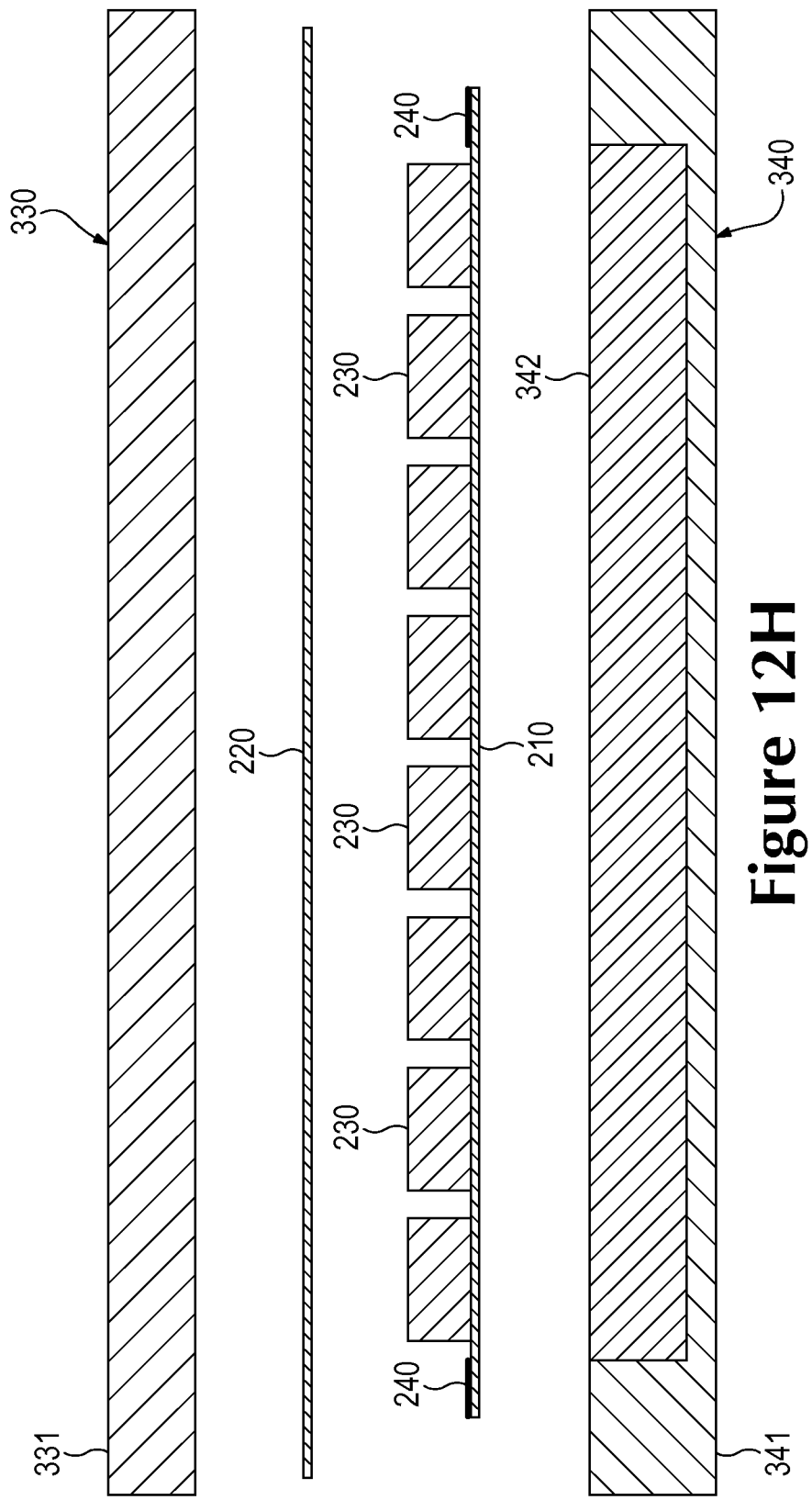
Figure 12I:
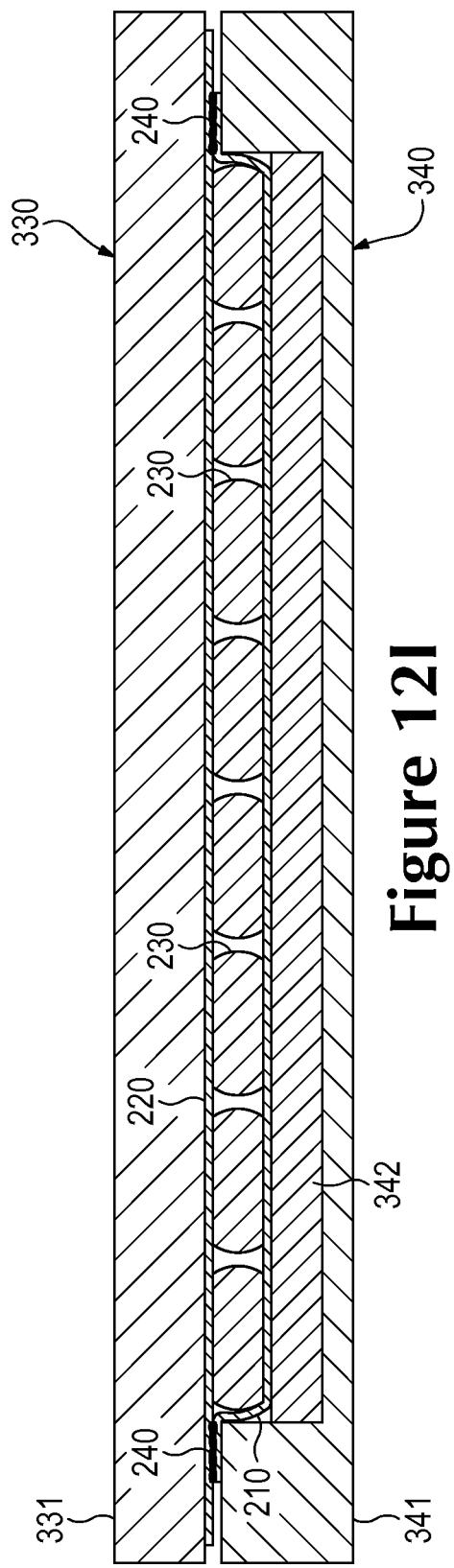

Continuing with the manufacturing of cushioning element 200, second material layer 220 is then placed adjacent to heating plate 330, the combination of first material layer 210 and pad components 230 is turned over or otherwise oriented such that pad components 230 are between material layers 210 and 220, and press plate 340 is located adjacent to first material layer 210, as depicted in FIGS. 11H and 12H. Press plate 340 and heating plate 330 then close upon and compress first material layer 210, second material layer 220, and pad components 230, as depicted in FIGS. 11I and 12I. Given the elevated temperature of base 331, bonding (e.g., thermalbonding) occurs between second material layer 220 and pad components 230.

In addition to bonding second material layer 220 and pad components 230, material layers 210 and 220 are bonded (e.g., thermalbonded) with bonding element 240. Pad components 230 are positioned to correspond with the location of compressible element 342, as depicted in FIG. 12I. When compressed, the thicknesses of pad components 230 and compressible element 342 are reduced, thereby allowing base 331 and base 341 to compress bonding element 240 between material layers 210 and 220. By compressing these elements together, coupled with heat from base 331, second material layer is bonded (e.g., thermalbonded) to bonding element 240. In effect, therefore, material layers 210 and 220 are bonded together with bonding element 240. In configurations where pad components 230 have varying thicknesses, for example, multiple elements of compressible material 342 with different degrees of compressibility may be utilized to ensure that all elements of cushioning element 200 are properly bonded.

Figure 11J:
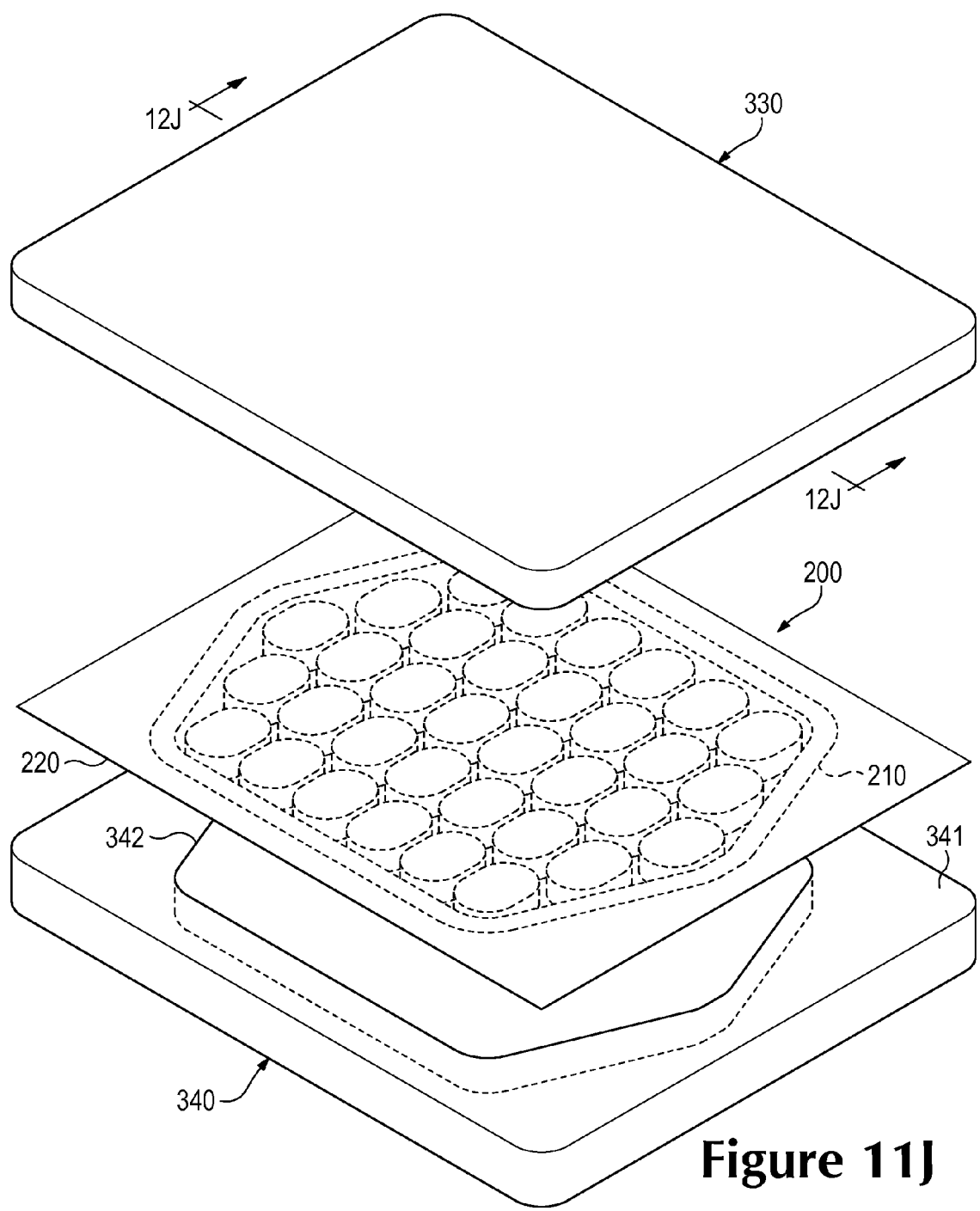
Figure 11K:
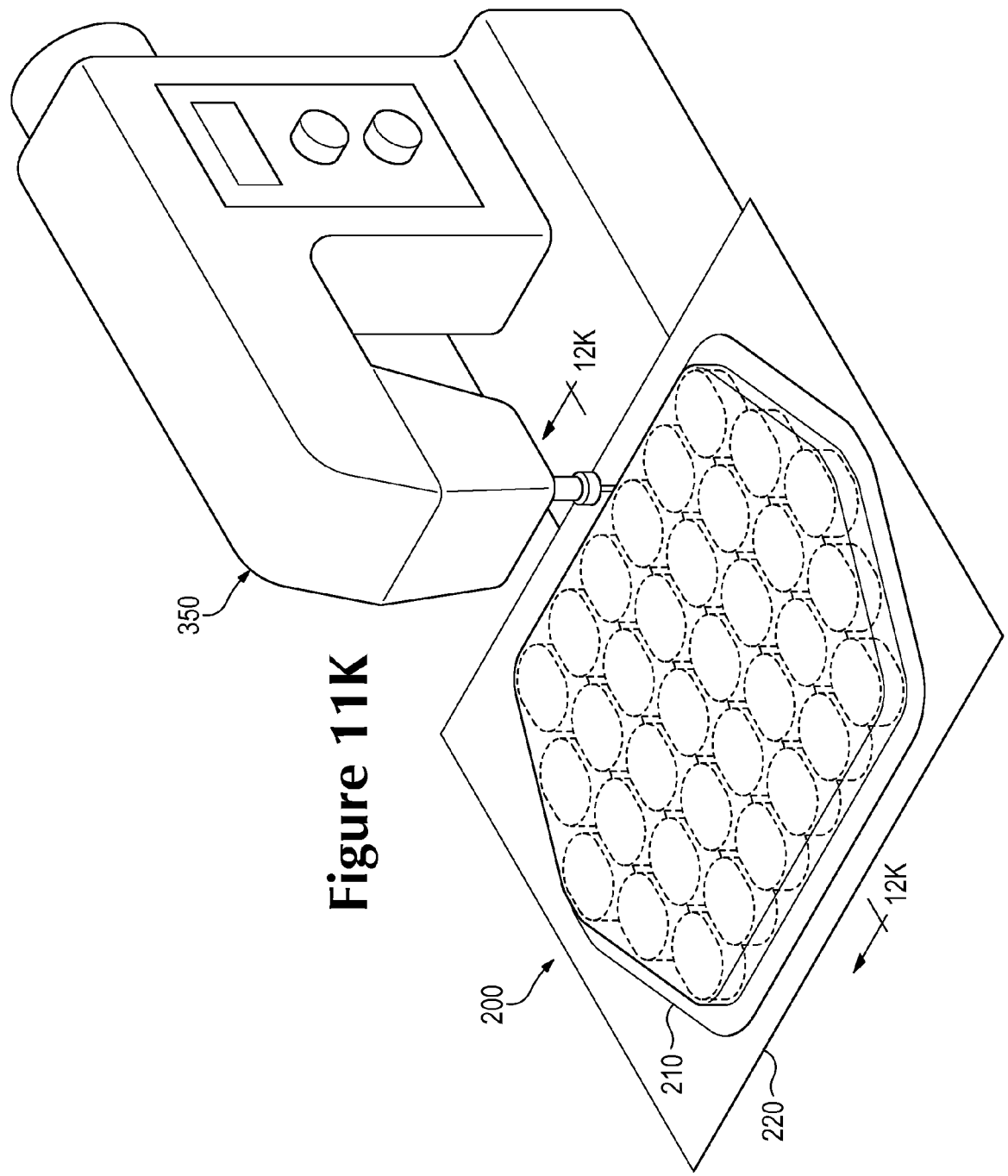
Figure 12J:
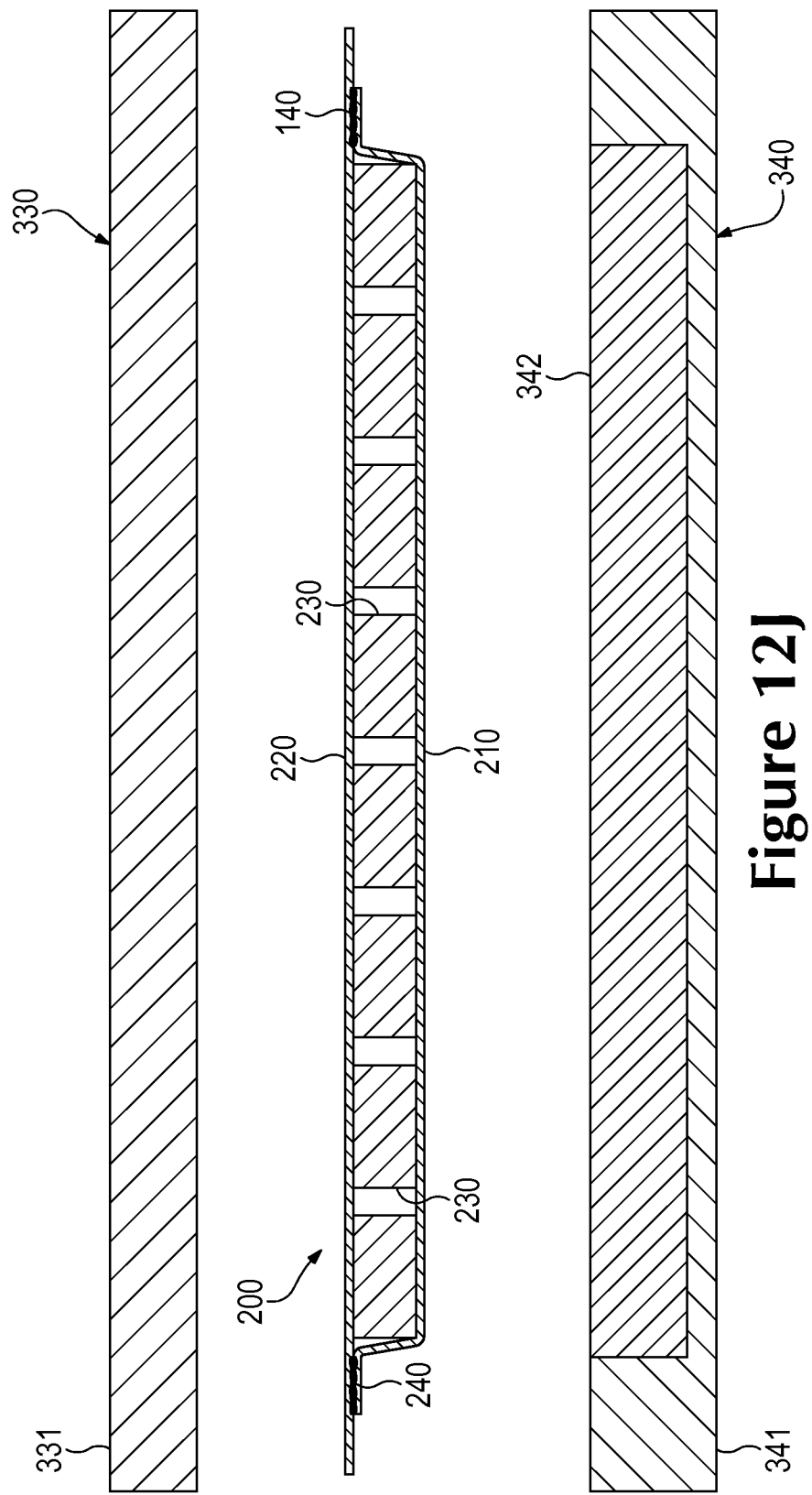
Figure 12K:
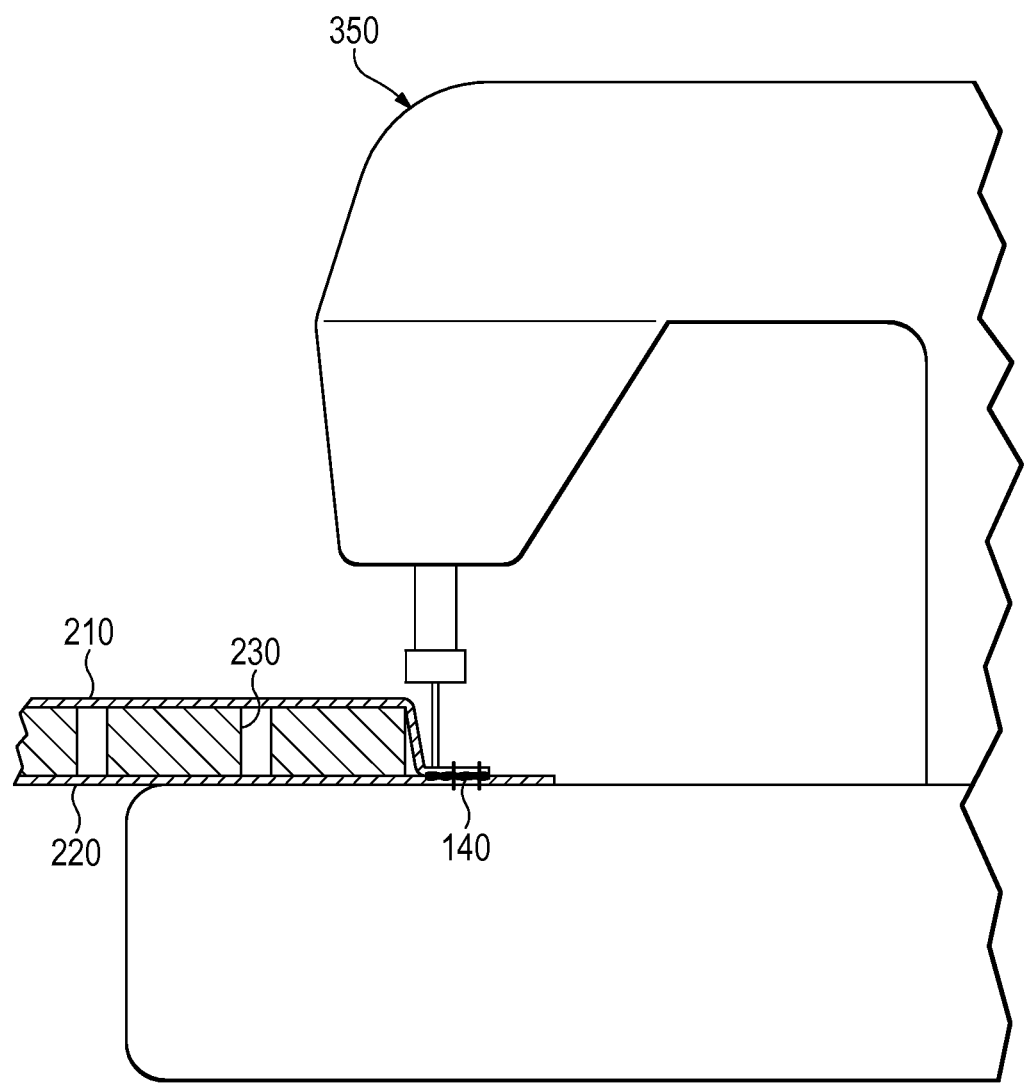

Once compression and bonding are complete, heating plate 330 and press plate 340 separate to expose the bonded first material layer 210, second material layer 220, and pad components 230, as depicted in FIGS. 11J and 12J. At this stage of the manufacturing process, the manufacture of cushioning element 200 is effectively complete.

The above discussion of FIGS. 11A-11J and 12A-12J provides an example of a suitable manufacturing process for cushioning element 200. In general, an advantage of the manufacturing process is that the arrangement of die elements 312 determines the resulting arrangement of pad components 230 in cushioning element 200. That is, die 310 is initially set such that die elements 312 are positioned in a particular arrangement, and the resulting positions of pad components 230 effectively mirrors the arrangement of die elements 312. Accordingly, the positions of pad components 320 may be pre-selected through the arrangement of die elements 312.

An additional advantage of the manufacturing process is that all the elements of cushioning element 200 may be joined through thermalbonding without the need for additional manufacturing steps. In some configurations, however, optional stitching, adhesive, or thermalbonding steps may be utilized to supplement the joining of material layers 210 and 220 around the periphery of pad components 230. As an example, referring to FIGS. 11K and 12K, a sewing or stitching machine 350 may be utilized to further secure material layers 210 and 220 to each other. Additionally, sewing or stitching machine 350 may be utilized to incorporate cushioning element 200 into apparel 100 or another article.

A variety of other manufacturing processes or variations of the manufacturing process discussed above may also be utilized. For example, extractor elements 322 may retract such that extractor 320 may also be utilized as press plate 340. In other configurations, ejection material 313 may be absent or a mechanized ejector may be utilized within die elements 312. Moreover, extractor elements 322 may be removable or positioned in various locations to allow different configurations of pad components 230. Moreover, specialized machinery may be formed to automate the general manufacturing process discussed above.

As a further matter, extractor 320 and press plate 340 are depicted as being located below heating plate 330 in various steps. An advantage to this configuration relates to the positioning of elements forming cushioning element 200. More particularly, when extractor 320 and press plate 340 are below heating plate 330, the elements forming cushioning element 200 may be arranged or otherwise positioned on extractor 320 and press plate 340 prior to the application of heat from heating plate 330. In this configuration, heat is applied to the elements of cushioning element 200 only when heating plate 330 compresses the elements against either extractor 320 or press plate 340. Accordingly, the elements forming cushioning element 200 may be arranged in the absence of applied heat in configurations where heating plate 330 is above extractor 320 and press plate 340.

A variety of techniques may be utilized to incorporate cushioning element 200 into apparel 100 or other articles of apparel. As an example, cushioning element 200 may be stitched or otherwise bonded to other materials forming apparel 100. In some configurations, cushioning element 200 may have the configuration depicted in FIG. 6, wherein (a) the second material layer 220 extends outward beyond the periphery of first material layer 210. In this configuration, second material layer 220 may be part of a larger material element that forms portions of apparel 100. That is, second material layer 220 may form interior surface 106 of apparel 100, as well as exterior surface 105 in areas where cushioning elements 200 are absent. In other configurations, cushioning element 200 may be oriented such that first material layer 210 forms a portion of interior surface 106. Accordingly, the manner in which cushioning element 200 is incorporated into apparel 100 may vary.

Further Cushioning Element Configurations

Aspects of cushioning element 200 may vary, depending upon the intended use for cushioning element 200 and the product in which cushioning element 200 is incorporated. Moreover, changes to the dimensions, shapes, and materials utilized within cushioning element 200 may vary the overall properties of cushioning element 200. That is, by changing the dimensions, shapes, and materials utilized within cushioning element 200, the compressibility, impact force attenuation, breathability, flexibility, and overall mass of cushioning element 200 may be tailored to specific purposes or products. A plurality of variations for cushioning element 200 are discussed below. Any of these variations, as well as combinations of these variations, may be utilized to tailor the properties of cushioning element 200 to an intended use or particular product. Moreover, any of these variations may be manufactured through the process or variations of the process discussed above.

Figure 13:
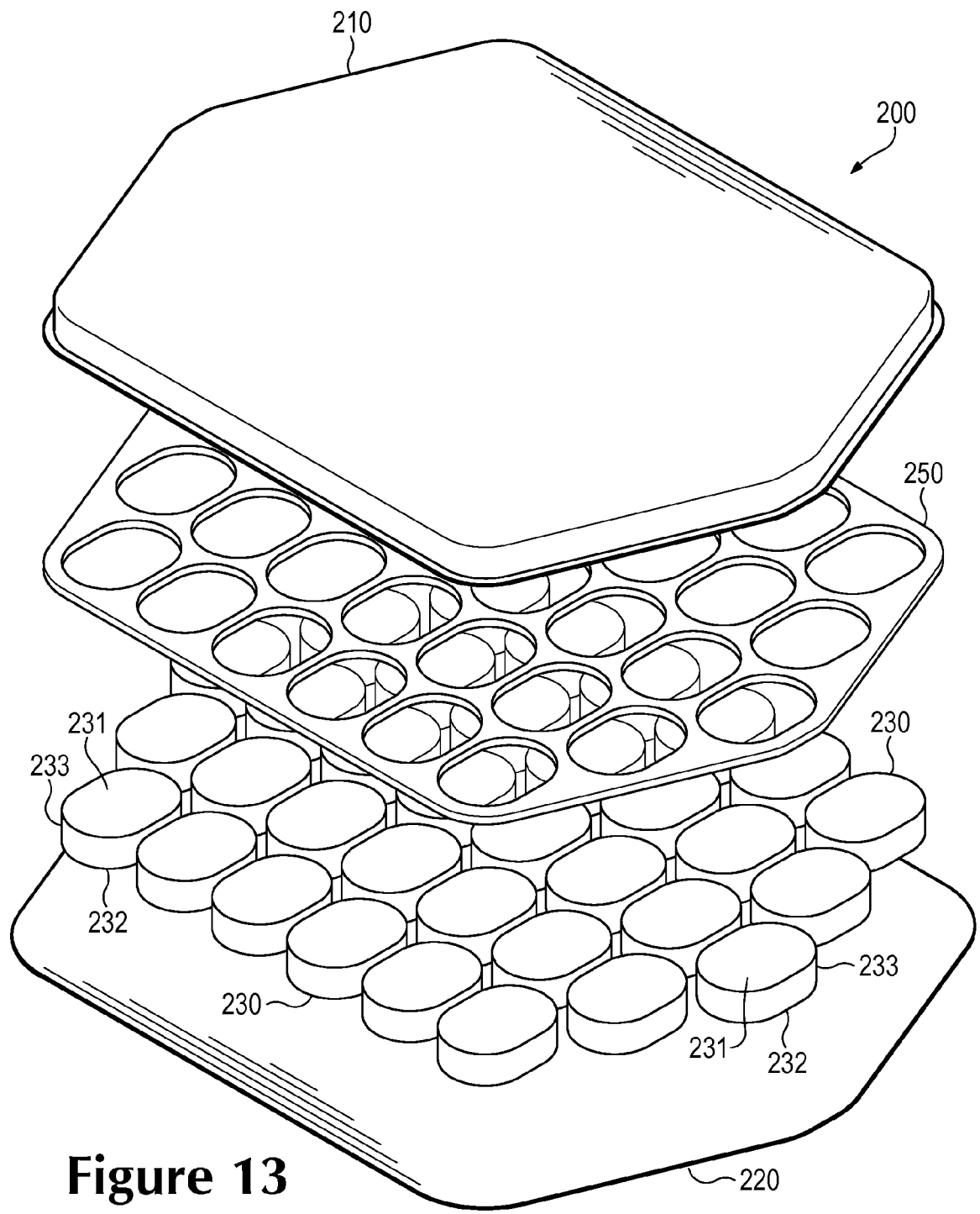
FIG. 13 is an exploded perspective views corresponding with FIG. 7 and depicting a further configuration of the cushioning element.

A further configuration of cushioning element 200 is depicted in FIG. 13, wherein a frame component 250 is positioned to extend around and between various pad components 230. Although pad components 230 are secured to material layers 210 and 220, frame component 250 may be unsecured to layers 210 and 220, and a thickness of frame component 250 may be less than the thickness of pad components 230. An advantage of frame component 250 relates to providing additional protection when objects contact cushioning element 200 and protrude between pad components 230.

Figure 14A:
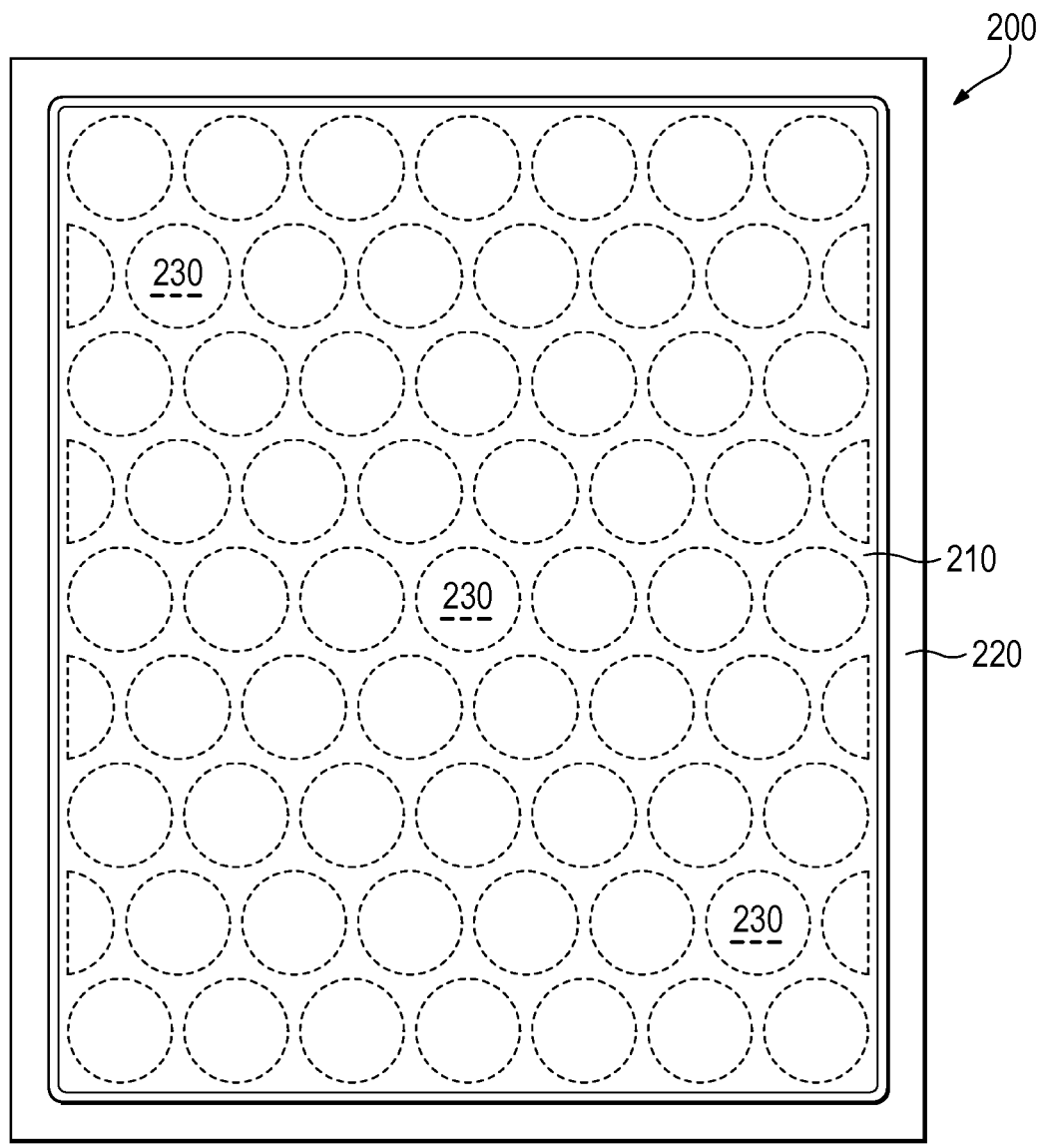
FIGS. 14A-14P are top plan views corresponding with FIG. 8 and depicting further configurations of the cushioning element.
Figure 14B:
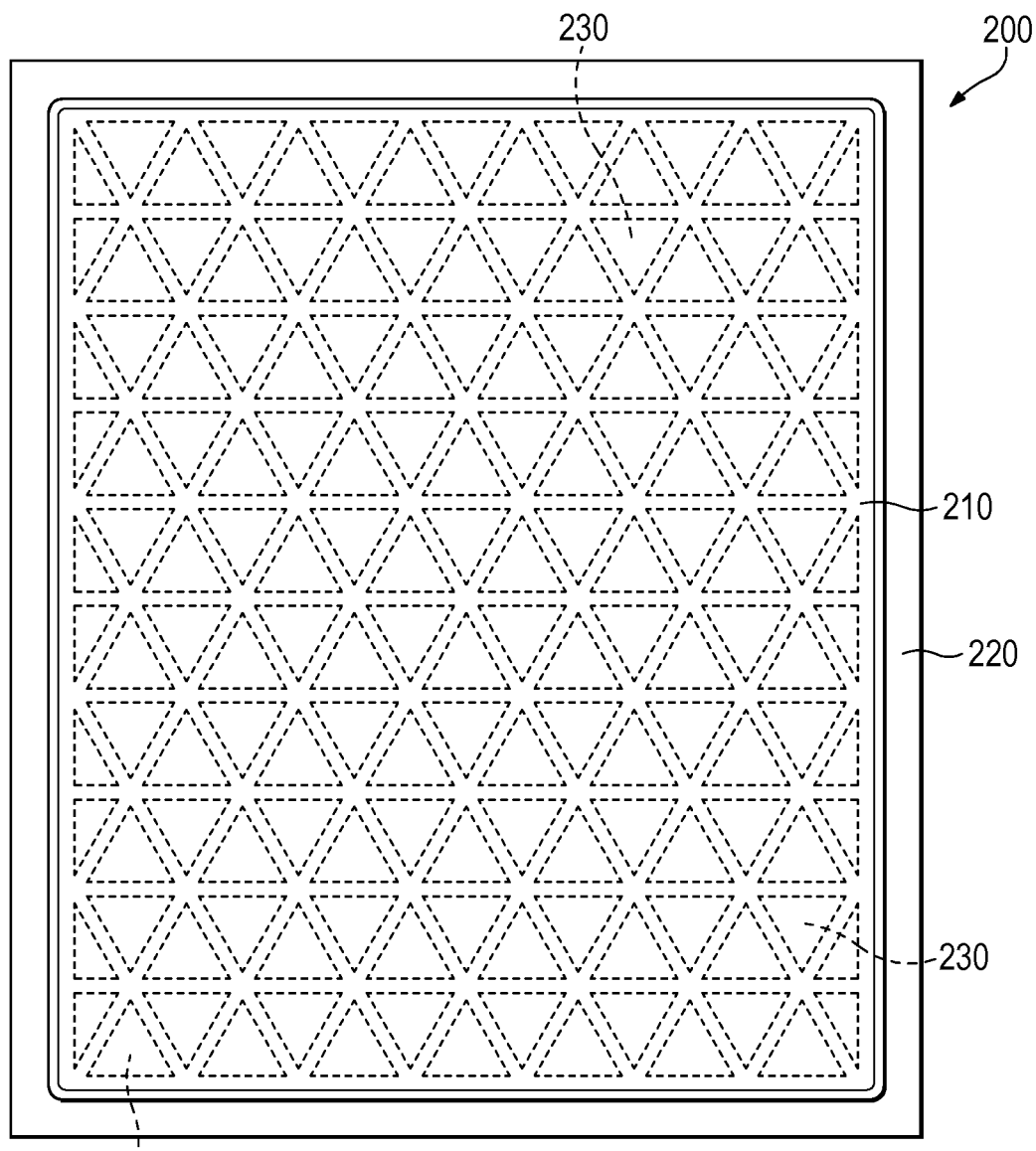
Figure 14C:
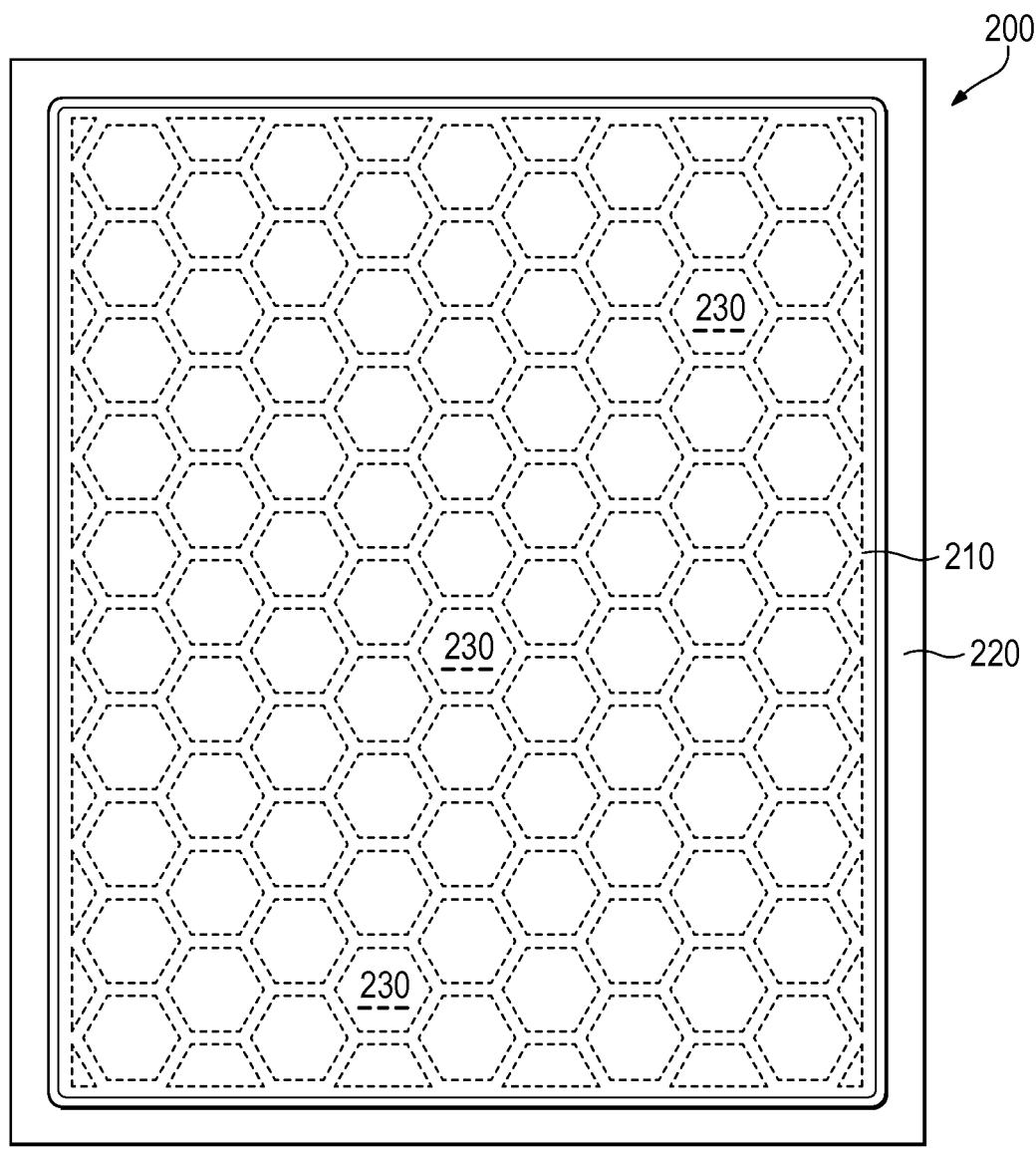
Figure 14D:
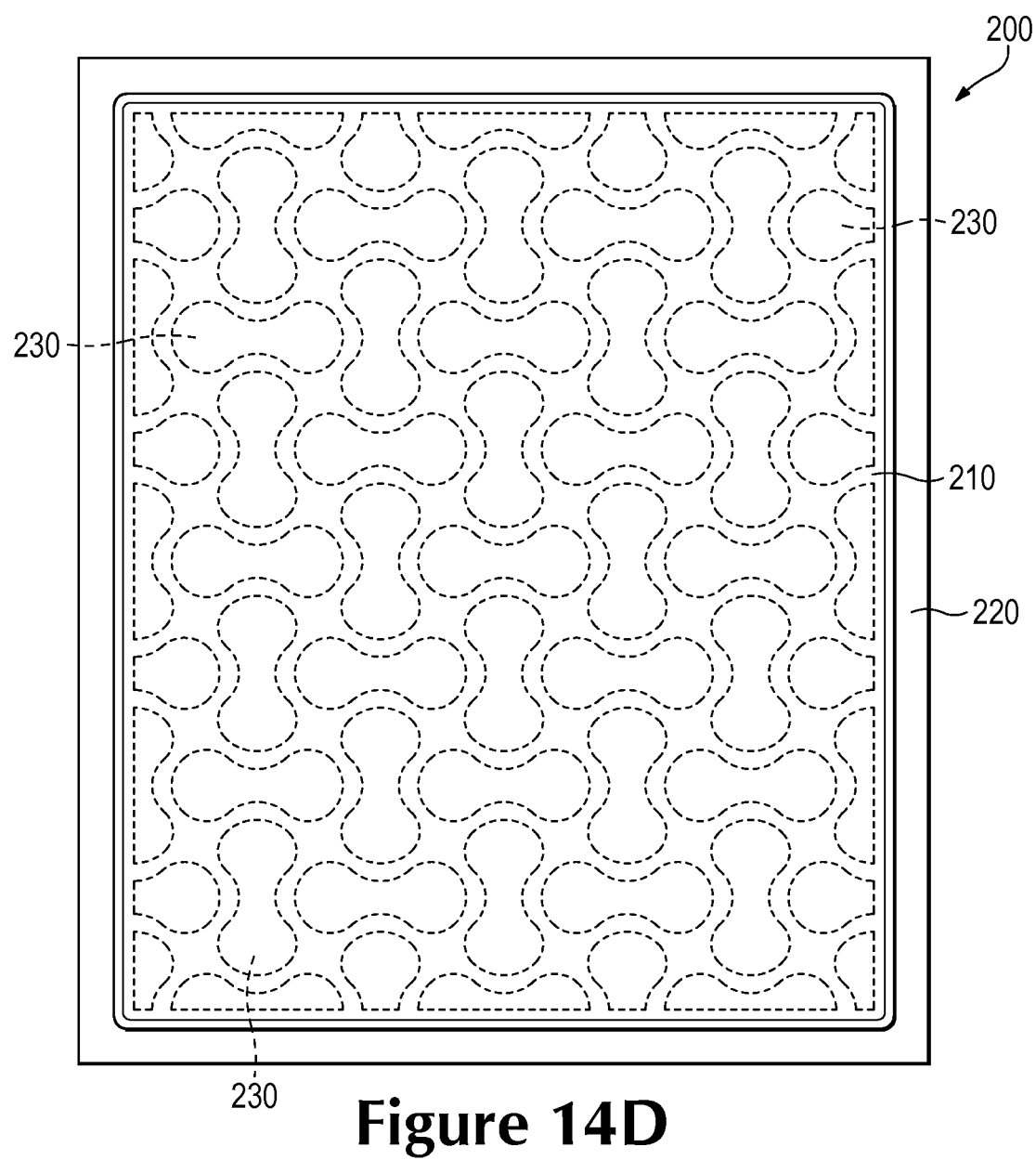
Figure 14E:
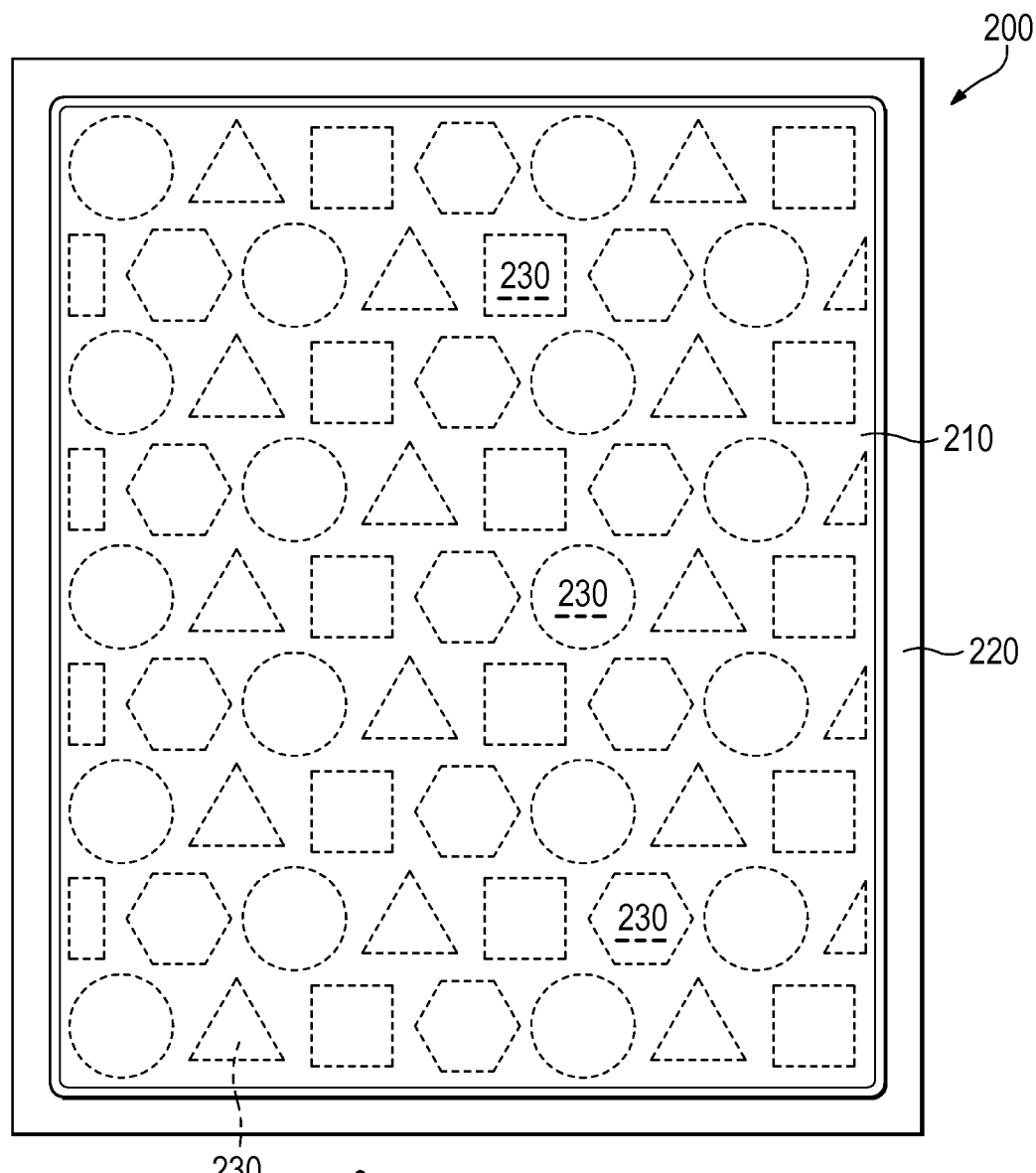
Figure 14F:
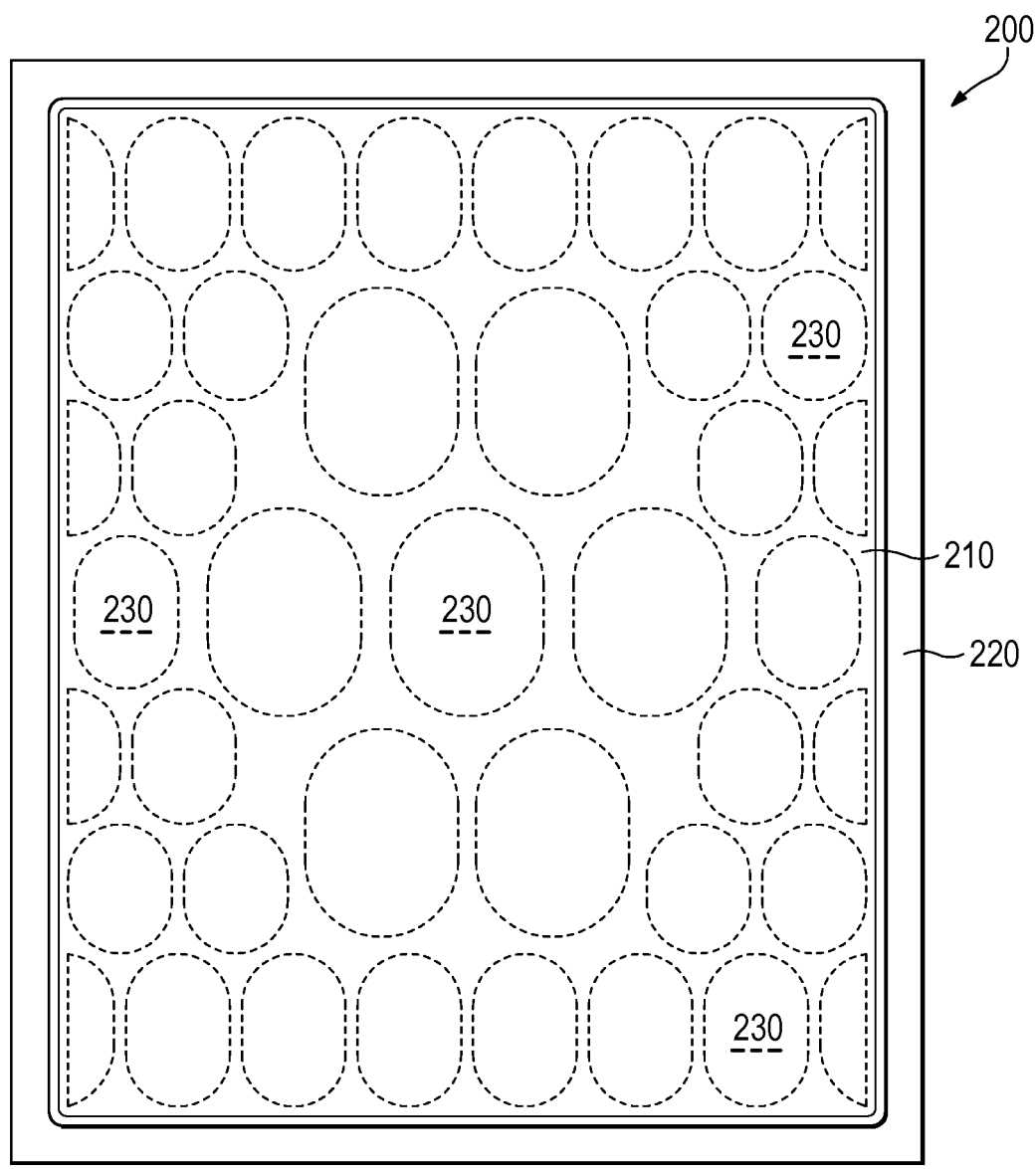

As discussed above, pad components 230 have an elliptical or generally elongate shape with rounded end areas. Pad components 230 may, however, have a variety of other shapes, including round, triangular, and hexagonal, as respectively depicted in FIGS. 14A-14C. Pad components 230 may have an irregular shape, as depicted in FIG. 14D, or may be a mixture of different shapes, as depicted in FIG. 14E. Although each of pad components 230 may have the same shape and size, pad components 230 may also have generally similar shapes with a variety of different sizes, as depicted in FIG. 14F.

Figure 14G:
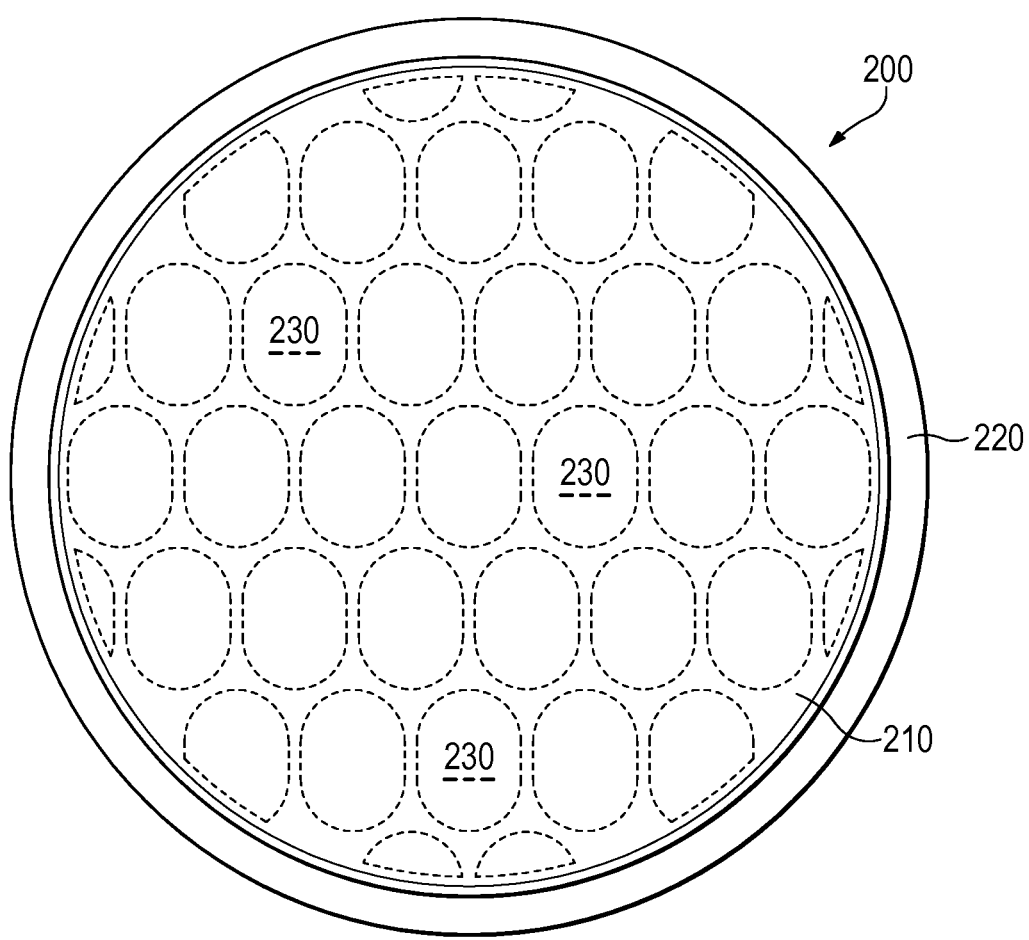
Figure 14H:
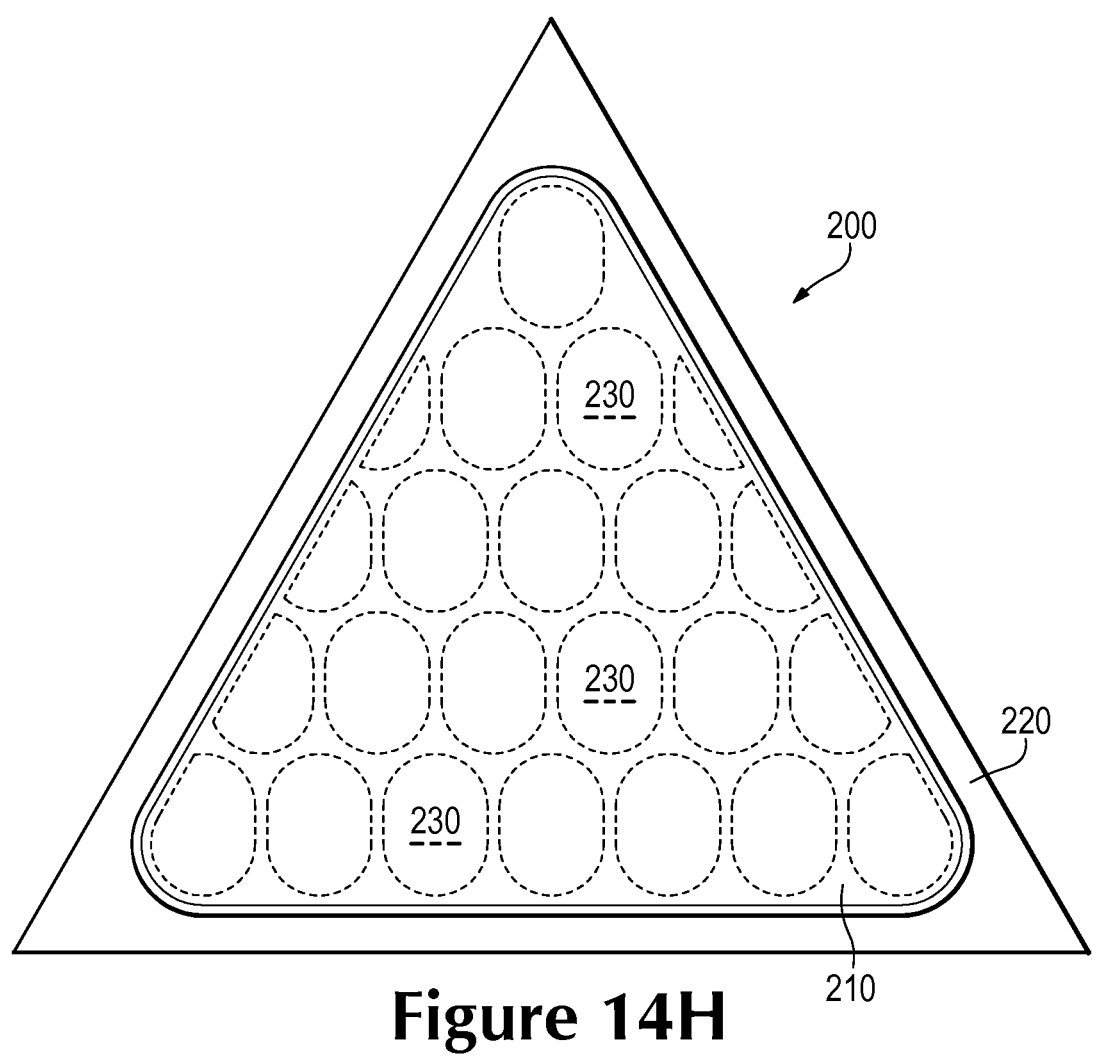
Figure 14I:
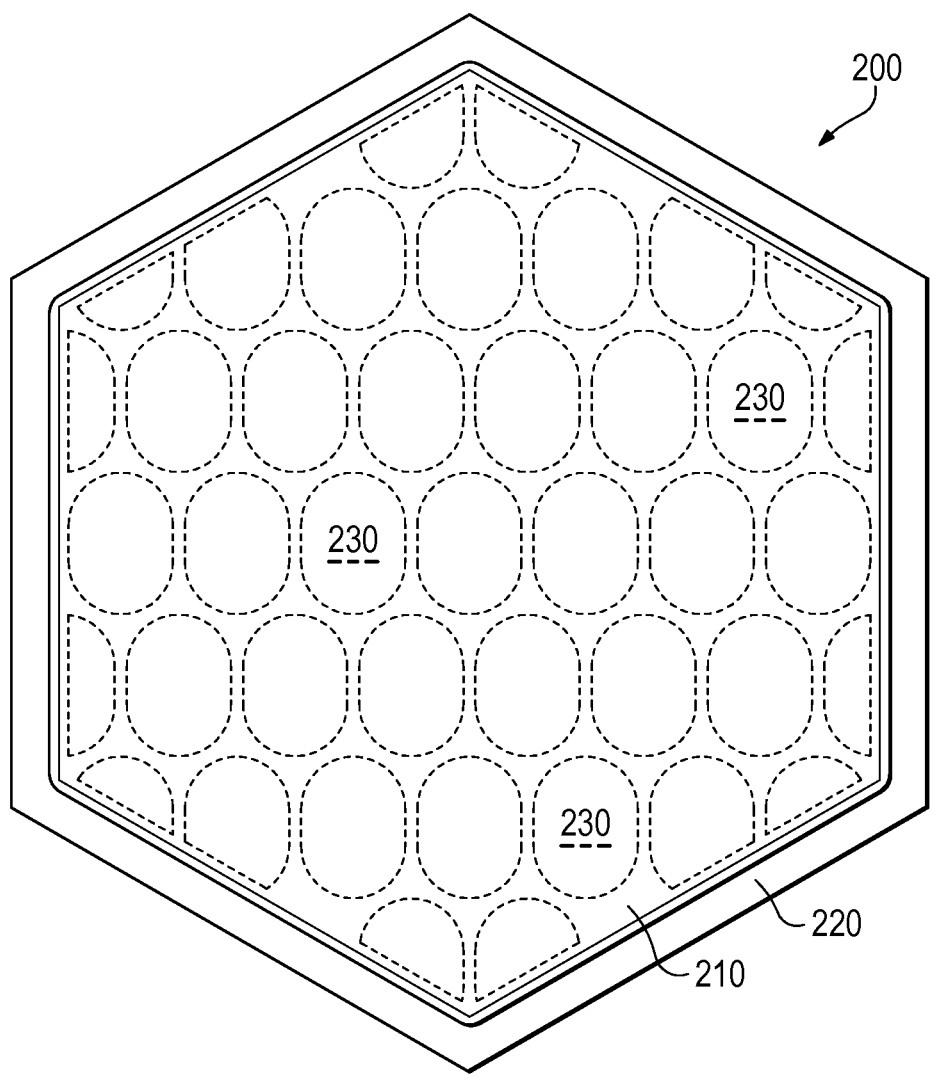
Figure 14J:
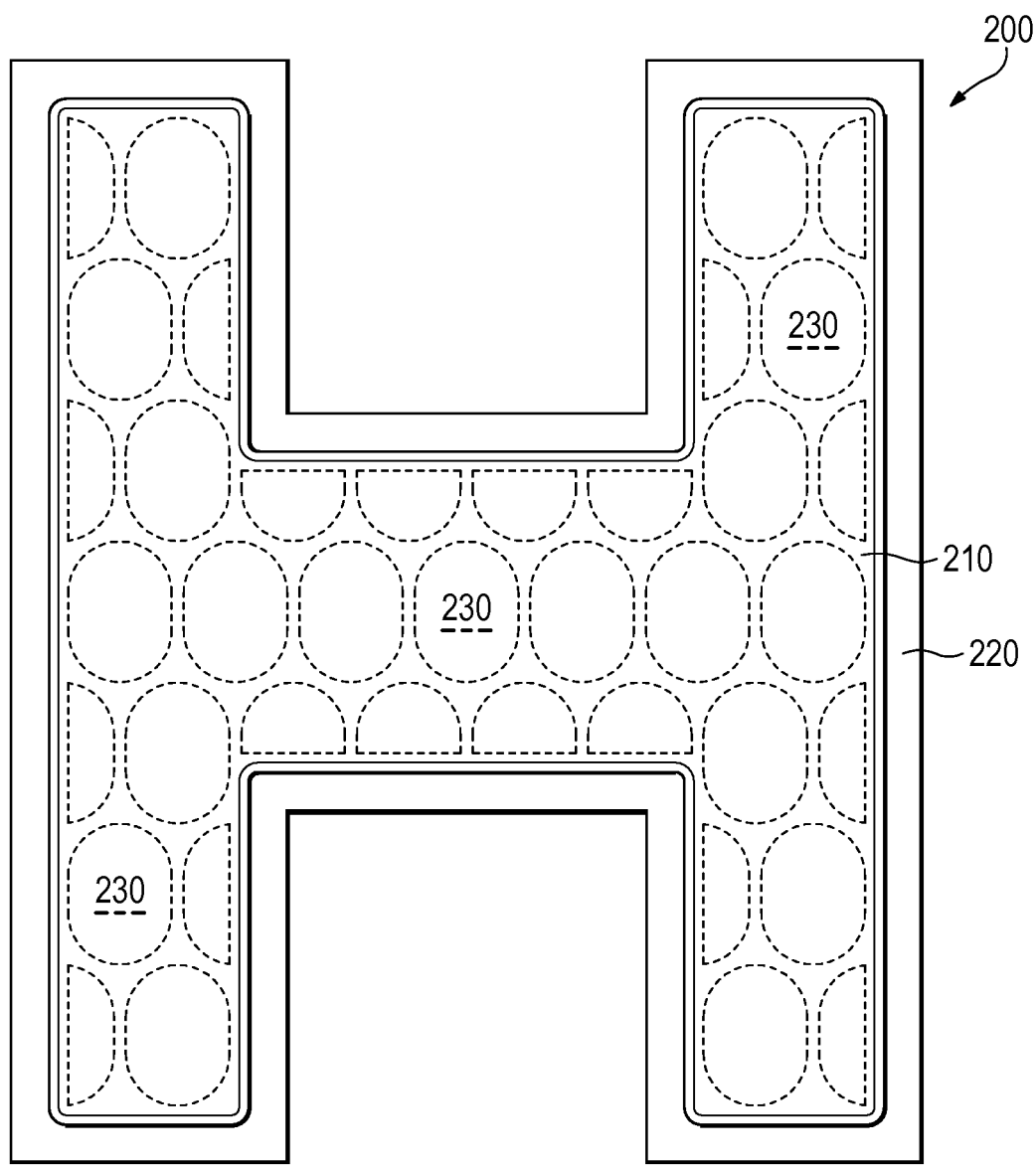
Figure 14K:
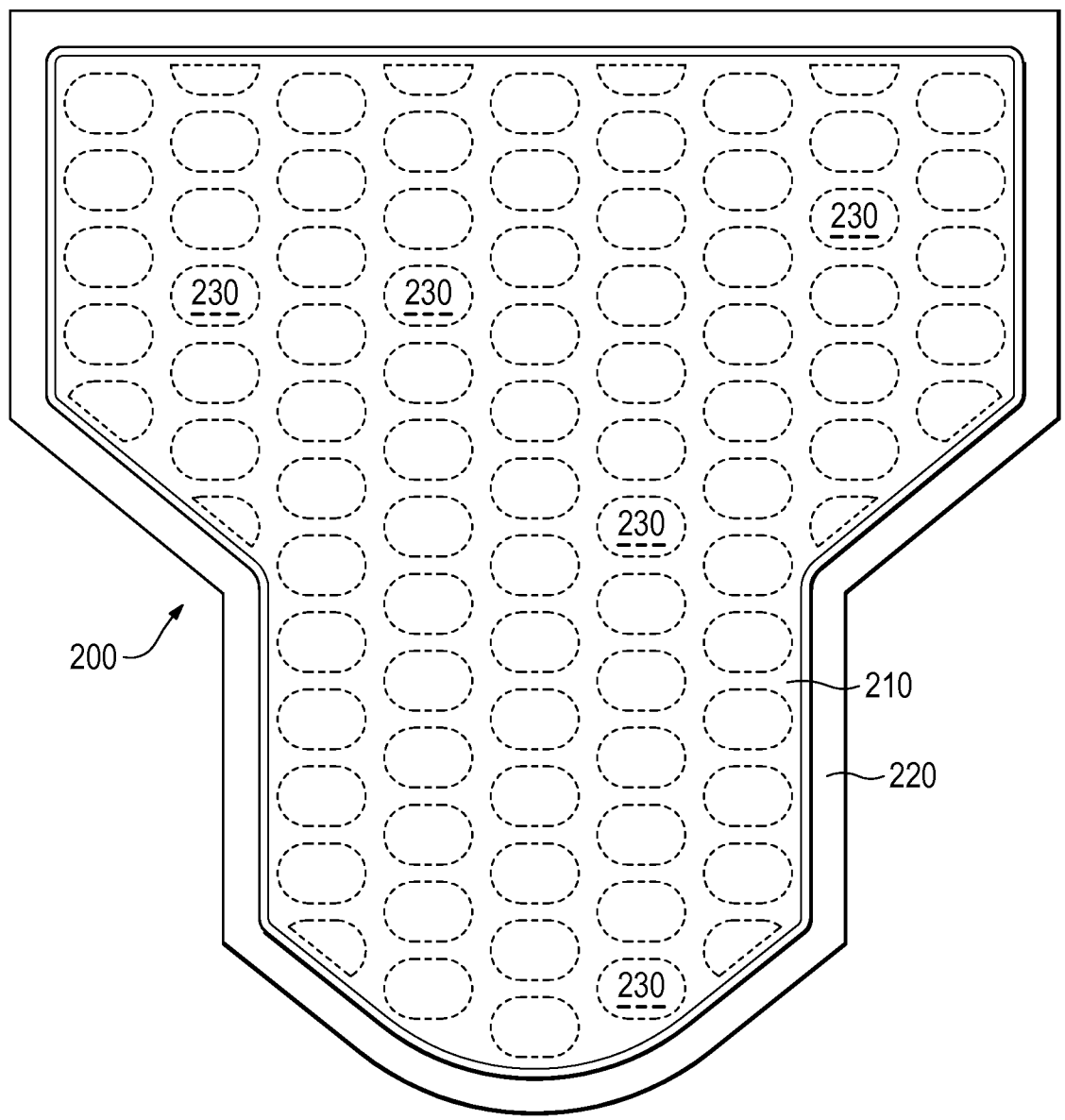
Figure 14L:
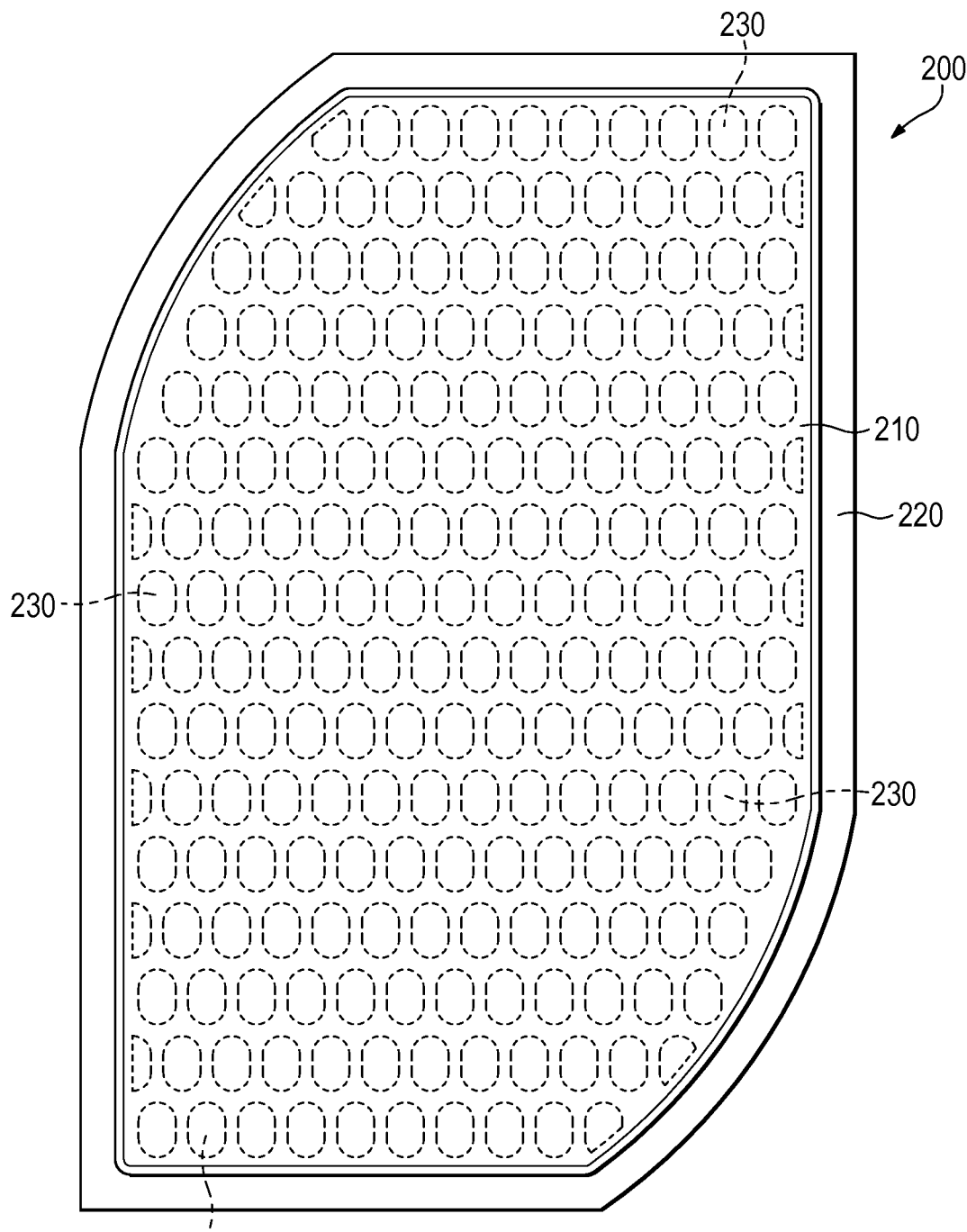
Figure 14M:
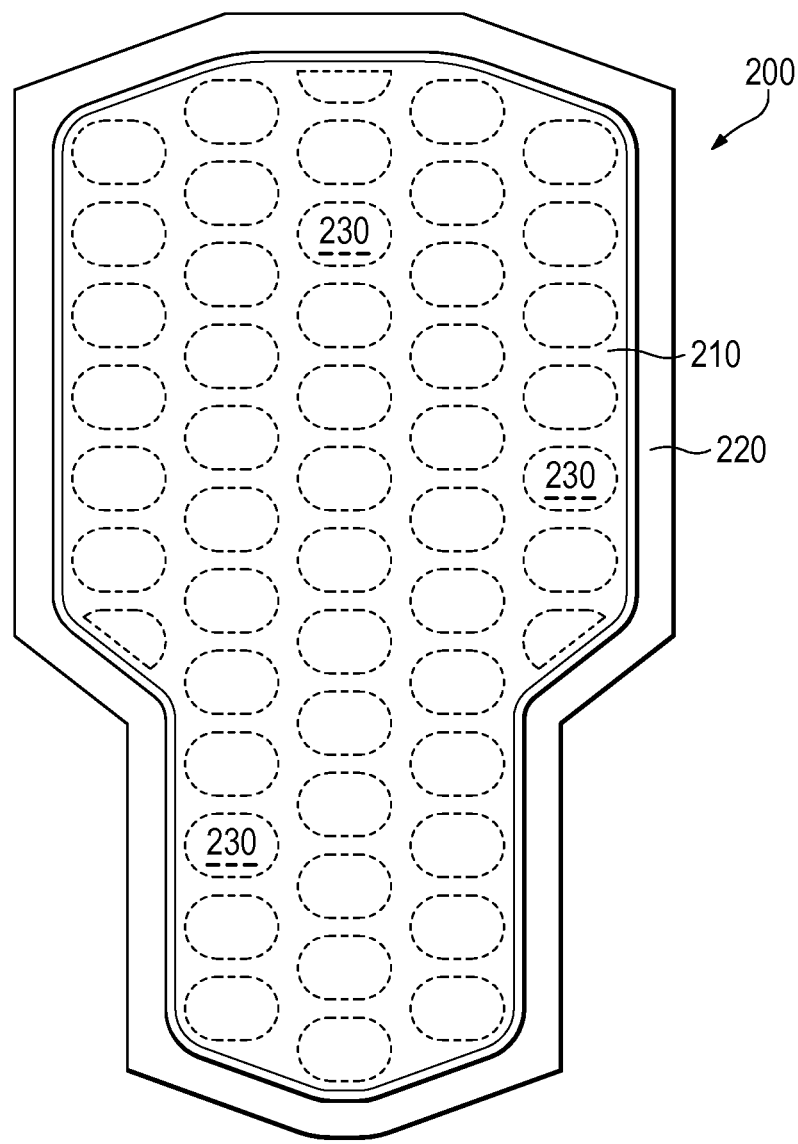
Figure 14N:
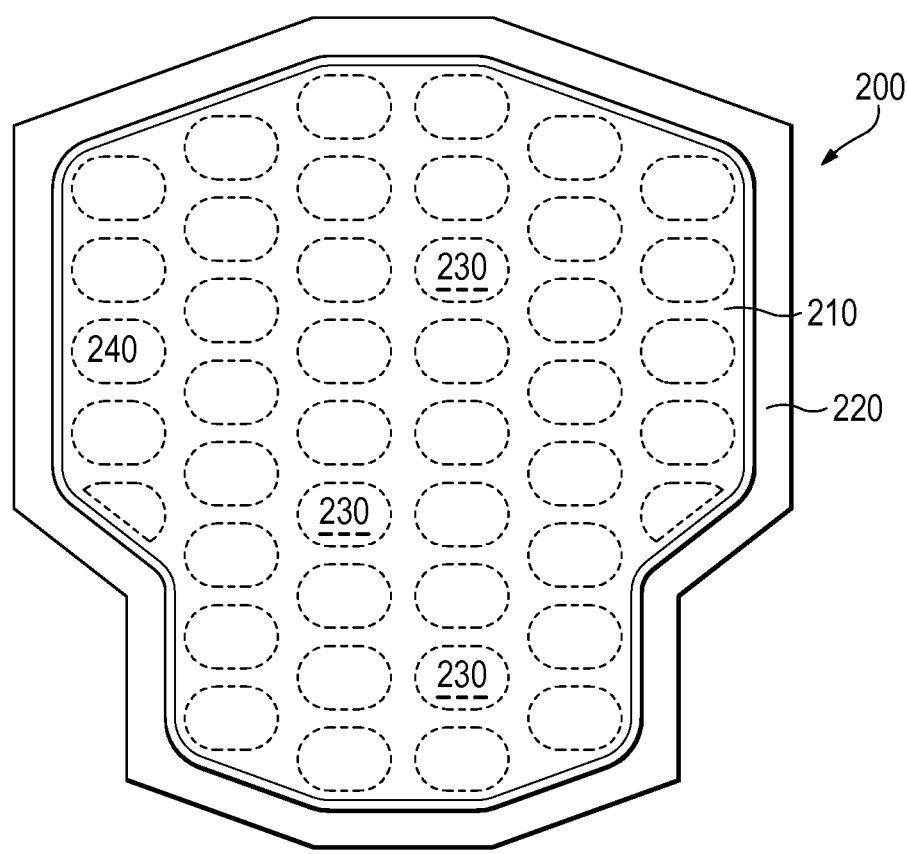

In addition to aspects of pad components 230 that may vary significantly, the overall shape of cushioning element 200 may vary. Referring to FIG. 14G, cushioning element 200 exhibits a generally round or circular shape. In further configurations, cushioning element 200 may have a triangular, hexagonal, or H-shaped structure, as respectively depicted in FIGS. 14H-14J. Various shapes for cushioning element 200 are also depicted in association with apparel 100 in FIGS. 1-5. As examples of these, one of cushioning elements 200 from apparel 100 that has a shape suitable for a hip pad is depicted in FIG. 14K, one of cushioning elements 200 from apparel 100 that has a shape suitable for a thigh pad is depicted in FIG. 14L, and one of cushioning elements 200 from apparel 100 that has a shape suitable for a tailbone pad is depicted in FIG. 14M. A configuration for cushioning element 200 that has a shape suitable for an elbow pad (e.g., for a shirt, jacket, or arm sleeve) is depicted in FIG. 14N.

Figure 14O:
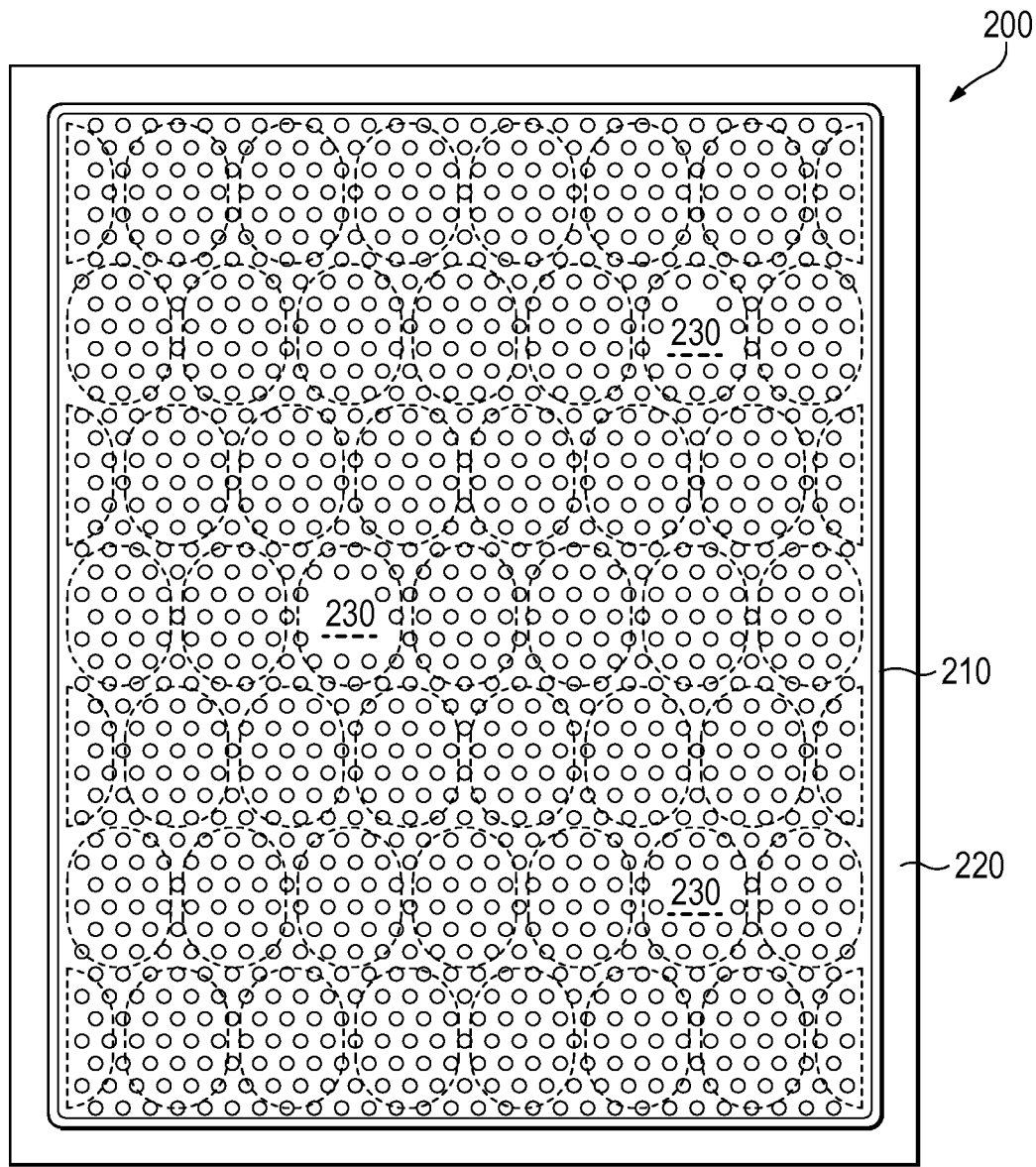
Figure 14P:
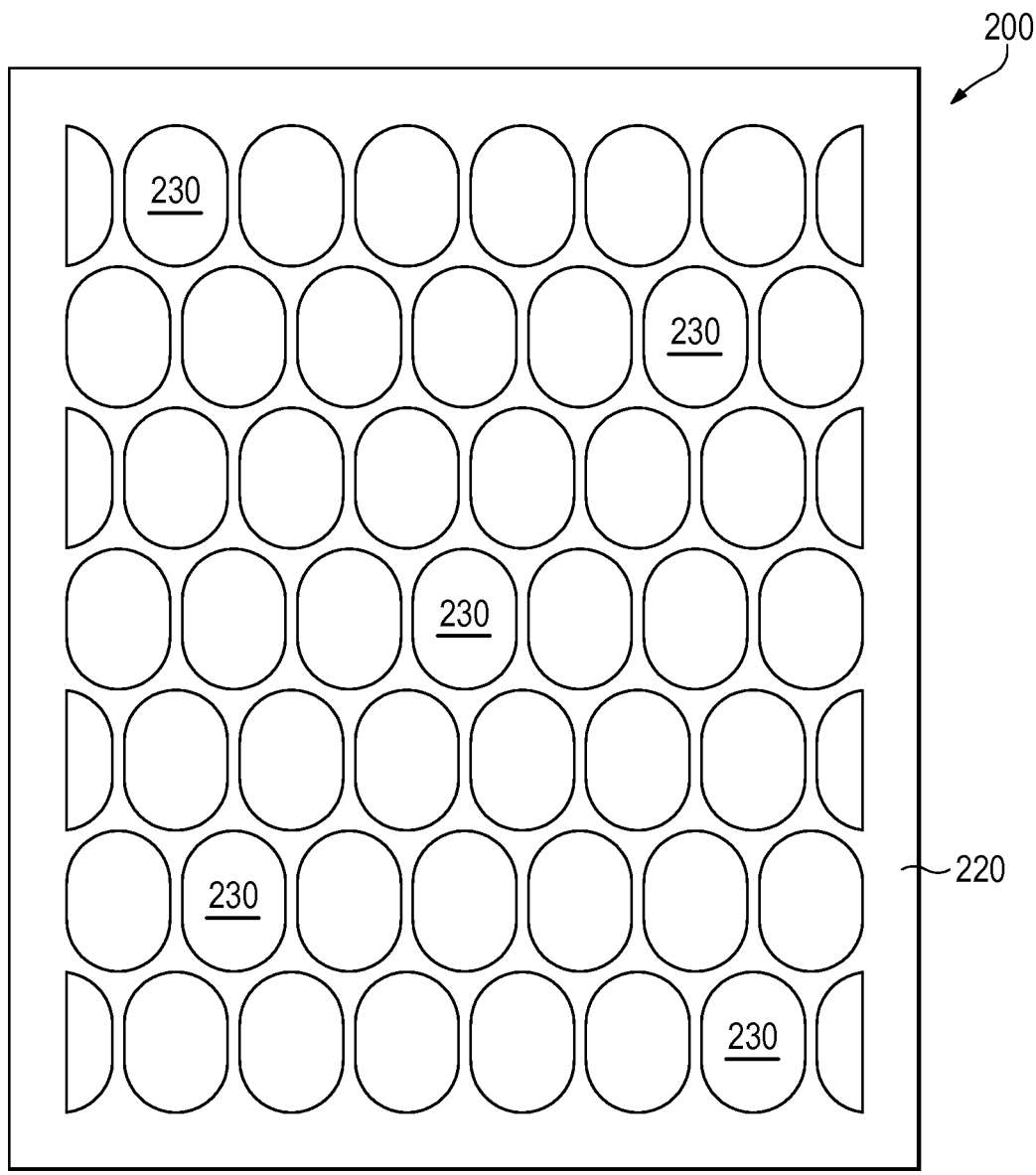

Various aspects relating to first material layer 210 and second material layer 220 may also vary significantly. As discussed above, material layers 210 and 220 may be formed from various textiles, polymer sheets, leather, synthetic leather, or combinations of materials, for example. Referring to FIG. 14O, first material layer 210 is depicted as having the configuration of a mesh material that defines a plurality of holes, through which pad components 230 and frame component 250 are visible. In addition to imparting greater breathability that allows the transfer of air and moisture, a mesh material may allow for various aesthetic properties. More particularly, pad components 230 may have different colors that are visible through first material layer 210. In addition to a mesh material, other at least semi-transparent textile or polymer sheet materials may also permit pad components 230 with different colors to be visible. In further configurations, first material layer 210 may be entirely absent from cushioning element 200, as depicted in FIG. 14P.

Although the thicknesses of pad components 230 (i.e., distance between surfaces bonded to material layers 210 and 220) may be constant, pad components 230 may also have varying thicknesses, as depicted in FIG. 15A. In some configurations of cushioning element 200, pad components 230 located in the central area may have lesser thickness than pad components 230 located in the peripheral area, as depicted in FIG. 15B. The thicknesses of pad components 230 may also decrease across the width of cushioning element 200, as depicted in FIG. 15C, or may taper across the width of cushioning element 200, as depicted in FIG. 15D.

Further Apparel And Product Configurations

Figure 16A:
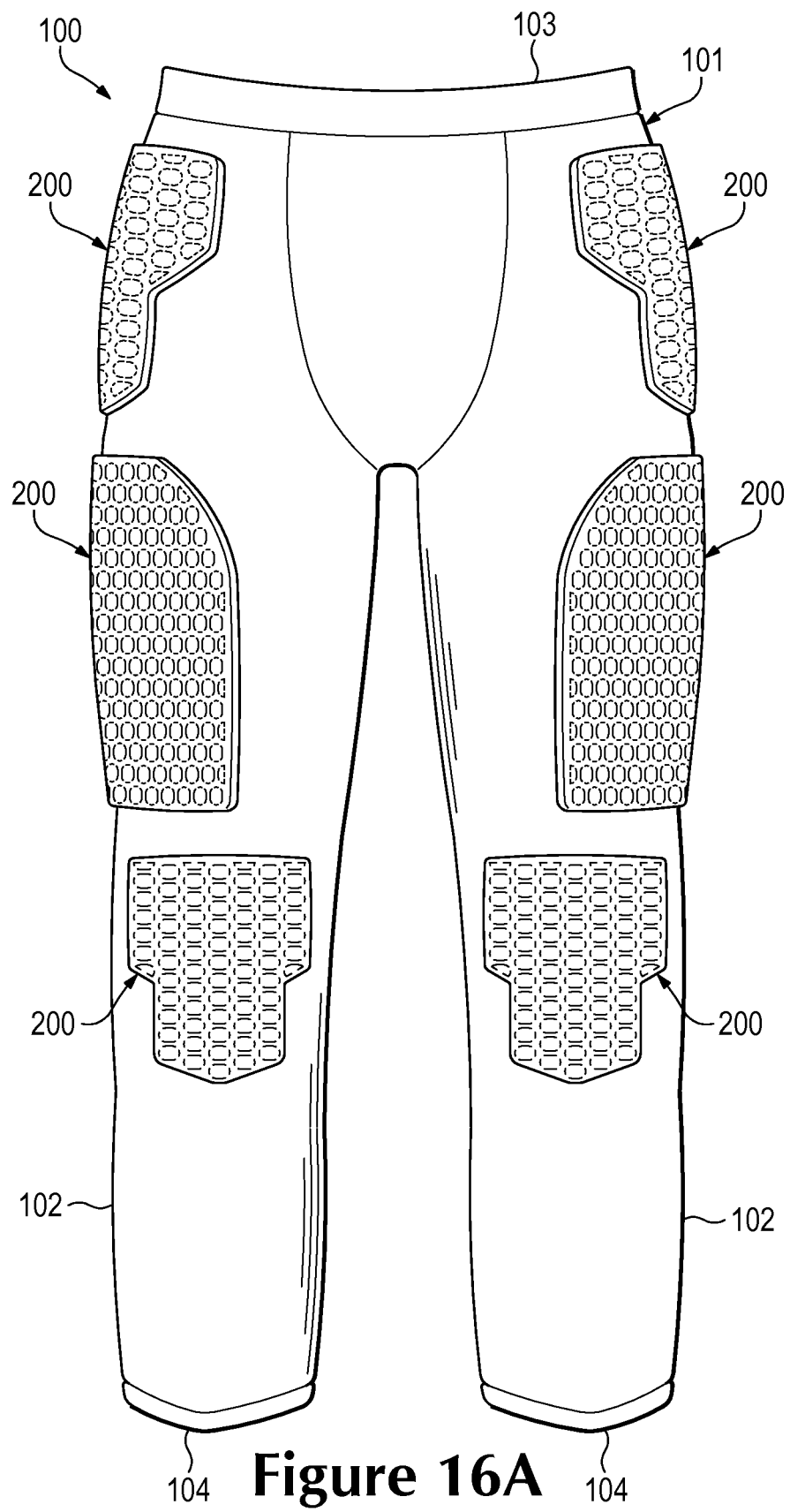
FIGS. 16A-16H are elevational views of articles of apparel incorporating the cushioning element.
Figure 16B:
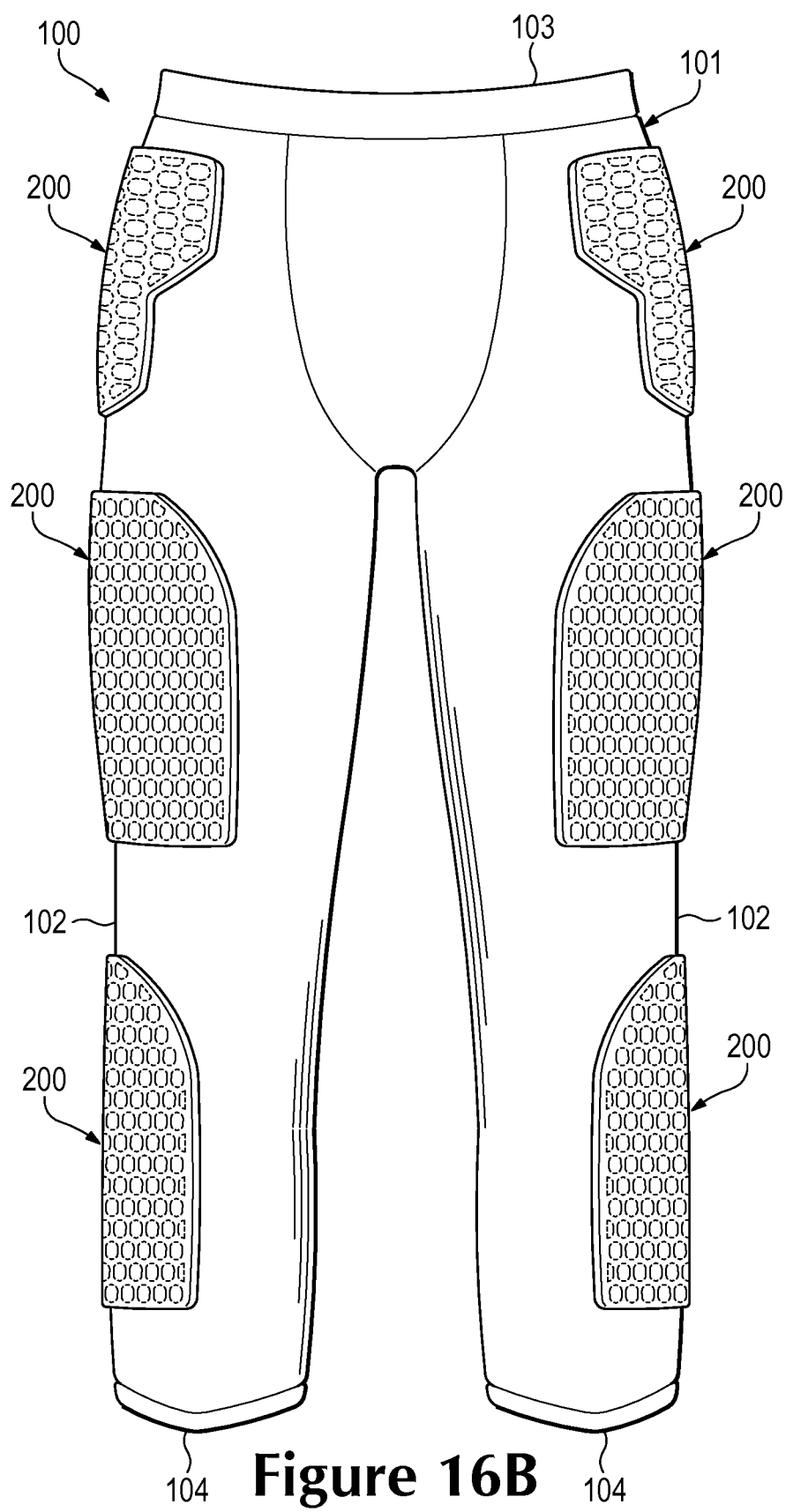

Apparel 100 is depicted in FIGS. 1-5 as having the general configuration of a shorts-type garment. Referring to FIG. 16A, leg regions 102 of apparel 100 extend downward to a greater degree, thereby imparting the configuration of a pants-type garment that includes additional cushioning elements 200 for the knees of individual 10. A similar configuration is depicted in FIG. 16B, wherein apparel 100 includes additional cushioning elements 200 for the ankles or lower legs of individual 10.

Figure 16C:
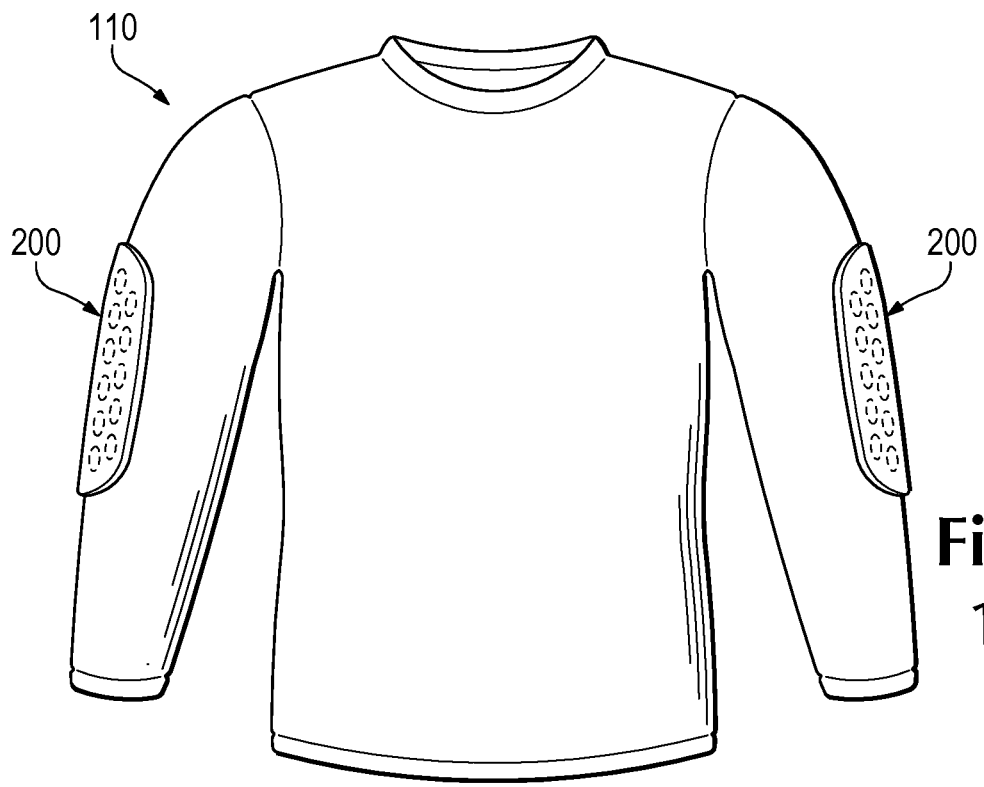
Figure 16D:
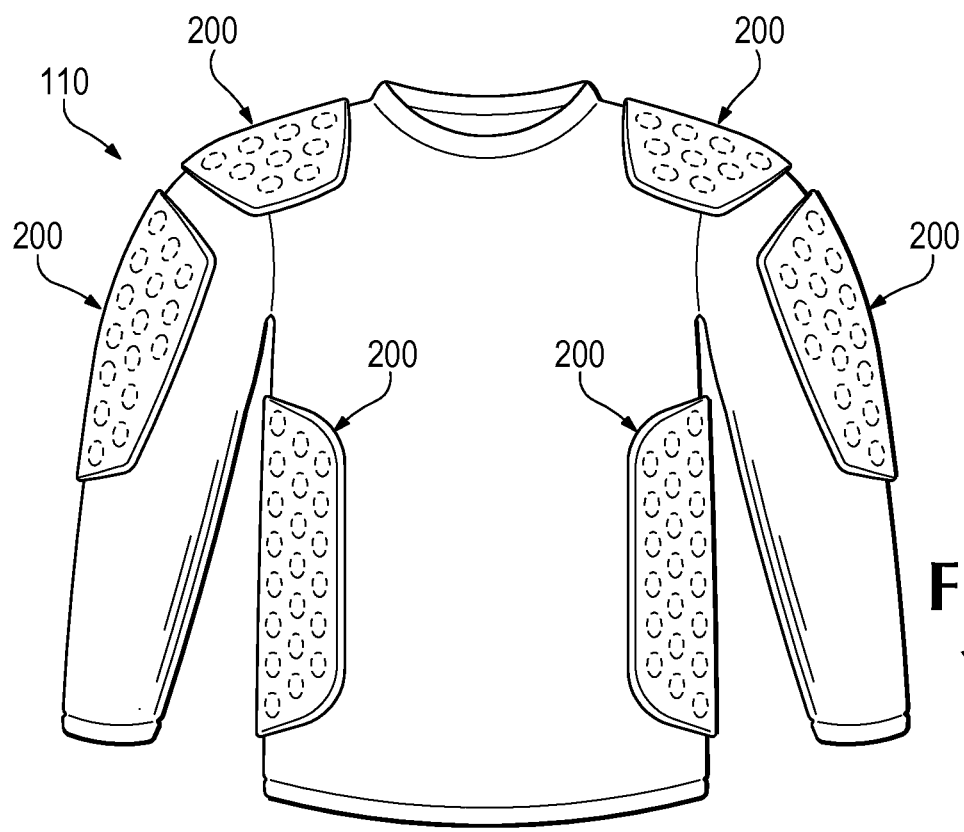

In addition to shorts-type garments and pants-type garments, a variety of other types of apparel may also incorporate cushioning elements 200 in any of the configurations discussed above. Referring to FIG. 16C, an article of apparel 110 having the configuration of a shirt-type garment is depicted as including two cushioning elements 200 in locations that correspond with elbows of a wearer. When worn, cushioning elements 200 may provide protection to the elbows. That is, cushioning elements 200 may attenuate impact forces upon the elbows. In addition to attenuating impact forces, cushioning elements 200 may also simultaneously provide one or more of breathability, flexibility, a relatively low overall mass, and launderability. Although apparel 110 is depicted as a long-sleeved shirt, apparel 110 may have the configuration of other shirt-type garments, including short-sleeved shirts, tank tops, undershirts, jackets, and coats, for example. Referring to FIG. 16D, apparel 110 is depicted as including six cushioning elements 200 in locations that correspond with elbows, shoulders, and sides of a wearer.

Figure 16E:
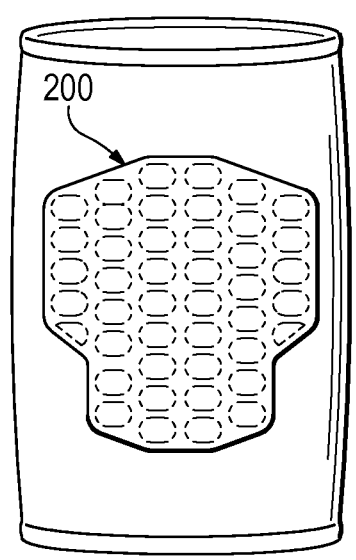
Figure 16F:
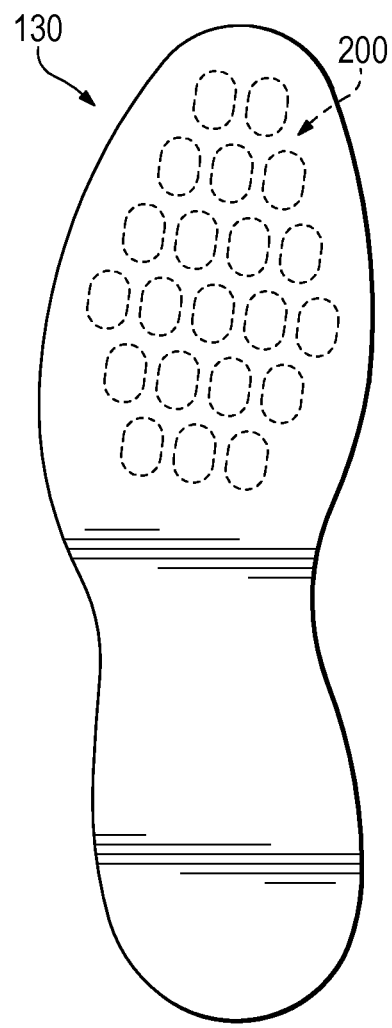
Figure 16G:
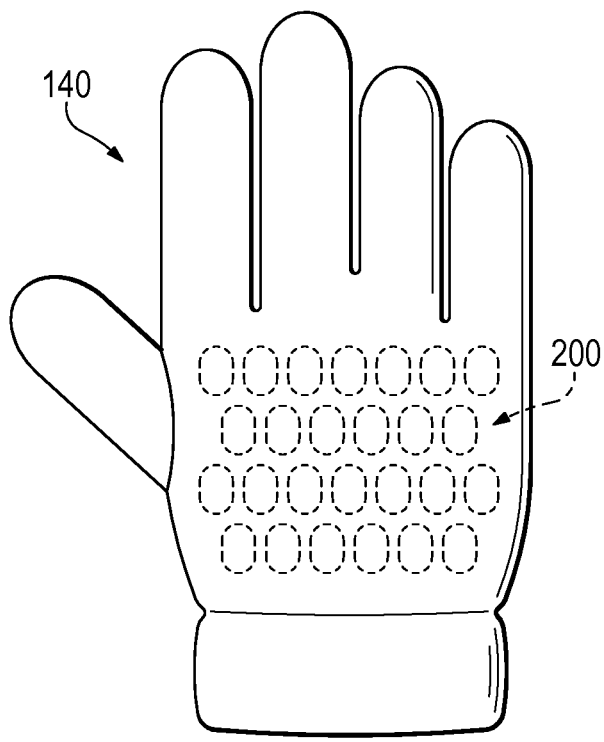
Figure 16H:
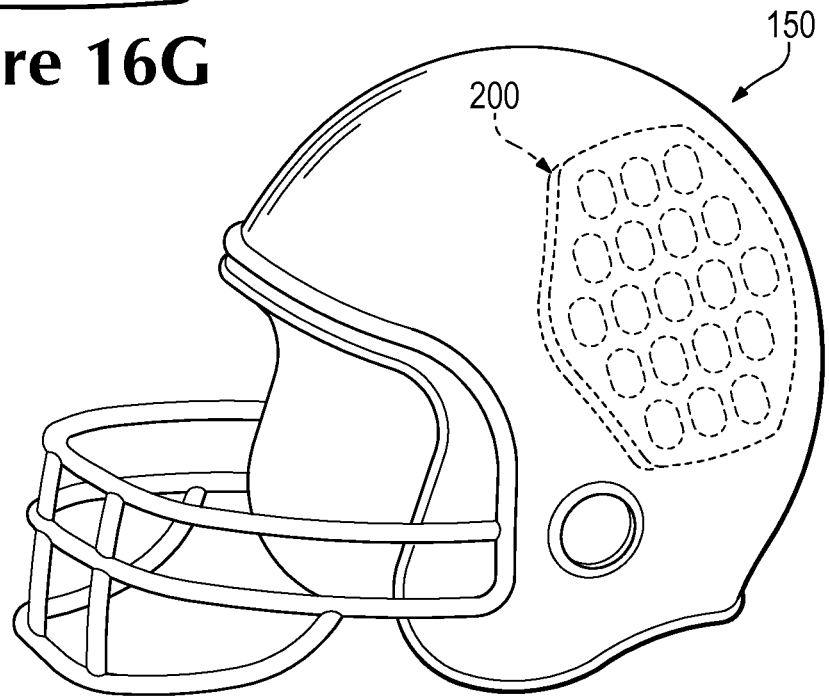

Cushioning elements 200 may also be incorporated into apparel that covers other areas of the wearer, such as hats, helmets, wraps, footwear, socks, and gloves, for example. As an example, a wrap 120 with one cushioning element 200 is depicted in FIG. 16E. Wrap 120 has a generally cylindrical configuration that may be placed upon an arm or a leg of a wearer. When, for example, the elbow is sore or injured, cushioning element 200 of wrap 120 may be located over the elbow to assist with protecting the elbow during athletic activities. As another example, a sockliner 130 that incorporates a cushioning element 200 is depicted in FIG. 16F. Sockliner 130 may be located within an article of footwear to cushion a lower (i.e., plantar) surface of the foot. Additionally, one or more cushioning elements 200 may be incorporated into a glove 140, as depicted in FIG. 16G, to impart protection to a hand of the wearer. One or more cushioning elements 200 may also be incorporated into a helmet 150, as depicted in FIG. 16H, to impart protection to a head of the wearer. In addition to attenuating impact forces, cushioning elements 200 in these configurations may also simultaneously provide one or more of breathability, flexibility, a relatively low overall mass, and launderability.

Figure 17A:
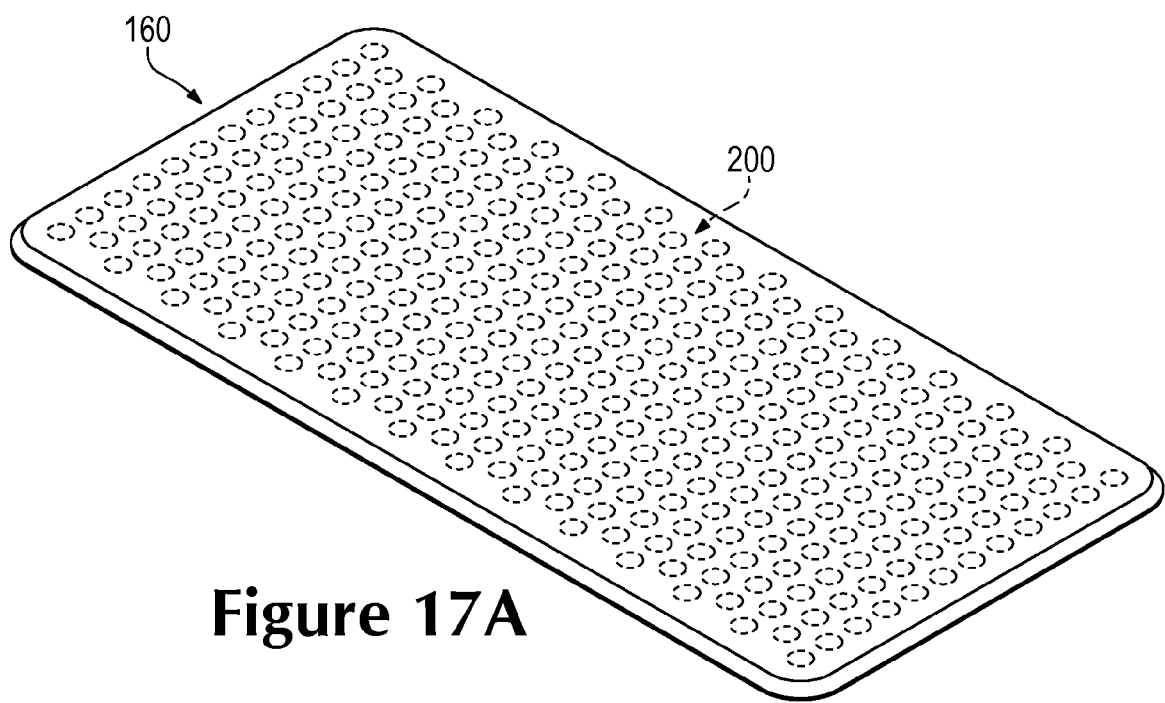
FIGS. 17A-17C are perspective views of further products incorporating the cushioning element.
Figure 17B:
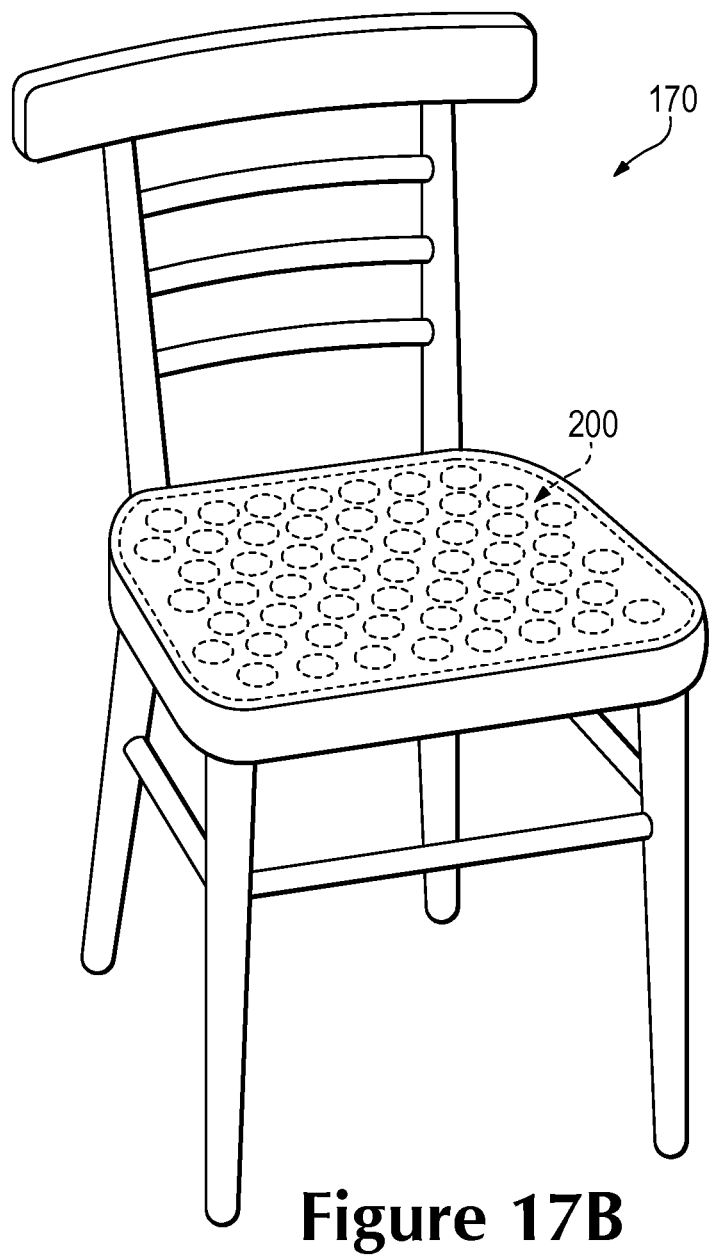
Figure 17C:
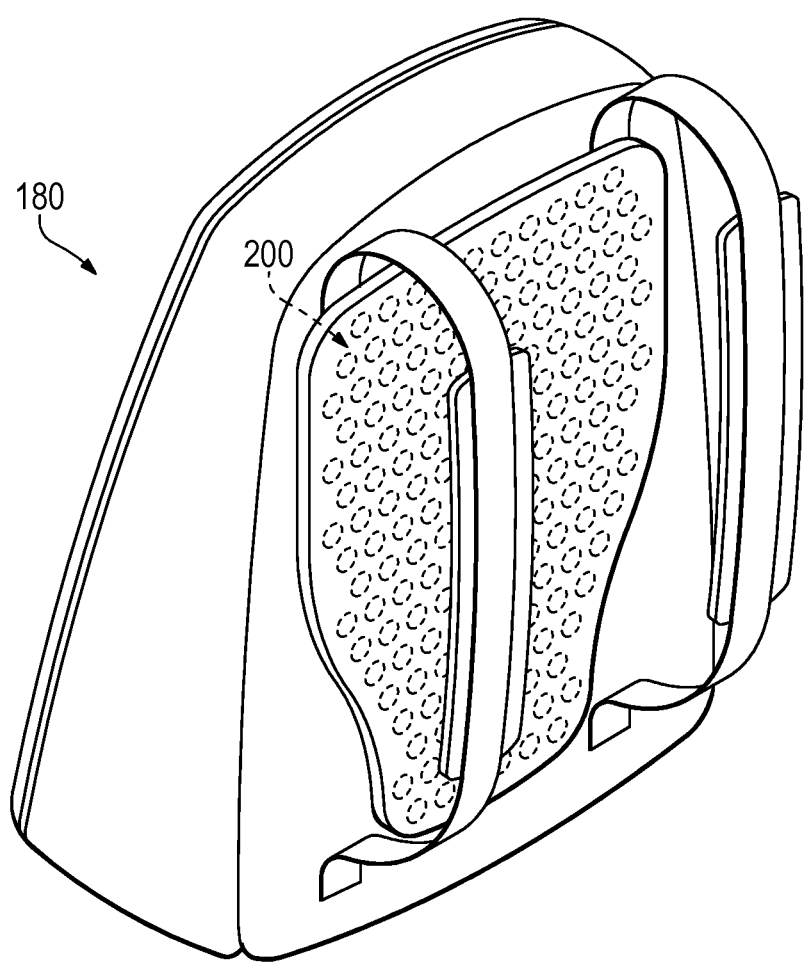

Cushioning elements 200 may also be utilized in products other than apparel. Referring to FIG. 17A, a mat 160 is depicted as being primarily formed from one cushioning element 200. Mat 160 may be utilized, for example, during yoga or as a camping pad to provide a comfortable surface for sitting or laying on the ground. A cushioning element 200 may also be incorporated into a chair 170, as depicted in FIG. 17B, to provide a comfortable place to sit. Similarly, a cushioning element 200 may be incorporated into a cushion that may be placed upon a chair or upon bleachers at a sporting event, for example. Also, a cushioning element 200 may be incorporated into a backpack 180, as depicted in FIG. 17C, to provide cushioning against the back of the wearer. Accordingly, various configurations of cushioning elements 200 may be incorporated into a plurality of products.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. A method of manufacturing a cushioning element, the method comprising:
   providing a die and an extractor, the die having a plurality of die elements, and the extractor including a plurality of pins and an extractor sheet, the pins extending through apertures in the extractor sheet;
   locating a polymer material between the die and the extractor;
   compressing the polymer material between the die and the extractor, the die elements cutting the polymer material to form a plurality of pad components, and the pins extending into the pad components;
   separating the die and the extractor, the pad components being secured to the pins;
   compressing the pad components against a first material layer with the extractor to bond the pad components to the first material layer;
   separating the extractor sheet from the pins to push the pad components from the extractor; and
   compressing the pad components against a second material layer to bond the pad components to the second material layer.

2. The method recited in claim 1, wherein the step of providing further includes locating the pins opposite the die elements.

3. The method recited in claim 1, wherein the step of providing includes positioning the die elements and the pins in offset rows.

4. The method recited in claim 1, wherein the step of compressing the pad components against the first material layer includes forming a thermalbond between the pad components and the first material layer.

5. The method recited in claim 1, further comprising the step of separating the extractor sheet and the pad components prior to the step of compressing the pad components against the second material layer.

6. The method recited in claim 1 further comprising the steps of
   positioning the extractor proximate a heating plate so that the pad components are disposed between the extractor and the heating plate;
   placing the first material layer between the pad components and the heating plate prior to the step of compressing the pad components against the first material layer with the extractor to bond the pad components to the first material layer.

7. A method of manufacturing a cushioning element, the method comprising:
   providing a die and an extractor, the die having a plurality of die elements, and the extractor including a plurality of pins and an extractor sheet, the pins extending through apertures in the extractor sheet;
   locating a polymer material between the die and the extractor;
   compressing the polymer material between the die and the extractor, the die elements cutting the polymer material to form a plurality of pad components, and the pins extending into the pad components;
   separating the die and the extractor, the pad components being secured to the pins;
   compressing the pad components against a first material layer with the extractor to bond the pad components to the first material layer;
   separating the extractor sheet from the pins to push the pad components from the extractor;
   separating the extractor sheet and the pad components;
   positioning a second material layer against the pad components; and
   compressing the pad components against the second material layer to bond the pad components to the second material layer.

8. The method recited in claim 7, wherein the step of providing further includes locating the pins opposite the die elements.

9. The method recited in claim 7, wherein the step of providing includes positioning the die elements and the pins in offset rows.

10. The method recited in claim 7, wherein the step of compressing the pad components against the first material layer includes forming a thermalbond between the pad components and the first material layer.

11. The method recited in claim 7 further comprising the step of positioning the extractor proximate a heating plate so that the pad components are disposed between the extractor and the heating plate.

12. The method recited in claim 11 further comprising the step of placing the first material layer between the pad components and the heating plate prior to the step of compressing the pad components against the first material layer with the extractor to bond the pad components to the first material layer.

13. The method recited in claim 11, wherein the step of positioning the second material layer against the pad components includes placing the second material layer between the pad components and the heating plate.

14. A method of manufacturing a cushioning element, the method comprising:
- providing a die and an extractor, the die having a plurality of die elements, and the extractor including a plurality of pins and an extractor sheet, the pins extending through apertures in the extractor sheet;
- locating a polymer material between the die and the extractor;
- compressing the polymer material between the die and the extractor, the die elements cutting the polymer material to form a plurality of pad components, and the pins extending into the pad components;
- separating the die and the extractor, the pad components being secured to the pins;
- positioning the extractor proximate a heating plate so that the pad components are disposed between the extractor and the heating plate;
- placing a first material layer between the pad components and the heating plate;
- compressing the pad components against a first material layer with the extractor to bond the pad components to the first material layer;
- separating the extractor sheet from the pins to push the pad components from the extractor;
- separating the extractor sheet and the pad components;
- positioning a second material layer against the pad components; and
- compressing the pad components against the second material layer to bond the pad components to the second material layer.

15. The method recited in claim 14, wherein the step of providing further includes locating the pins opposite the die elements.

16. The method recited in claim 14, wherein the step of providing includes positioning the die elements and the pins in offset rows.

17. The method recited in claim 14, wherein the step of compressing the pad components against the first material layer includes forming a thermalbond between the pad components and the first material layer.

18. The method recited in claim 14 further comprising the step of positioning the heating plate proximate a press plate prior to the step of positioning the second material layer against the pad components.

19. The method recited in claim 18, wherein the step of positioning the second material layer against the pad components includes positioning the second material layer between the pad components and the heating plate and positioning the first material layer between the pad components and the press plate.

20. The method recited in claim 14, wherein the step of compressing the pad components against the second material layer to bond the pad components to the second material layer also bonds the first material layer to the second material layer.

* * * * *